United States Patent
Gemba et al.

(10) Patent No.: US 8,278,007 B2
(45) Date of Patent: Oct. 2, 2012

(54) FUEL CELL AND FUEL CELL STACK COMPRISING THE SAME

(75) Inventors: Miho Gemba, Osaka (JP); Yasuo Takebe, Kyoto (JP); Yoichiro Tsuji, Osaka (JP); Yoshihiro Hori, Nara (JP); Yasuhiro Seki, Osaka (JP)

(73) Assignee: Panasonic Corporation, Osaka (JP)

( * ) Notice: Subject to any disclaimer, the term of this patent is extended or adjusted under 35 U.S.C. 154(b) by 1342 days.

(21) Appl. No.: 10/593,459

(22) PCT Filed: Dec. 28, 2005

(86) PCT No.: PCT/JP2005/024145
§ 371 (c)(1),
(2), (4) Date: Sep. 19, 2006

(87) PCT Pub. No.: WO2006/070892
PCT Pub. Date: Jul. 6, 2006

(65) Prior Publication Data
US 2008/0233447 A1    Sep. 25, 2008

(30) Foreign Application Priority Data
Dec. 28, 2004 (JP) .................. 2004-380634

(51) Int. Cl.
*H01M 2/38* (2006.01)
*H01M 2/40* (2006.01)
*H01M 8/04* (2006.01)
*H01M 8/24* (2006.01)

(52) U.S. Cl. ........ 429/514; 429/456; 429/457; 429/512; 429/513

(58) Field of Classification Search .................. 429/35
See application file for complete search history.

(56) References Cited

U.S. PATENT DOCUMENTS
6,042,955 A    3/2000 Okamoto
(Continued)

FOREIGN PATENT DOCUMENTS
EP    1 469 540 A    10/2004
(Continued)

OTHER PUBLICATIONS

Extended European Search Report issued in European Patent Application No. EP 05 84 4887.9 mailed Sep. 7, 2009.

*Primary Examiner* — Raymond Alejandro
*Assistant Examiner* — Steven Scully
(74) *Attorney, Agent, or Firm* — McDermott Will & Emery LLP

(57) ABSTRACT

Even when a reaction gas flows into a gap formed between a gasket and a membrane electrode assembly, the flowing of the reaction gas to the outside without flowing through an electrode is prevented and thus a decrease in power generation efficiency is prevented. In order to allow the water vapor contained in the reaction gas that flows into an anode-side gap $10a$ formed between an anode-side gasket $9a$ and a membrane electrode assembly $5$ to condense in at least a part of the gap $10a$, and to allow the condensed water to fill the gap $10a$, the upstream portion of a cooling fluid channel $8a$ of an anode-side separator $6a$ is formed such that it includes a region corresponding to the gap $10a$, and the upstream portion is formed such that it includes a region corresponding to a middle stream portion and subsequent portion of a fuel gas channel $7a$.

10 Claims, 31 Drawing Sheets

U.S. PATENT DOCUMENTS

| | | |
|---|---|---|
| 6,852,440 B1 | 2/2005 | Bonsel |
| 2002/0031698 A1 | 3/2002 | Inoue et al. |
| 2002/0150810 A1 | 10/2002 | Mizuno |
| 2002/0187384 A1 | 12/2002 | Kato et al. |
| 2004/0106028 A1* | 6/2004 | Sugiura et al. ................ 429/26 |
| 2004/0115509 A1 | 6/2004 | Yoshida et al. |
| 2004/0209148 A1* | 10/2004 | Ohara et al. .................. 429/35 |

FOREIGN PATENT DOCUMENTS

| | | |
|---|---|---|
| JP | 3-102774 A | 4/1991 |
| JP | 4-12465 A | 1/1992 |
| JP | 6-68884 A | 3/1994 |
| JP | 6-119930 A | 4/1994 |
| JP | 6-260193 A | 9/1994 |
| JP | 09-199145 | 7/1997 |
| JP | 2001-319676 | 11/2001 |
| JP | 2002-533869 A | 10/2002 |
| JP | 2004-119121 A | 4/2004 |
| WO | WO 96/00453 | 1/1996 |
| WO | WO 96/37920 A1 | 11/1996 |

* cited by examiner

FUEL CELL AND FUEL CELL STACK COMPRISING THE SAME

RELATED APPLICATION

This application is a national phase of PCT/JP2005/024145 filed on Dec. 28, 2005, which claims priority from Japanese Application No. 2004-380634 filed Dec. 28, 2004, the disclosures of which Applications are incorporated by reference herein. The benefit of the filing and priority dates of the International and Japanese Applications is respectfully requested.

TECHNICAL FIELD

The present invention relates to a fuel cell (a polymer electrolyte fuel cell in particular) and a fuel cell comprising the same.

BACKGROUND ART

Polymer electrolyte fuel cells are batteries that generate electricity and heat simultaneously by allowing a fuel gas such as hydrogen and an oxidant gas such as air to electrochemically react with each other on gas diffusion electrodes serving as an anode and a cathode. FIG. 34 shows a typical structure of such polymer electrolyte fuel cell. As shown in FIG. 34, a fuel cell 100 comprises at least one unit cell (cell) consisting mainly of a membrane electrode assembly (MEA) 105 and a pair of separator plates for sandwiching the membrane electrode assembly 105, namely, an anode-side separator 106a and a cathode-side separator 106b.

The membrane electrode assembly 105 has a structure in which a polymer electrolyte membrane 101 that selectively transports cations (hydrogen ions) is disposed between an anode 104a and a cathode 104b. The anode 104a comprises at least a catalyst layer 102a disposed in close contact with the polymer electrolyte membrane 101 and a gas diffusion layer 103a disposed between the catalyst layer 102a and the anode-side separator 106a. The cathode 104b comprises a catalyst layer 102b disposed in close contact with the polymer electrolyte membrane 101 and a gas diffusion layer 103b disposed between the catalyst layer 102b and the cathode-side separator 106b.

The catalyst layers 102a and 102b are layers composed mainly of a conductive carbon powder carrying an electrode catalyst (e.g., platinum metal). The gas diffusion layers 103a and 103b are layers having gas permeability and electrical conductivity. The gas diffusion layers 103a and 103b are obtained by, for example, forming a conductive water repellent layer composed of a conductive carbon powder and fluorocarbon resin on a conductive porous substrate made of carbon.

As shown in FIG. 34, from the viewpoint of disposing gaskets 109a and 109b for preventing gas leakage, the MEA 105 has a structure in which the main surface of the polymer electrolyte membrane 101 is larger than those of the anode 104a and the cathode 104b, and the entire periphery of the polymer electrolyte membrane 101 extends outwardly beyond the peripheries of the anode 104a and the cathode 104b. In this specification, the periphery of the polymer electrolyte membrane 101 that extends outwardly beyond the peripheries of the anode 104a and the cathode 104b may sometimes be called "protruding portion" (the letter P in FIG. 34.

The anode-side separator 106a and the cathode-side separator 106b are conductive and serve to mechanically fix the MEA 104 and to electrically connect adjacent MEAs 104 in series to each other in a stack comprising a plurality of MEAs 104 stacked. The anode-side separator 106a has a gas channel 107a on one surface thereof (i.e., on a main surface of the anode-side separator 106a to be in contact with the anode 104a). Likewise, the cathode-side separator 106b has a gas channel 107b on one surface thereof (i.e., on a main surface of the cathode-side separator 106b to be in contact with the cathode 104b). The gas channels 107a and 107b serve to remove a gas containing an electrode reaction product and unreacted reaction gas to the outside of the MEA 104.

Further, the anode-side separator 106a and the cathode-side separator 106b have cooling fluid channels 108a and 108b formed on the other surfaces thereof, respectively. The cooling fluid channels 108a and 108b serve to introduce a cooling fluid (e.g., cooling water) for adjusting the cell temperature to a certain level. By allowing the cooling fluid to circulate between the fuel cell and a heat exchanger disposed outside the fuel cell, a thermal energy generated by the reaction can be utilized in the form of warm water or the like.

For the sake of simplification of production process, the gas channels 107a and 107b are usually formed by providing grooves on the main surfaces of the anode-side separator 106a and the cathode-side separator 106b to be in contact with the anode 104a and the cathode 104b, respectively. The cooling fluid channels 108a and 108b are usually formed by providing grooves on the outer main surfaces of the anode-side separator 106a and the cathode-side separator 106b, respectively.

In a so-called stack type fuel cell (fuel cell stack) comprising a plurality of MEAs 105 stacked and connected in series with the anode-side separators 106a and the cathode-side separators 106b interposed between each adjacent MEAs 105, there is formed a manifold for branching a reaction gas to be supplied to the fuel cell and supplying the reaction gas to each of the MEAs 105 (a manifold formed by connecting manifold apertures for supplying reaction gas and manifold apertures for exhausting reaction gas formed in the anode-side separators 106a and the cathode-side separators 106b that are sequentially laminated (not shown)).

There is also formed another manifold for branching a cooling fluid to be supplied to the fuel cell and supplying the cooling fluid to each of the MEAs 105 (a manifold formed by connecting manifold apertures for supplying cooling fluid and manifold apertures for exhausting cooling fluid formed in the anode-side separators 106a and the cathode-side separators 106b that are sequentially laminated (not shown)). Such manifolds formed inside a fuel cell are called internal manifolds. Internal manifold type fuel cells as described above are the most common type.

In the fuel cell 100, in order to prevent leakage of reaction gas (e.g., leakage of fuel gas to the cathode 104b, leakage of oxidant gas to the anode 104a, leakage of reaction gas to the outside of the MEA 105), a pair of opposing gaskets having gas sealing function, namely, an anode-side gasket 109a and a cathode-side gasket 109b, are disposed on the periphery (i.e., the periphery of the polymer electrolyte membrane 101 that is positioned outside the anode 104a and the cathode 104b) of the MEA between the opposing anode-side separator 106a and cathode-side separator 106b.

As the anode-side gasket 109a and the cathode-side gasket 109b, for example, O-rings, rubber sheets, composite sheets composed of an elastic resin and a rigid resin, etc. are used. From the viewpoint of ease of handling of MEA 105, gaskets comprising a composite material having a certain rigidity are often combined with the MEA 105 for use.

By disposing the anode-side gasket 109a and the cathode-side gasket 109b such that they sandwich the entire protruding portion of the polymer electrolyte membrane 101, a single enclosed space that surrounds the anode 104a is formed by the anode-side separator 106a, the polymer electrolyte membrane 101 and the anode-side gasket 109a. Likewise, another enclosed space that surrounds the cathode 104b is formed by the cathode-side separator 106b, the polymer electrolyte membrane 101 and the cathode-side gasket 109b. These enclosed spaces function to prevent the reaction gases supplied to the anode 104a and the cathode 104b from leaking.

When disposing the anode-side gasket 109a and the cathode-side gasket 109b in the position described above, tolerances occur during the fabrication and assembly of members, and thus it is very difficult to bring the anode-side gasket 109a and the cathode-side gasket 109b into sufficiently close contact with the end faces of the anode 104a and the cathode 104b, respectively. Accordingly, as shown in FIG. 22, when disposing the anode-side gasket 109a and the cathode-side gasket 109b in the position described above, gaps (namely, an anode-side gap 110a and a cathode-side gap 110b) are likely to occur between the anode-side gasket 109a and the anode 104a and between the cathode-side gasket 109b and the cathode 104b.

If such anode-side gap 110a and cathode-side gap 110b occur, the reaction gases can leak and flow into the anode-side gap 110a and the cathode-side gap 110b. Alternatively, part of the reaction gases flows through the anode-side gap 110a and the cathode-side gap 110b to the outside of the MEA 105, instead of flowing through the anode 104a and the cathode 104b, making it very difficult to maintain power generation performance.

In order to solve the problems, for example, Patent Document 1 proposes a technique in which additional sealants other than the anode-side gasket 109a and the cathode-side gasket 109b are disposed in the anode-side gap 110a and the cathode-side gap 110b so as to fill the gaps.

[Patent Document 1] JP-A-2004-119121

DISCLOSURE OF THE INVENTION

Problem to be Solved by the Invention

However, according to the conventional technique described above in which additional sealants are disposed in the anode-side gap 110a and the cathode-side gap 110b, the additional sealants can cause distortion to the catalyst layers 102a and 102b and to the anode-side gasket 109a and the cathode-side gasket 109, which leaves a margin for improvement to solve the above problems. Moreover, in this conventional technique also, tolerances occur during the fabrication and assembly of members, and thus it is very difficult to bring the additional sealants into sufficiently close contact with the end faces of the anode 104a and cathode 104b, respectively. Accordingly, it has been considered very difficult to completely seal the anode-side gap 110a and the cathode-side gap 110b.

The present invention is made to solve the above problems. An object of the present invention is to provide a fuel cell having a simple structure in which a reaction gas is effectively utilized in the electrode reaction even with the presence of gaps as described above between the anode-side gasket and the end face of the anode and between the cathode-side gasket and the end face of the cathode while ensuring sufficient power generation performance, and to provide a fuel cell stack comprising the fuel cell.

Means for Solving the Problem

In order to achieve the above object, the present invention provides a fuel cell comprising: at least a membrane electrode assembly having an anode, a cathode and a polymer electrolyte membrane disposed between the anode and the cathode;

an anode-side separator and a cathode-side separator that sandwich the membrane electrode assembly and face to each other;

a cooling fluid channel for supplying and exhausting a cooling fluid for cooling the membrane electrode assembly which is formed in at least one of the anode-side separator and the cathode-side separator;

a fuel gas channel for supplying and exhausting a fuel gas serving as a reaction gas to the membrane electrode assembly which is formed in the anode-side separator;

an oxidant gas channel for supplying and exhausting an oxidant gas serving as a reaction gas to the membrane electrode assembly which is formed in the cathode-side separator;

an anode-side gasket for sealing the reaction gas which is disposed in the outer portion of the membrane electrode assembly and on the main surface of the anode-side separator facing the membrane electrode assembly; and a cathode-side gasket for sealing the reaction gas which is disposed in the outer portion of the membrane electrode assembly and on the main surface of the cathode-side separator facing the membrane electrode assembly such that the cathode-side gasket faces to the anode-side gasket;

wherein the cooling fluid channel, the fuel gas channel and the oxidant gas channel are formed such that their main portions are substantially parallel to each other;

an upstream portion of the cooling fluid channel of at least one of the anode-side separator and the cathode-side separator is formed such that it includes at least one of a region corresponding to the anode-side gap and a region corresponding to the cathode-side gap, and the upstream portion of the cooling fluid channel is formed such that it includes a region corresponding to middle stream portion and subsequent portion of at least one of the fuel gas channel and the oxidant gas channel, in order to allow water vapor contained in the reaction gas that flows into an anode-side gap formed between the anode-side gasket and the membrane electrode assembly and water vapor contained in the reaction gas that flows into a cathode-side gap formed between the cathode-side gasket and the membrane electrode assembly to condense in at least a part of the anode-side gap and the cathode-side gap, and to allow the condensed water to fill at least one of the anode-side gap and the cathode-side gap.

As used herein, the condition (I) in which "an upstream portion of the cooling fluid channel of at least one of the anode-side separator and the cathode-side separator is formed such that it includes at least one of a region corresponding to the anode-side gap and a region corresponding to the cathode-side gap" refers to a condition in which when both the cooling fluid channel and the gap are viewed from a normal direction of a main surface of either separator having the cooling fluid channel formed thereon {i.e., when the cooling fluid channel is viewed together with the gap formed by the separator, the MEA and the gasket through the separator (at an equal magnification)}, the upstream portion of the cooling fluid channel is formed such that it includes at least one of "a region corresponding to the anode-side gap" of the anode-side separator and "a region corresponding to the cathode-side gap" of the cathode-side separator, or at least a part of "the vicinity of the either region". That is, when viewed as described above, the upstream portion of the cooling fluid channel is formed such that the upstream portion of the cooling fluid channel overlaps with at least a part of one of the above-described regions {i.e., "the region corresponding to the anode-side gap", "the region corresponding to the cathode-side gap", "the vicinity of the region corresponding to the anode-side gap" and "the vicinity of the region corresponding to the cathode-side gap"}.

The following explains "the region corresponding to the anode-side gap", "the region corresponding to the cathode-side gap", "the vicinity of the region corresponding to the anode-side gap" and "the vicinity of the region corresponding to the cathode-side gap" mentioned above.

First, the "region corresponding to the anode-side gap" of the anode-side separator means when the anode-side separator, the MEA disposed on the inner surface of the anode-side separator and the gasket disposed around the MEA are simultaneously viewed from the normal direction of the main surface of the anode-side separator {i.e., when the anode-side separator, the MEA and the gasket are simultaneously viewed through the anode-side separator (at a magnification of 1)}, a region of the anode-side separator having a cross section having the same size and shape as the "anode-side gap" formed between the MEA and the gasket.

To explain more specifically with reference to FIGS. 1 and 2 described later, in FIGS. 1 and 2, the "region corresponding to the anode-side gap" of the anode-side separator is a tubular region $A_1$ having a cross section having the same size and shape as the "anode-side gap" 10a formed between the MEA 5 and the gasket 9a (e.g., a ring-shaped form $A_1$ indicated by two two-dot chain lines in FIG. 2) when the anode-side separator 6a, the MEA 5 disposed on the inner surface of the anode-side separator 6a and the gasket 9a disposed around the MEA 5 are simultaneously viewed from the normal direction of the main surface of the anode-side separator {i.e., when the anode-side separator 6a, the MEA 5 and the gasket 9a are simultaneously viewed through the anode-side separator (at a magnification of 1)}. In FIG. 2, for example, the region $A_1$ of the anode-side separator 6a is a region that completely overlaps with the "anode-side gap" 10a when viewed from the normal direction of the main surface of the anode-side separator 6a.

The cooling fluid channel of the present invention should not communicate with the anode-side gap. As shown in FIG. 1, the cooling fluid channel can be formed as a groove on the main surface of the anode-side separator 6a not in contact with the MEA 5. Alternatively, the cooling fluid channel can be formed inside the anode-side separator 6a. In the anode-side separator 6a shown in FIG. 1, for example, the cooling fluid channel may be formed in the region $A_1$ corresponding to the anode-side gap such that the cooling fluid channel does not communicate with the anode-side gap 10a.

The "region corresponding to the cathode-side gap" of the cathode-side separator means when the cathode-side separator, the MEA disposed on the inner surface of the cathode-side separator and the gasket disposed around the MEA are simultaneously viewed from the normal direction of the main surface of the cathode-side separator {i.e., when the cathode-side separator, the MEA and the gasket are simultaneously viewed through the cathode-side separator (at a magnification of 1)}, a region of the cathode-side separator having a cross section having the same size and shape as the "cathode-side gap" formed between the MEA and the gasket.

A detailed explanation of the region corresponding to the cathode-side gap is omitted here because it is easily understood by applying the explanation of the region $A_1$ corresponding to the anode-side gap given above with reference to FIGS. 1 and 2 to the cathode-side separator 6b of FIG. 1.

The "vicinity of the region corresponding to the anode-side gap" refers to a "surrounding region" of the "region corresponding to the anode-side gap" described above (see, e.g., a region $A_2$ or $A_3$ shown in FIG. 1 described later) where the water vapor of the reaction gas that flows into the anode-side gap can be condensed to fill the anode-side gap with the condensed water. This "surrounding region" can be on the inside relative to the "region corresponding to the anode-side gap" (e.g., a region $A_2$ shown in FIG. 1 described later), or on the outside relative to the "region corresponding to the anode-side gap" (e.g., a region $A_3$ shown in FIG. 1 described later).

The size of this "vicinity of the region corresponding to the anode-side gap" varies according to the operation conditions and construction conditions of the fuel cell such as the thermal conductivity of the anode-side separator (constituent material), the temperature of the anode-side separator, the temperature and flow rate (flow amount) of reaction gas, the temperature and flow rate (flow amount) of cooling fluid (e.g., cooling water), and the output of power generation.

Accordingly, although the cooling fluid channel 8a is "located in the vicinity $A_2$" of the region $A_1$ corresponding to the anode-side gap 10a in FIG. 1 described later, the cooling fluid channel 8a may be formed such that it is "located in the region $A_1$" corresponding to the anode-side gap 10a.

The "vicinity of the region corresponding to the cathode-side gap" refers to a "surrounding region" of the "region corresponding to the cathode-side gap" described above where the water vapor of the reaction gas that flows into the cathode-side gap can be condensed to fill the cathode-side gap with the condensed water. This "surrounding region" can be on the inside relative to the above-described "region corresponding to the cathode-side gap", or on the outside relative to the above-described "region corresponding to the cathode-side gap".

The size of this "vicinity of the region corresponding to the cathode-side gap" varies according to the operation conditions and construction conditions of the fuel cell such as the thermal conductivity of the cathode-side separator (constituent material), the temperature of the cathode-side separator, the temperature and flow rate (flow amount) of reaction gas, the temperature and flow rate (flow amount) of cooling fluid (e.g., cooling water), and the output of power generation.

The "upstream portion" of the cooling fluid channel refers to a portion of the cooling fluid channel that satisfies the equation: $L1 \leq L2$. In this equation, L1 represents a length of the "upstream portion" of the cooling fluid channel. Likewise, in the equation, L2 represents the total length of the anode-side gap under the assumption that the anode-side gap is a gas channel when the cooling fluid channel is formed in the anode-side separator, or the total length of the cathode-side gap under the assumption that the cathode-side gap is a gas channel when the cooling fluid channel is formed in the cathode-side separator. The "upstream portion" of the cooling fluid channel refers to a portion extending from an end of the cooling fluid channel connecting to the manifold aperture for supplying cooling fluid to a position that satisfies the equation: $L1 \leq L2$. The present inventors found that the "upstream portion" of the cooling fluid channel that satisfies the equation: $L1 \leq L2$ has a low temperature, so that the reaction gas containing moisture that flows into the anode-side gap or cathode-side gap can be cooled sufficiently and the effect of the present invention, which will be described below, can be obtained.

In the present invention, the condition (II) in which "the upstream portion of the cooling fluid channel of at least one of the anode-side separator and the cathode-side separator is formed such that it includes a region corresponding to middle stream portion and subsequent portion of at least one of the fuel gas channel and the oxidant gas channel" refers to a condition in which when the cooling fluid channel and the gap are simultaneously viewed from a normal direction of the main surface of either separator having the cooling fluid channel formed thereon {i.e., when the cooling fluid channel is viewed together with the gap formed by the separator, the MEA and the gasket through the separator (at an equal magnification)}, the above-described "upstream portion of the cooling fluid channel" in the present invention is formed such that it includes at least one of "a region corresponding to middle stream portion and subsequent portion of the fuel gas channel" of the anode-side separator and "a region corresponding to middle stream portion and subsequent portion of the oxidant gas channel" of the cathode-side separator, or at least a part of "the vicinity of the either region". That is, when viewed as described above, the upstream portion of the cooling fluid channel is formed such that the upstream portion of the cooling fluid channel overlaps with at least a part of one of the above-described regions {i.e., "the region corresponding to middle stream portion and subsequent portion of the fuel gas channel", "the region corresponding to middle stream portion and subsequent portion of the oxidant gas channel", "the vicinity of the region corresponding to a middle stream portion and subsequent portion of the fuel gas channel" and "the vicinity of the region corresponding to middle stream portion and subsequent portion of the oxidant gas channel"}.

The following explains "the region corresponding to a middle stream portion and subsequent portion of the fuel gas channel", "the region corresponding to a middle stream portion and subsequent portion of the oxidant gas channel", "the vicinity of the region corresponding to a middle stream portion and subsequent portion of the fuel gas channel", "the vicinity of the region corresponding to middle stream portion and subsequent portion of the oxidant gas channel" and "the middle stream portion and subsequent portion of the gas channel".

First, "the middle stream portion and subsequent portion of the fuel gas channel" and "the middle stream portion and subsequent portion of the oxidant gas channel" are explained. The "middle stream portion and subsequent portion of the gas channel" refers to a portion of the gas channel that satisfies the equation: $L3 \leq \{(2/3) \times L4\}$. In this equation, $L3$ represents the length of the "middle stream portion and subsequent portion" of the gas channel. Likewise, $L4$ represents the total length of the gas channel (fuel gas channel or oxidant gas channel). The "middle stream portion and subsequent portion" of the gas channel refers to a portion extending from an end of the gas channel connecting to the manifold aperture for exhausting reaction gas to a position that satisfies the equation: $L3 \leq \{(2/3) \times L4\}$. The gas channel (fuel gas channel or oxidant gas channel) refers to a portion extending from an end thereof connecting to the manifold aperture for supplying reaction gas to the other end thereof connecting to the manifold aperture for exhausting reaction gas.

As compared to the reaction gas contained in the upstream portion that contains many reaction components {fuel component (reducing component), oxidant component}, in the reaction gas contained in the "middle stream portion and subsequent portion" of the gas channel that satisfies the equation: $L3 \leq \{(2/3) \times L4\}$, the amount of moisture increases with the decrease of the reaction components and the generation of water by reaction. Based on this, the present inventors found that the effect of the present invention, which will be described below, can be obtained using the structure (II) whereby the reaction gas contained in the "middle stream portion and subsequent portion" of the gas channel that satisfies the equation: $L3 \leq \{(2/3) \times L4\}$ easily flows into the anode-side gap or cathode-side gap.

From the viewpoint of ensuring the effect of the present invention, the "middle stream portion and subsequent portion of the gas channel" is preferably a downstream portion that satisfies the equation: $L3 \leq \{(1/2) \times L4\}$, more preferably a further downstream portion that satisfies the equation: $L3 \leq \{(1/3) \times L4\}$.

The "region corresponding to a middle stream portion and subsequent portion of the fuel gas channel" of the anode-side separator means when viewed from a normal direction of the main surface of the anode-side separator, a region of the anode-side separator having a cross section having the same size and shape as the above-described "middle stream portion and subsequent portion of the fuel gas channel" in the present invention.

The "region corresponding to a middle stream portion and subsequent portion of the oxidant gas channel" of the cathode-side separator means when viewed from a normal direction of the main surface of the cathode-side separator, a region of the cathode-side separator having a cross section having the same size and shape as the above-described "middle stream portion and subsequent portion of the oxidant gas channel" in the present invention.

The "vicinity of the region corresponding to a middle stream portion and subsequent portion of the fuel gas channel" of the anode-side separator refers to a "surrounding region" of the "region corresponding to a middle stream portion and subsequent portion of the fuel gas channel" where the water vapor of the reaction gas that flows into the anode-side gap from the fuel gas channel can be condensed to fill the anode-side gap with the condensed water. This "surrounding region" can be on the inside relative to the "region corresponding to a middle stream portion and subsequent portion of the fuel gas channel", or on the outside relative to the "region corresponding to a middle stream portion and subsequent portion of the fuel gas channel".

The size of this "vicinity of the region corresponding to a middle stream portion and subsequent portion of the fuel gas channel" varies according to the operation conditions and construction conditions of the fuel cell such as the thermal conductivity of the anode-side separator (constituent material), the temperature of the anode-side separator, the temperature and flow rate (flow amount) of reaction gas, the temperature and flow rate (flow amount) of cooling fluid (e.g., cooling water), and the output of power generation.

The "vicinity of the region corresponding to a middle stream portion and subsequent portion of the oxidant gas channel" of the cathode-side separator refers to a "surrounding region" of the "region corresponding to a middle stream portion and subsequent portion of the oxidant gas channel" where the water vapor of the reaction gas that flows into the cathode-side gap from the oxidant gas channel can be condensed to fill the cathode-side gap with the condensed water. This "surrounding region" can be on the inside relative to the "region corresponding to a middle stream portion and subsequent portion of the oxidant gas channel", or on the outside relative to the "region corresponding to a middle stream portion and subsequent portion of the oxidant gas channel".

The size of this "vicinity of the region corresponding to a middle stream portion and subsequent portion of the oxidant gas channel" varies according to the operation conditions and construction conditions of the fuel cell such as the thermal conductivity of the cathode-side separator (constituent material), the temperature of the cathode-side separator, the temperature and flow rate (flow amount) of reaction gas, the temperature and flow rate (flow amount) of cooling fluid (e.g., cooling water), and the output of power generation.

In a conventional fuel cell as described previously, the gas channels are formed in portions apart from "the region corresponding to the anode-side gap" and "the region corresponding to the cathode-side gap" of the separators so as to prevent gas leakage. However, through extensive study, the present inventors found that, even when gas channels are formed in portions apart from "the region corresponding to the gap" of the separators, gas leakage occurs through the gap, which leads to a decrease in power generation efficiency. As a result of extensive study, the present inventors found a way to use this "gas leakage" in a positive way. Specifically, they found that it is extremely effective to form the "upstream portion of the cooling fluid channel" of the separator to satisfy the conditions (I) and (II), to allow the water vapor in the reaction gas that flows into the gap (anode-side gap, cathode-side gap) formed between the gasket and the membrane electrode assembly to be condensed in at least a part of the gap and to allow at least one of the gaps with the condensed water, so as to achieve the above object. On the basis of this finding, the present invention has been accomplished.

In other words, in a fuel cell of the present invention, there is formed a portion in which the gap (anode-side gap, cathode-side gap) formed between the gasket and the membrane electrode assembly, the "upstream portion" of the cooling fluid channel where a cooling fluid having a relatively low temperature flows, and the "middle stream portion and subsequent portion" of the gas channel (fuel gas channel, oxidant gas channel) where a gas having a relatively large amount of moisture flows are arranged in proximity to one another to satisfy the conditions (I) and (II), whereby at least one of the gaps is filled with the condensed water, and therefore the reaction gas is more effectively utilized than conventional fuel cells.

Furthermore, in the present invention, the cooling fluid channel, the fuel gas channel and the oxidant gas channel are formed such that their main portions are substantially parallel to each other.

Thereby, regardless of whether the cooling fluid channel, the fuel gas channel and the oxidant gas channel are the same or different in number, in at least one MEA, when viewed in a plane parallel to the main surface of the separator, the entire flow direction (running direction) of the cooling fluid from upstream to downstream of the cooling fluid channel and the entire flow direction (running direction) of the reaction gas (fuel gas or oxidant gas) from upstream to downstream of the gas channel can be made substantially the same in an extremely easy manner.

As a result, because the downstream portion of the gas channel where a reaction gas having a large amount of water vapor flows corresponds to the downstream portion of the cooling fluid channel where a cooling fluid having a high temperature flows, the saturated vapor pressure ($P^0_{H2O}$) increases at the downstream side of the reaction gas flow, reducing excessive production of condensed water. Accordingly, the moisture content of the electrode surface is maintained at a favorable level, and it is possible to ensure the prevention of flooding at the catalyst layer of the gas diffusion electrode. In this case, by reducing the saturated vapor pressure ($P^0_{H2O}$) at the upstream side of the reaction gas flow, it is possible to further ensure the prevention of drying of the polymer electrolyte membrane. Further, in this case, because the upstream portion of the reaction gas flow having a higher concentration of reactant and a large reaction heat corresponds to the upstream portion of the cooling fluid flow having a low temperature, differences in temperature distribution over the main surface of the gas diffusion electrode can be reduced sufficiently, thereby enabling more efficient cooling of the fuel cell.

The condition "the cooling fluid channel, the fuel gas channel and the oxidant gas channel are formed such that their main portions are substantially parallel to each other" in the present invention is now explained.

First, in the present invention, in order to effectively use the main surface of the separator having a limited size, the cooling fluid channel, the fuel gas channel and the oxidant gas channel each comprise "long channels" extending from one end to the other end of the main surface of the separator and "short channels" comprising a curved portion for forming a turn to extend the long channel to the other end. From the viewpoint of effectively using the main surface of the separator having a limited size, particularly, in the present invention, as described later in embodiments, the cooling fluid channel, the fuel gas channel and the oxidant gas channel each preferably comprise a serpentine channel having straight channels (long channels) extending from one end to the other end of the main surface of the separator and turn portions (short channels) comprising a curved portion.

The condition "the cooling fluid channel, the fuel gas channel and the oxidant gas channel are formed such that their main portions are substantially parallel to each other" refers to a relation in which the "long channels" of the three channels (the cooling fluid channel, the fuel gas channel and the oxidant gas channel) are geometrically substantially parallel to each other except for "regions where the channels cannot be formed due to design limitation". The term "substantially parallel" encompasses conditions in which the channels are slightly deviated from the geometrically strictly parallel condition due to misalignment (assembly tolerance) caused during the alignment of a pair of facing separators with an MEA therebetween because it is difficult to achieve the geometrically strictly parallel condition due to limitations in production conditions. The running directions of fluid (cooling fluid, reaction gas) flows that flow through the channels arranged substantially parallel to each other can be the same (hereinafter may be referred to as "parallel flow") or opposite (hereinafter may be referred to as opposite flow). Even when the fluids flow in opposite directions to each other, as long as the entire flow direction (running direction) of the cooling fluid from upstream to downstream of the cooling fluid channel and the entire flow direction (running direction) of the reaction gas (fuel gas or oxidant gas) are substantially the same when viewed in a plane parallel to the main surface of the separator, the effects of the present invention such as prevention of drying of the polymer electrolyte membrane and efficient cooling of the fuel cell can be obtained (see, e.g., FIGS. 7 and 8).

The "regions where the channels cannot be formed due to design limitation" refers to regions where the "long channels" of the three channels (the cooling fluid channel, the fuel gas channel and the oxidant gas channel) cannot be formed to be geometrically substantially parallel to each other due to design limitations (α) and (β) described below.

(α) In order to form the three channels (the cooling fluid channel, the fuel gas channel and the oxidant gas channel) independently, the manifold aperture for supplying reaction gas and the manifold aperture for exhausting reaction gas, the manifold aperture for supplying cooling fluid and the manifold aperture for exhausting cooling fluid should be formed in different positions in a separator plate. For this reason, the portions connecting each manifold aperture and each channel are formed in different positions. Accordingly, in one separator, it is impossible to make the flow direction of the reaction gas and the flow direction of the cooling fluid completely the same. In other words, in such portions, the "long channels" of the three channels cannot be arranged substantially parallel to each other. This applies regardless whether the separator is a so-called external manifold type separator or so-called internal manifold type separator.

(β) When the gas channel formed on one main surface of a separator and the cooling fluid channel formed on the other main surface (or inside) of the separator have different numbers of "long channels" and "short channels", when viewed from a normal direction of the main surface of the separator, for example, a portion can be found in which a part of the "long channels" of the reaction gas channel overlaps with a part of the "short channels" of the cooling fluid channel. In this portion also, the three channels cannot be arranged substantially parallel to each other.

(γ) Because there is formed a portion in which the gap (anode-side gap, cathode-side gap) formed between the gasket and the membrane electrode assembly, the "upstream portion" of the cooling fluid channel where a cooling fluid having a relatively low temperature flows, and the "middle stream portion and subsequent portion" of the gas channel (fuel gas channel, oxidant gas channel) where a gas having a relatively large amount of moisture flows are formed in proximity to one another, in this portion also, the three channels cannot be arranged substantially parallel to each other.

As discussed above, according to the structure of the present invention, for example, by adjusting at least one of the operation conditions and geometric conditions of the gas channels {e.g., the shape of the cross section of the gas channel (the cross section substantially perpendicular to the gas flow direction), the perimeter length of the cross section of the gas channel, the groove width of the gas channel (the distance between ribs on the separator), the groove depth of the gas channel (the height of each rib of the separator), the length of the gas channel (the length between one end of the gas channel connected to the manifold aperture for supplying reaction gas to the other end thereof connected to the manifold aperture for exhausting reaction gas)}, the reaction gas can be used efficiently in the electrode reaction even when the gaps as described above are formed between the anode-side gasket and the end face of the anode and between the cathode-side gasket and the end face of the cathode. And, a fuel cell having sufficient power generation performance can be achieved with a simple structure.

In other words, for example, by appropriately adjusting the operation conditions of the fuel cell and geometric conditions of the gas channels such as (i) the water vapor pressure ($P_{H2O}$) of reaction gas at the inlet (i.e., a fuel gas in the manifold aperture for supplying fuel gas and an oxidant gas in the manifold aperture for supplying oxidant gas), (ii) the temperature and flow rate of cooling fluid, (iii) the utilization rate of reaction gas, and (iv) the geometric conditions of the gas channel and the pressure loss of the gas channel (difference in pressure value between the inlet and the outlet), the effects of the present invention can be obtained more easily and surely than conventional fuel cells.

Specifically, even if a reaction gas containing a large amount of water vapor flows into at least one of the anode-side gap formed between the anode-side gasket and the membrane electrode assembly and the cathode-side gap formed between the cathode-side gasket and the membrane electrode assembly during power generation, the water vapor contained in the reaction gas is effectively cooled by the upstream portion of the cooling fluid channel arranged in a position corresponding to the anode-side gap or cathode-side gap, and is condensed in at least a part of the gap, and the gap is filled with the condensed water. As a result, after the gap is filled, the reaction gas does not flow into the gap, so that the supply of the reaction gas to the anode surface or cathode surface is ensured. Accordingly, the reaction gas is efficiently used in the electrode reaction, and a fuel cell having sufficient power generation performance can be achieved with a simple structure.

Furthermore, even if the reaction gas flows into both the anode-side gap and the cathode-side gap, the water vapor contained in the reaction gas is effectively cooled by the upstream portion arranged in a position corresponding to the anode-side gap or cathode-side gap, and condensed in at least a part of the gap, and the gap is filled with the condensed water. Accordingly, after the gap is filled, the reaction will not flow into the gap, so that the supply of the reaction gas to the anode surface or cathode surface is ensured. Accordingly, the reaction gas is efficiently used in the electrode reaction, and a fuel cell having sufficient power generation performance can be achieved with a simple structure.

The term "reaction gas" as used in this specification includes a fuel gas, an oxidant gas, and a gas containing an unreacted reaction gas and a product produced from the electrode reaction involving the fuel gas and the oxidant gas.

The present invention further provides a fuel cell stack comprising a plurality of fuel cells stacked, wherein at least one fuel cell of the present invention as described above is incorporated into the fuel cell stack as a fuel cell.

Because the fuel cell stack of the present invention comprises at least one fuel cell of the present invention, it is possible to effectively utilize reaction gas in the electrode reaction while ensuring sufficient power generation efficiency with a simple structure.

Effect of the Invention

According to the present invention, even if a reaction gas containing a large amount of water vapor flows into at least one of the anode-side gap formed between the anode-side gasket and the membrane electrode assembly and the cathode-side gap formed between the cathode-side gasket and the membrane electrode assembly during power generation, the water vapor contained in the reaction gas is effectively cooled by the upstream portion of the cooling fluid channel arranged in a position corresponding to the anode-side gap or cathode-side gap, and is condensed in at least a part of the gap, and the gap is filled with the condensed water.

As a result, after the gap is filled, the reaction gas does not flow into the gap, so that the supply of the reaction gas to the anode surface or cathode surface is ensured. Accordingly, the reaction gas is efficiently used in the electrode reaction, and a fuel cell having significantly improved power generation performance can be provided.

Furthermore, because the present invention employs separators having a gas channel configured to increase the relative humidity of a gap formed between the membrane electrode assembly and a gasket, it is possible to prevent a reaction gas from flowing from the manifold aperture for supplying reaction gas to the manifold aperture for exhausting reaction gas through the gap without flowing through the anode or cathode. Accordingly, the entire reaction gas can be used for power generation, so that a fuel cell having high power generation efficiency can be provided.

Moreover, according to the present invention, it is possible to provide a fuel cell stack comprising the fuel cell of the present invention in which the reaction gas is efficiently used in the electrode reaction and sufficient power generation performance is ensured with a simple structure.

BRIEF DESCRIPTION OF THE DRAWINGS

FIG. 2 is a front view of a main surface of anode-side separator 6a of the fuel cell 10 shown in FIG. 1 as viewed from the side of cooling fluid channel 8a.

FIG. 3 is a front view of a main surface of anode-side separator 6a of the fuel cell 10 shown in FIG. 1 as viewed from the side of gas channel 7a.

FIG. 7 is a front view of a main surface of anode-side separator 6a of the fuel cell 10 shown in FIG. 1 as viewed from the side of cooling fluid channel 8a.

FIG. 8 is a front view of a main surface of anode-side separator 6a of the fuel cell 10 shown in FIG. 1 as viewed from the side of gas channel 7a.

FIG. 11 is a front view of a main surface of anode-side separator 26a to be incorporated into a fuel cell according to embodiment 2 of the present invention as viewed from the side of cooling fluid channel 8a.

FIG. 12 is a front view of a main surface of anode-side separator 26a to be incorporated into a fuel cell according to embodiment 2 of the present invention as viewed from the side of gas channel 7a.

FIG. 15 is a front view of a main surface of anode-side separator 46a to be incorporated into a fuel cell according to embodiment 3 of the present invention as viewed from the side of cooling fluid channel 8a.

FIG. 16 is a front view of a main surface of anode-side separator 46a to be incorporated into a fuel cell according to embodiment 3 of the present invention as viewed from the side of gas channel 7a.

FIG. 24 is a front view of a main surface of anode-side separator 6A to be incorporated into a fuel cell and a fuel cell stack according to embodiment 6 of the present invention as viewed from the side of gas channel 7a.

BEST MODE FOR CARRYING OUT THE INVENTION

Figure 1:
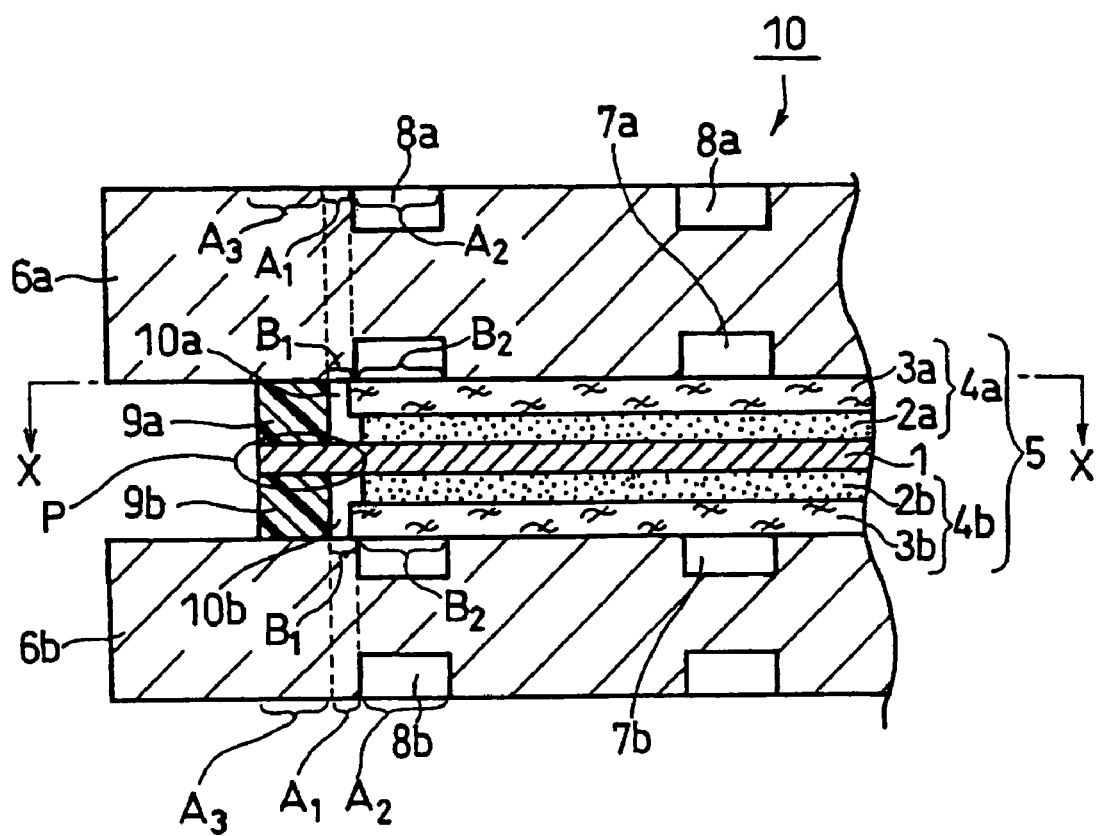
FIG. 1 is a schematic cross sectional view of a relevant part of a polymer electrolyte fuel cell according to embodiment 1 of the present invention illustrating a basic structure thereof.

Preferred embodiments of the present invention will be described with reference to the accompanying drawings. It should be understood that the same reference numerals are given to the same or corresponding parts, and some redundant descriptions may be omitted.

Embodiment 1

Figure 2:
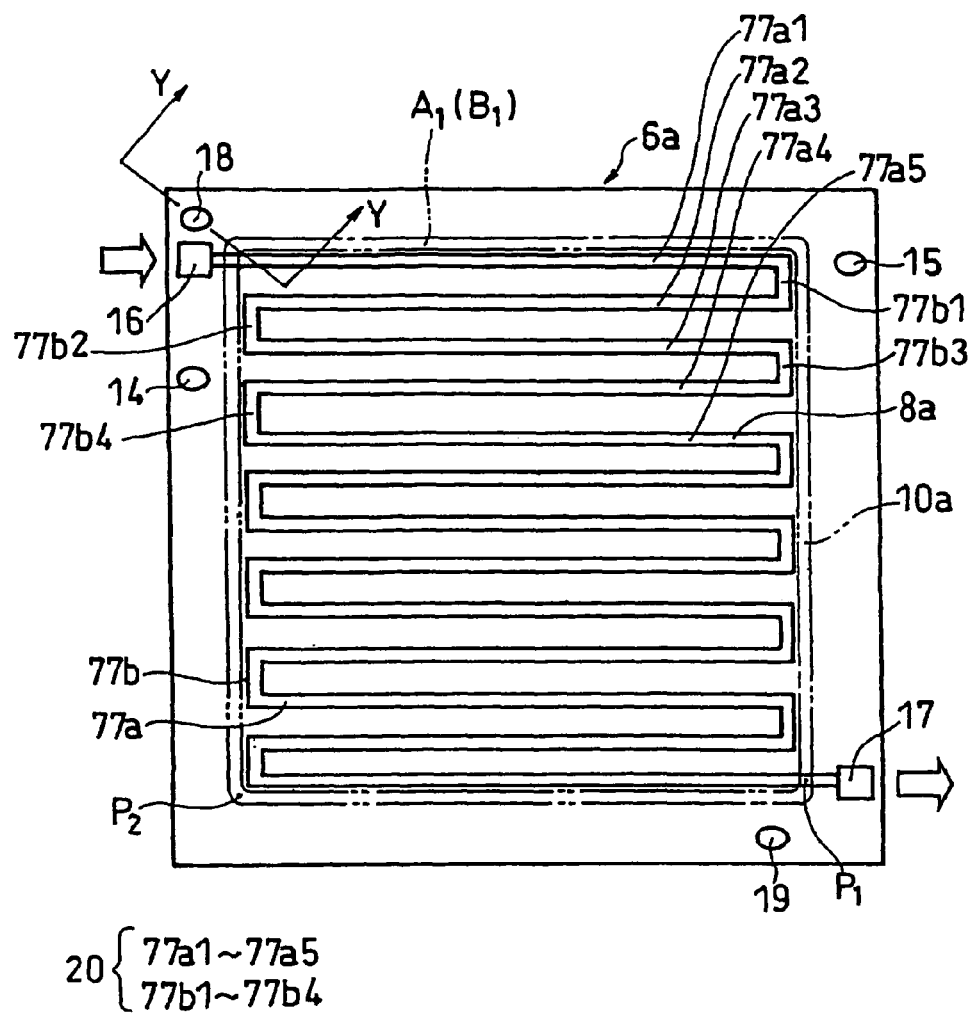
Figure 3:
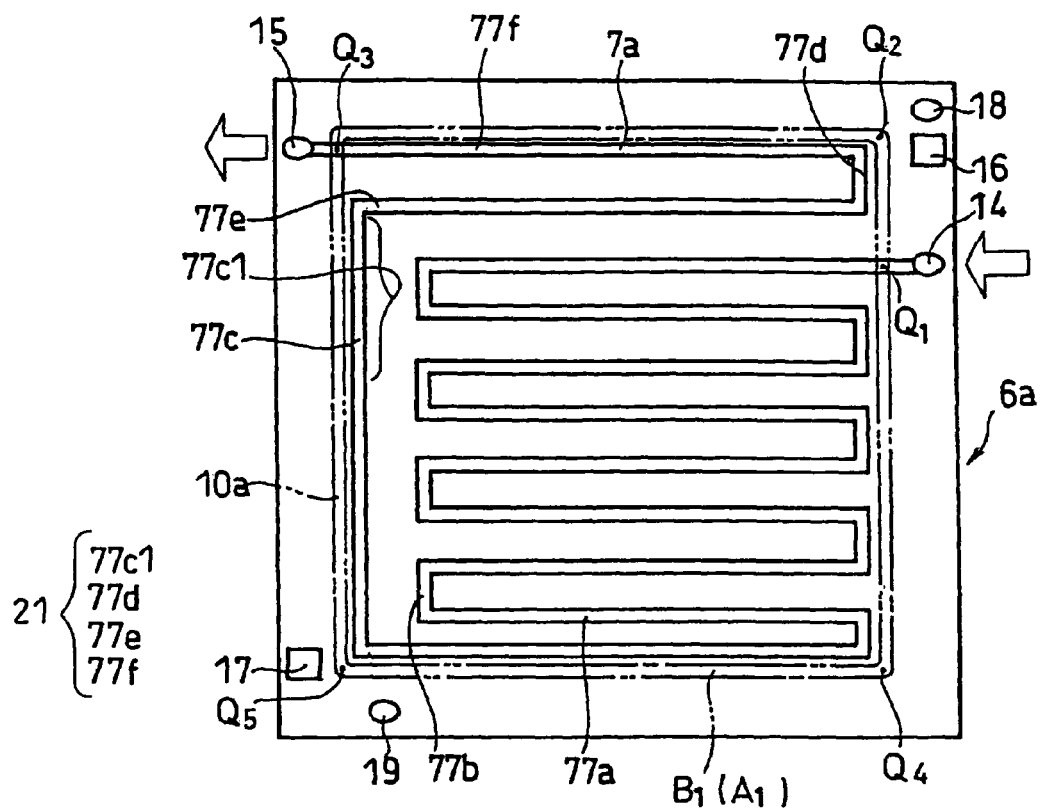
Figure 4:
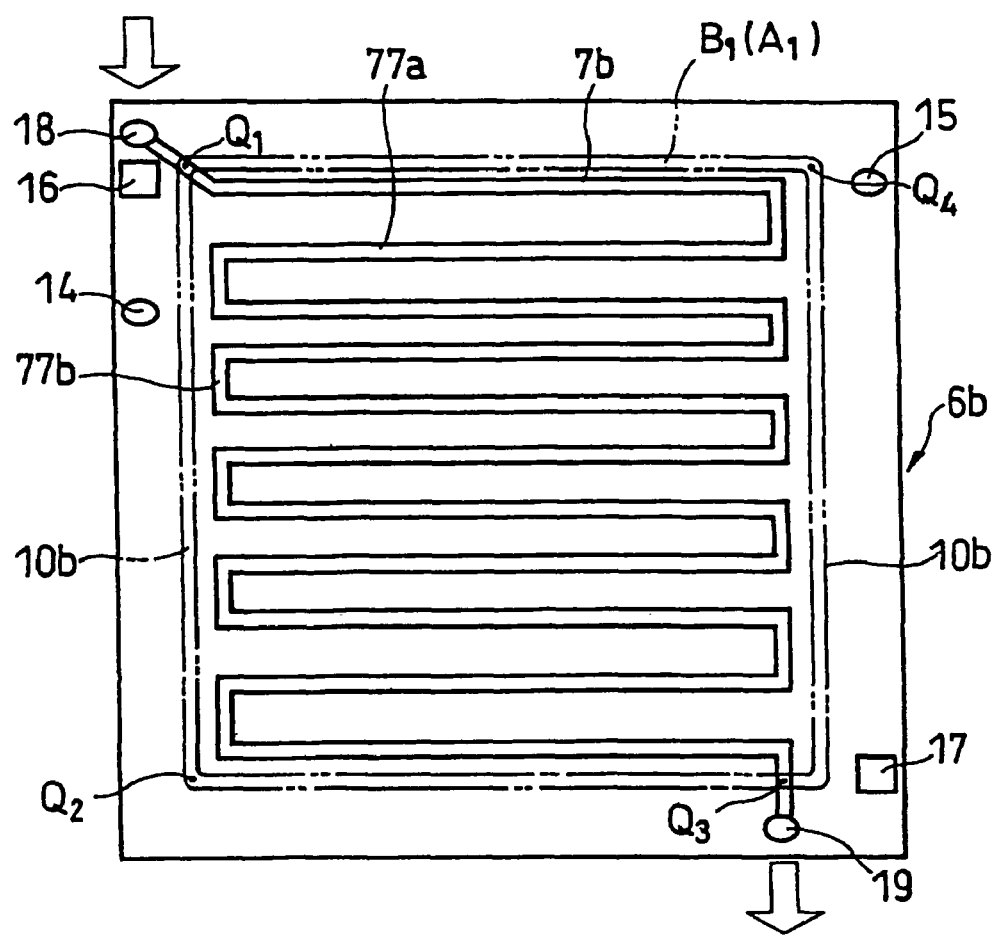
FIG. 4 is a front view of a main surface of cathode-side separator 6b of the fuel cell 10 shown in FIG. 1 as viewed from the side of gas channel 7b.
Figure 5:
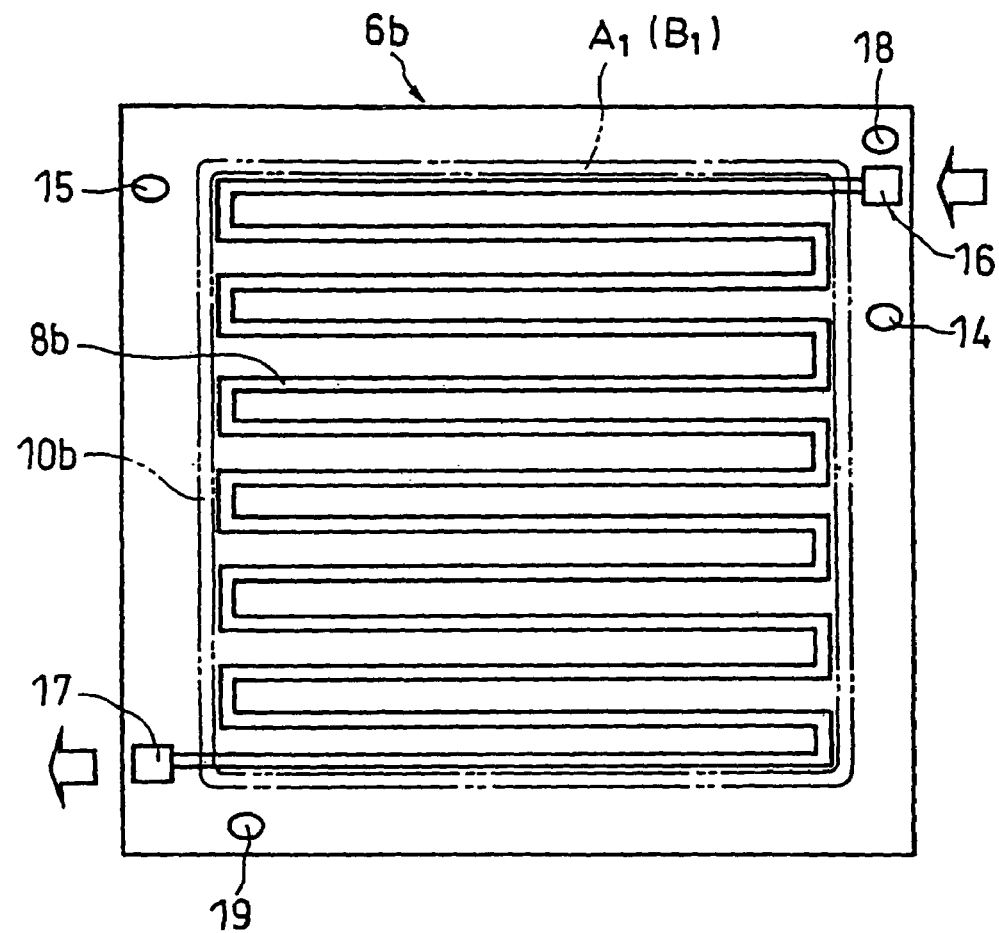
FIG. 5 is a front view of a main surface of cathode-side separator 6b of the fuel cell 10 shown in FIG. 1 as viewed from the side of cooling fluid channel 8b.

FIG. 1 is a schematic cross sectional view of a relevant part of a polymer electrolyte fuel cell according to embodiment 1 of the present invention illustrating a basic structure of the fuel cell. FIG. 2 is a front view of a main surface of anode-side separator 6a of the fuel cell 10 shown in FIG. 1 as viewed from the side of cooling fluid channel 8a. FIG. 3 is a front view of a main surface of anode-side separator 6a of the fuel cell 10 shown in FIG. 1 as viewed from the side of gas channel 7a. FIG. 4 is a front view of a main surface of cathode-side separator 6b of the fuel cell 10 shown in FIG. 1 as viewed from the side of gas channel 7b. FIG. 5 is a front view of a main surface of cathode-side separator 6b of the fuel cell 10 shown in FIG. 1 as viewed from the side of cooling fluid channel 8b.

Figure 6:
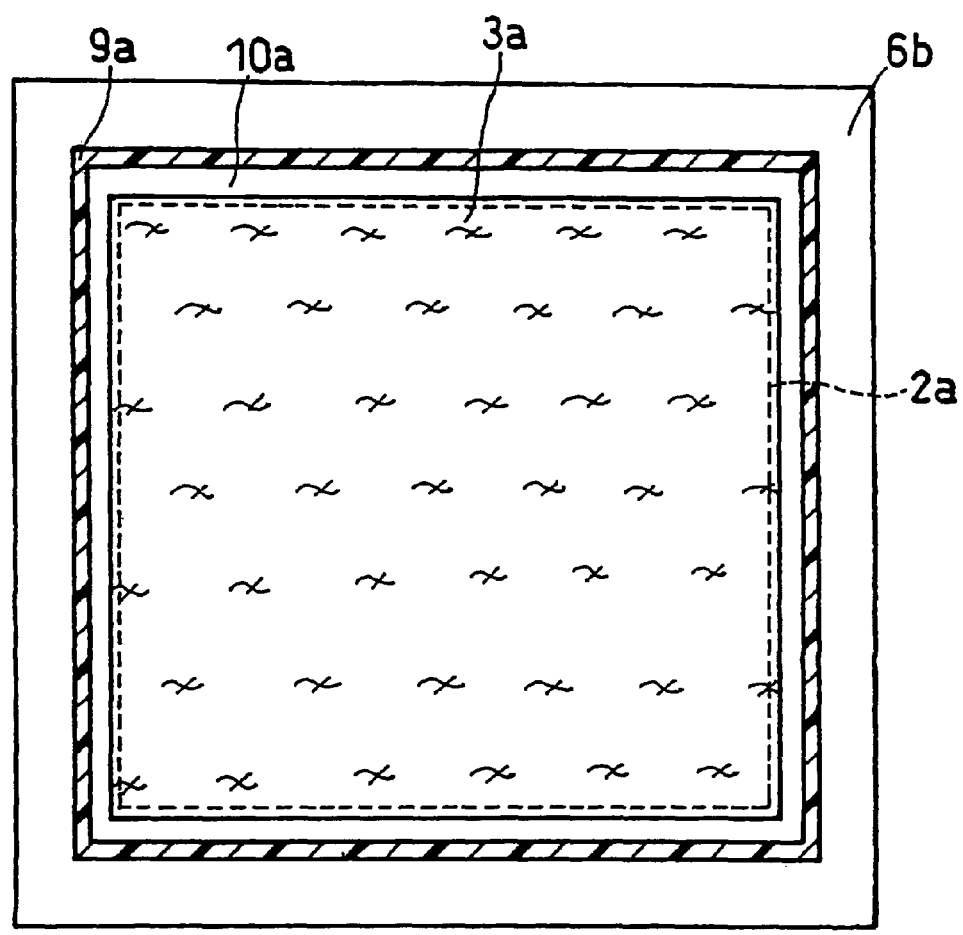
FIG. 6 is a cross sectional view of the fuel cell 10 taken on line X-X in FIG. 1 (a front view of a main surface of anode 4a of membrane electrode assembly 5 of the fuel cell 10 as viewed from a direction normal to the main surface of anode 4a with anode separator 6a removed).
Figure 7:
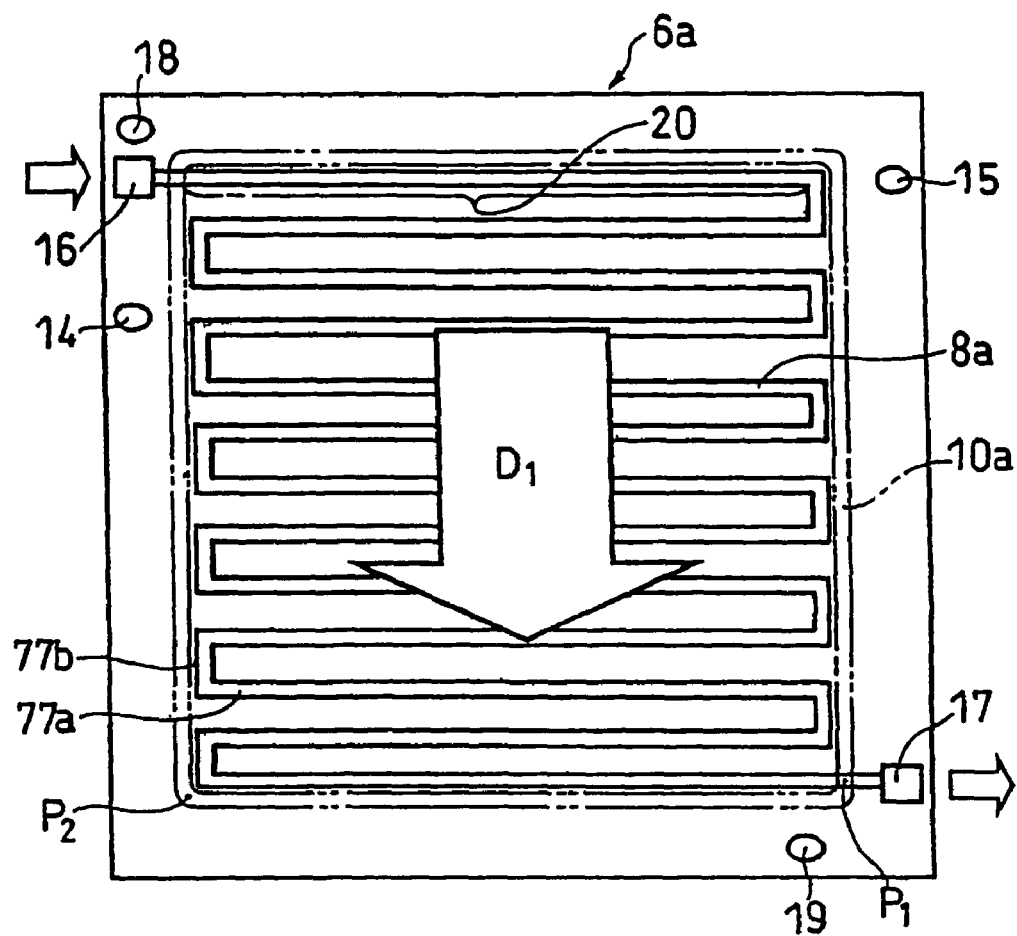
Figure 8:
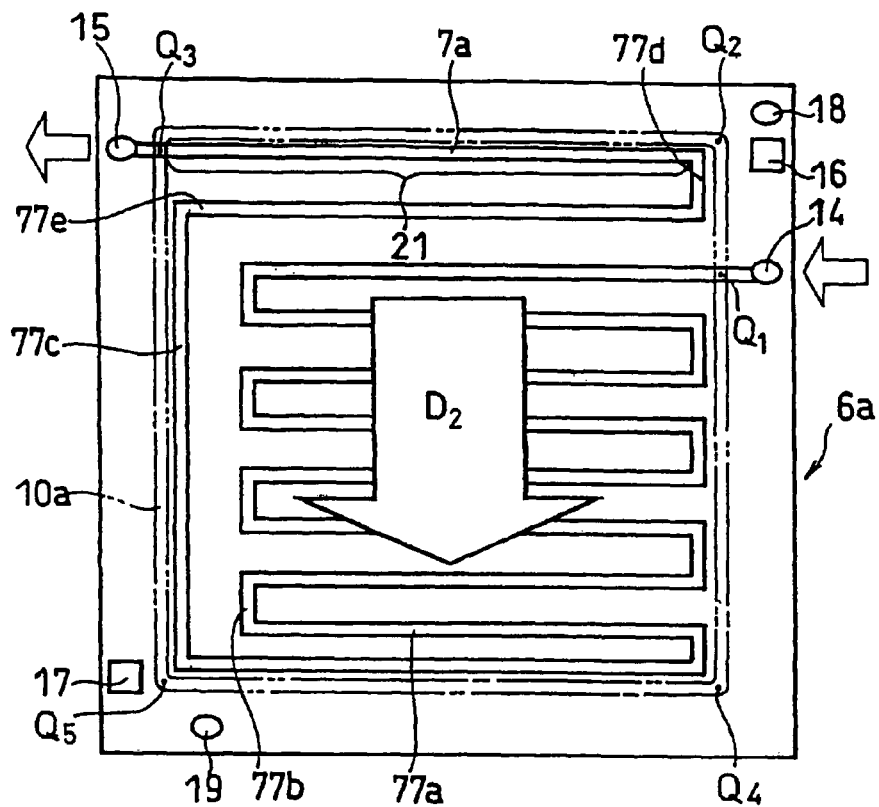
Figure 9:
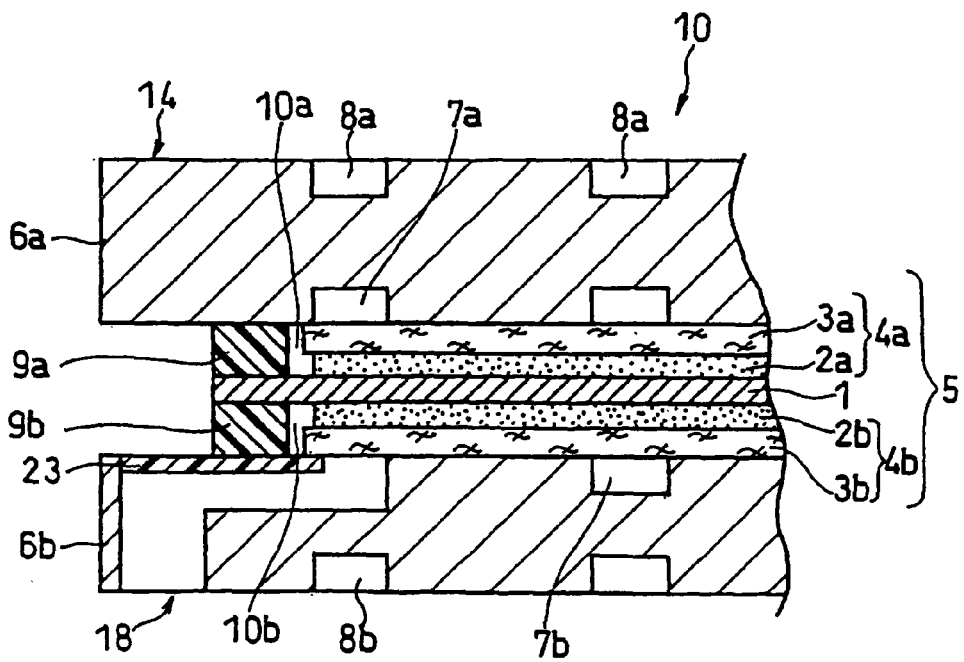
FIG. 9 is a schematic cross sectional view illustrating a cross section of the fuel cell 10 taken on line Y-Y in FIG. 2.
Figure 10:
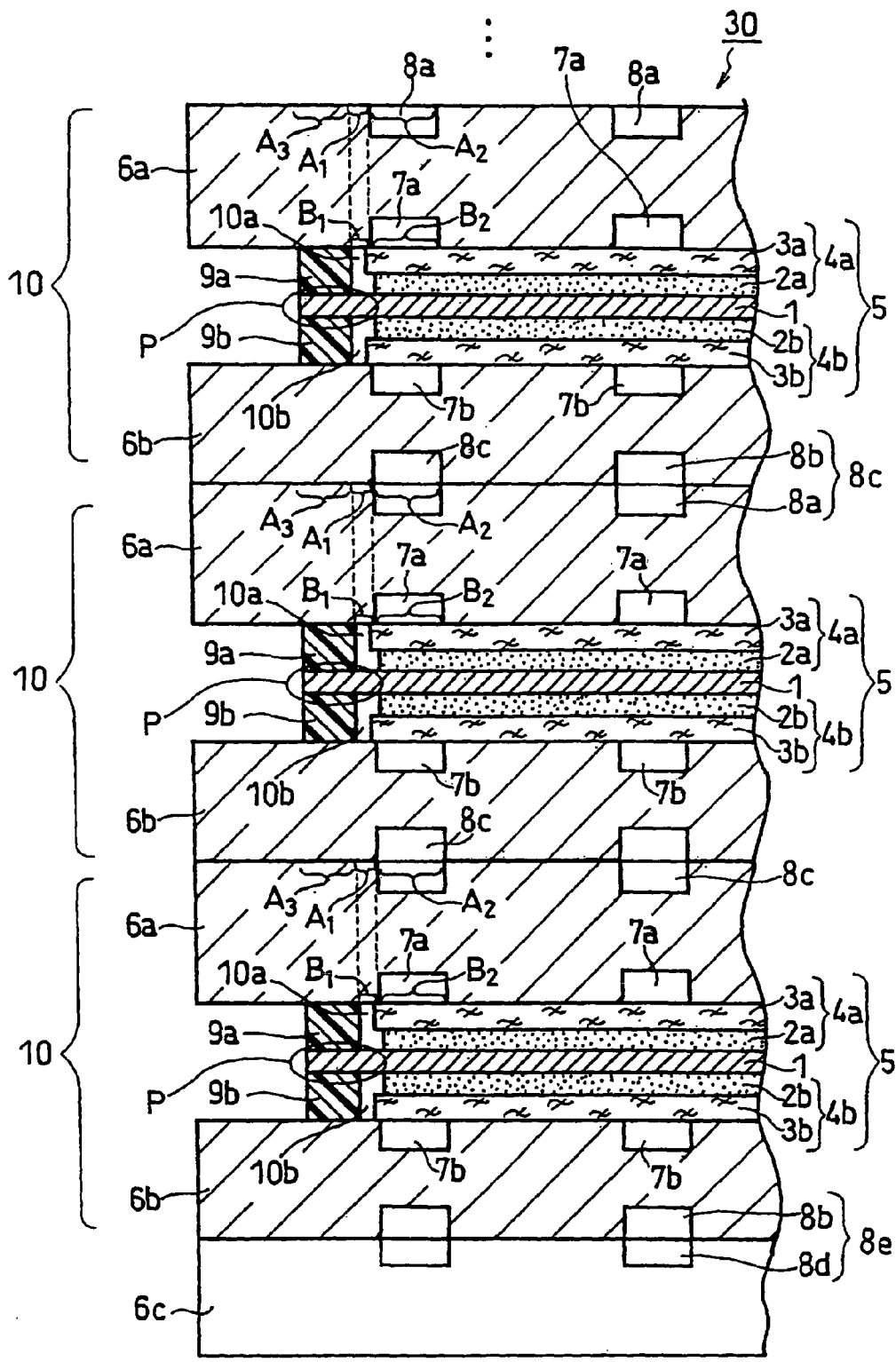
FIG. 10 is a schematic cross sectional view of a relevant part of a fuel cell stack (a fuel cell stack according to embodiment 1 of the present invention) comprising a plurality of fuel cells 10 shown in FIG. 1 illustrating a basic structure thereof.

FIG. 6 is a cross sectional view of the fuel cell 10 taken on line X-X in FIG. 1 (a front view of a main surface of anode 4a of membrane electrode assembly 5 of the fuel cell 10 with anode separator 6a removed as viewed in a direction normal to the main surface of anode 4a). FIG. 7 is a front view of a main surface of anode-side separator 6a of the fuel cell 10 shown in FIG. 1 as viewed from the side of cooling fluid channel 8a. FIG. 8 is a front view of a main surface of anode-side separator 6a of the fuel cell 10 shown in FIG. 1 as viewed from the side of gas channel 7a. FIG. 9 is a schematic cross sectional view illustrating a cross section of the fuel cell 10 taken on line Y-Y in FIG. 2. FIG. 10 is a schematic cross sectional view of a relevant part of a fuel cell stack (a fuel cell stack according to embodiment 1 of the present invention) comprising a plurality of fuel cells 10 shown in FIG. 1 illustrating a basic structure thereof.

The fuel cell 10 according to embodiment 1 shown in FIG. 1 comprises at least one unit cell including a membrane electrode assembly 5 (hereinafter may be referred to as "MEA 5"), a pair of separator plates for sandwiching the membrane electrode assembly 5 (namely, an anode-side separator 6a and a cathode-side separator 6b), an anode-side gasket 9a disposed around an anode 4a of the membrane electrode assembly 5, and a cathode-side gasket 9b disposed around a cathode 4b of the membrane electrode assembly 5.

As shown in FIG. 1, the membrane electrode assembly 5 consists mainly of a cation (hydrogen ion) conductive polymer electrolyte membrane 1 between the anode 4a and the cathode 4b.

The polymer electrolyte membrane 1 is a solid electrolyte and hydrogen ion conductive, and is capable of selectively transporting hydrogen ions. During power generation, in the membrane electrode assembly 9, the hydrogen ions produced at the anode 4a migrate through this polymer electrolyte membrane 1 to the cathode 4b.

The polymer electrolyte membrane 1 is not specifically limited, and any polymer electrolyte membrane used for conventional solid polymer electrolyte fuel cells can be used. For example, polymer electrolyte membranes made of perfluorocarbon sulfonic acid (Nafion (trade name) available from E.I. Du Pont de Nemours & Co. Inc., USA, Fleimon (trade name) available from Asahi Glass Co. Ltd., and GSII available from Japan Goretex Inc.) can be used.

Preferred examples of cation exchange group of the polymer electrolyte membrane 1 include sulfonic acid group, carboxylic acid group, phosphonic acid group, and sulfone imide group. From the viewpoint of proton conductivity, the polymer electrolyte membrane 1 preferably has a sulfonic acid group.

As the resin that constitutes the polymer electrolyte membrane having a sulfonic acid group, one having an ion exchange capacity of 0.5 to 1.5 meq/g dry resin is preferred. A polymer electrolyte membrane having an ion exchange capacity of not less than 0.5 meq/g dry resin is preferred because the increase in resistance value of the polymer electrolyte membrane during power generation can be reduced further. A polymer electrolyte membrane having an ion exchange capacity of not greater than 1.5 meq/g dry resin is also preferred because excellent gas diffusion characteristics in the catalyst layer can be easily ensured while the moisture content of the polymer electrolyte membrane is maintained. In light of the above, the ion exchange capacity is particularly preferably 0.8 to 1.2 meq/g dry resin.

The polymer electrolyte membrane preferably comprises a copolymer containing a polymerization unit based on a perfluorovinyl compound represented by $CF_2=CF-(OCF_2CFX)_m-O_p-(CF_2)_n-SO_3H$ (where m is an integer from 0 to 3, n is an integer from 1 to 12, p is 0 or 1, and X is a fluorine atom or trifluoromethyl group) and a polymerization unit based on tetrafluoroethylene.

Preferred examples of the fluorovinyl compound include compounds represented by the following formulas (1) to (3). In the formulas, q is an integer from 1 to 8, r is an integer from 1 to 8, and t is an integer from 1 to 3.

$$CF_2=CFO(CF_2)q\text{-}SO_3H \qquad (1)$$

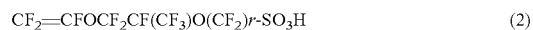
$$CF_2=CFOCF_2CF(CF_3)O(CF_2)r\text{-}SO_3H \qquad (2)$$

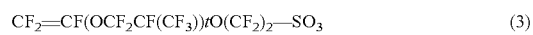
$$CF_2=CF(OCF_2CF(CF_3))tO(CF_2)_2-SO_3 \qquad (3)$$

The polymer electrolyte membrane 1 may comprise one polymer electrolyte or a plurality of polymer electrolytes.

From the viewpoint of ensuring sufficient mechanical strength, the polymer electrolyte membrane 1 may further comprise a reinforcing member (filler) that can ensure hydrogen ion conductivity inside thereof. Examples of material for such reinforcing member include polytetrafluoroethylene and polyfluoroalkoxyethylene. The reinforcing member can be a porous member having pores capable of holding a polymer electrolyte (having hydrogen ion conductivity) therein, or a reinforcing member comprising a fibrillated fiber.

As used herein, the fibrillated fiber refers to a fiber having projecting fibrils (small fibers) on the surface thereof (i.e., fibrillated) in which very fine air spaces (pores) are formed between the fibrils. For example, cellulose fibers comprise a bundle made of a plurality of fibers, and there are very fine air spaces (pores) between the fibrils.

As shown in FIG. 1, the cathode 4b consists mainly of a catalyst layer 2b (cathode catalyst layer 2b) disposed on a main surface of the polymer electrolyte membrane 1 and a gas diffusion layer 3c (cathode diffusion layer 3c) disposed outside the catalyst layer 2b.

The composition of the catalyst layer 2b is not specifically limited as long as the effect of the present invention is obtained. It may have the same composition as a catalyst layer for gas diffusion electrodes incorporated in conventional fuel cells. For example, the cathode catalyst layer 2b may comprise a conductive carbon particle carrying an electrode catalyst thereon and a cation (hydrogen ion) conductive polymer electrolyte. It may further comprise a water repellent material such as polytetrafluoroethylene. The polymer electrolyte can be the same polymer electrolyte for the polymer electrolyte membrane 1 or different types of polymer electrolytes. As the polymer electrolyte, those listed for the polymer electrolyte membrane 1 can be used.

The cathode electrode catalyst is made up of a metal particle (e.g., a metal particle comprising a noble metal). The cathode electrode catalyst is carried on a conductive carbon particle (powder) before use. The metal particle is not specifically limited, and various metals can be used. From the viewpoint of electrode reaction activity, the metal particle is preferably at least one selected from the group consisting of platinum, gold, silver, ruthenium, rhodium, palladium, osmium, iridium, chromium, iron, titanium, manganese, cobalt, nickel, molybdenum, tungsten, aluminum, silicon, zinc and tin.

More preferably, the electrode catalyst particle has an average particle size of 1 to 5 nm. An electrode catalyst having an average particle size of not less than 1 nm is preferred because it can be easily prepared even on an industrial scale. An electrode catalyst having an average particle size of not greater than 5 nm is also preferred because the activity per weight of electrode catalyst can be more easily ensured, which leads to cost reduction of the fuel cell.

The conductive carbon particle preferably has a specific surface area of 50 to 1500 $m^2/g$. A specific surface area of not less than 50 $m^2/g$ is preferred because the electrode catalyst-carrying ratio can be increased and the output characteristics of the obtained cathode catalyst layer 2b can be further ensured. A specific surface area of not greater than 1500 $m^2/g$ is also preferred because pores having a sufficient size can be easily ensured and the carbon particle can be easily covered with the polymer electrolyte, and the output characteristics of the cathode catalyst layer 2b can be further ensured. In light of the above, the specific surface area is particularly preferably 200 to 900 $m^2/g$.

The conductive carbon particle preferably has an average particle size of 0.1 to 1.0 μm. An average particle size of not less than 0.1 μm is preferred because the gas diffusibility of the cathode catalyst layer 2b can be more easily ensured, which further ensures the prevention of flooding. An average particle size of not greater than 1.0 μm is also preferred because the condition in which the polymer electrolyte covers the electrode catalyst can be easily brought to good condition, making it easy to increase the area of the electrode catalyst covered by the polymer electrolyte. As a result, sufficient electrode performance is easily ensured.

As the gas diffusion layer 3b, in order to impart gas permeability, a porous conductive substrate made of a carbon fine powder having a high surface area, a pore forming agent, a carbon paper or a carbon cloth can be used. From the viewpoint of imparting sufficient water permeability, a water repellent polymer such as fluorocarbon resin may be dispersed in the gas diffusion layer 3b. From the viewpoint of imparting sufficient electron conductivity, the gas diffusion layer 3b may comprise an electron conductive material such as carbon fiber, metal fiber or carbon fine powder.

As shown in FIG. 1, the anode 4a consists mainly of a catalyst layer 2a (anode catalyst layer 2a) disposed on a main surface of the polymer electrolyte membrane 1 and a gas diffusion layer 3a (anode gas diffusion layer 3a) disposed outside the catalyst layer 2a.

The catalyst layer 2a comprises a catalyst carrying carbon obtained by allowing a carbon powder to carry an electrode catalyst and a hydrogen ion conductive polymer electrolyte. The anode electrode catalyst is not specifically limited, and any anode electrode catalyst for known polymer electrolyte fuel cells can be used. For example, a metal fine particle containing Pt as its constituent element can be used. In order to impart excellent durability to carbon monoxide, a metal fine particle containing Pt and Ru as its constituent elements may be used.

The composition of the gas diffusion layer 3a is not specifically limited as long as the effect of the present invention is obtained. It may have the same composition as a gas diffusion layer for gas diffusion electrodes incorporated in conventional fuel cells. For example, it may have the same composition as the gas diffusion layer 3b (cathode gas diffusion layer 3b). The gas diffusion layer 3a may have the same composition as or a different composition from the gas diffusion layer 3b.

As shown in FIGS. 1, 6 and 9, in the MEA 5, in order to dispose the anode-side gasket 9a and the cathode-side gasket 9b for preventing gas leakage, the main surface of the polymer electrolyte membrane 1 is larger than those of the anode 4a and the cathode 4b. At the same time, the entire periphery of the polymer electrolyte membrane 1 (the area indicated by the letter P in FIG. 1) extends outwardly beyond the peripheries of the anode 4a and the cathode 4b. The polymer electrolyte membrane 1 (its main surface) is present extending throughout the anode-side gap 10a formed by the anode-side gasket 9a and the anode 4a (i.e., the gas diffusion layer 3a and the catalyst layer 2a), though not shown in FIG. 9. As explained previously, in this specification, the periphery P of the polymer electrolyte membrane 1 that extends outwardly beyond the peripheries of the anode 4a and the cathode 4b is also called "protruding portion".

A description is now given of the anode-side separator 6a and the cathode-side separator 6b. The anode-side separator 6a and the cathode-side separator 6b are conductive and function to mechanically fix the MEA 5. When a plurality of unit cells are stacked, they also function to electrically connect adjacent MEAs 5 in series to each other.

On one surface of the anode 4a (i.e., the main surface of the anode-side separator 6a to be in contact with the MEA 5) is formed a gas channel 7a for supplying a reaction gas (fuel gas) and removing a gas containing an electrode reaction product and unreacted reaction gas to the outside of the MEA 5.

On one surface of the cathode 4b (i.e., the main surface of the cathode-side separator 6b to be in contact with the MEA 5) is formed a gas channel 7b for supplying a reaction gas (oxidant gas) and removing a gas containing an electrode reaction product and unreacted reaction gas to the outside of the MEA 5.

On the other main surface of the anode-side separator 6a opposite to the main surface of the same having a gas channel 7a formed thereon is formed a cooling fluid channel 8a for introducing a cooling fluid (e.g., cooling water) for adjusting the cell temperature during power generation to a constant level. On the other main surface of the cathode-side separator 6b opposite to the main surface of the same having a gas channel 7b formed thereon is formed a cooling fluid channel 8b for introducing a cooling fluid (e.g., cooling water) for adjusting the cell temperature during power generation to a constant level. By allowing the cooling fluid to circulate between the fuel cell 10 and a heat exchanger (not shown) disposed outside the fuel cell, a thermal energy produced by the reaction can be utilized in the form of warm water or the like.

The gas channel 7a is formed by providing a groove on the main surface of the anode-side separator 6a to be in contact with the MEA 5 because the simplification of production process is achieved. For the same reason, the cooling fluid channel 8a is also formed by providing a groove on the main surface of the anode-side separator 6a opposite to the main surface of the same having the gas channel 7a formed thereon. Moreover, for the same reason, the cooling fluid channel 8b is also formed by providing a groove on the main surface of the cathode-side separator 6b opposite to the main surface of the same having the gas channel 7a formed thereon.

In the fuel cell 10 according to embodiment 1, as shown in FIG. 5, the cooling fluid channel 8b of the cathode-side separator 6b has the same shape as the cooling fluid channel 8a of the anode-side separator 6a shown in FIG. 2.

Since the voltage value that a single fuel cell 10 can output is limited (theoretically, about 1.23 V when a hydrogen gas is used as the reducing agent and oxygen is used as the oxidant), the fuel cell 10 is usually used as a unit cell of a fuel cell stack 30 as shown in FIG. 10 so as to provide a desired output voltage according to operating environment. The fuel cell stack 30 shown in FIG. 10 comprises the fuel cells 10 shown in FIGS. 1 to 9.

As shown in FIG. 10, the fuel cell stack 30 is obtained by disposing the anode-side separator 6a and the cathode-side separator 6b between each adjacent pair of a plurality of MEAs 5, and electrically connecting the plurality of MEAs 5 in series. In this case, the construction of the fuel cell stack 30 further requires a manifold for branching a reaction gas supplied to the fuel cell stack 30 through an external gas line (not shown) and supplying the reaction gas to each MEA 5, a manifold for exhausting all the gas exhausted from each of the MEAs 5 to the outside of the fuel cell stack 30, a manifold for branching a cooling fluid supplied to the fuel cell stack 30 through an external pipe (not shown) into a required number and supplying it to at least one of the anode-side separator 6a and the cathode-side separator 6b.

Accordingly, as shown in FIGS. 2, 3, 4 and 5, a manifold aperture 14 for supplying fuel gas, a manifold aperture 15 for exhausting fuel gas, a manifold aperture 16 for supplying cooling fluid, a manifold aperture 17 for exhausting cooling fluid, a manifold aperture 18 for supplying oxidant gas, and a manifold aperture 19 for exhausting oxidant gas are formed in the anode-side separator 6a and the cathode-side separator 6b.

In the anode-side separator 6a of each fuel cell 10, one end of the cooling fluid channel 8a is connected to the manifold aperture 16 for supplying cooling fluid, and the other end is connected to the manifold aperture 17 for exhausting cooling fluid. Likewise, in the anode-side separator 6a of each fuel cell, one end of the gas channel 7a is connected to the manifold aperture 14 for supplying fuel gas, and the other end is connected to the manifold aperture 15 for exhausting fuel gas. In the cathode-side separator 6b of each fuel cell 10, one end of the cooling fluid channel 8b is connected to the manifold aperture 16 for supplying cooling fluid, and the other end is connected to the manifold aperture 17 for exhausting cooling fluid. In the cathode-side separator 6b of each fuel cell, one end of the gas channel 7b is connected to the manifold aperture 18 for supplying oxidant gas, and the other end is connected to the manifold aperture 19 for exhausting oxidant gas.

In other words, the fuel cell 10 of the present invention has a structure called "internal manifold type" in which manifolds are formed in the separators.

In this fuel cell 10, as shown in FIGS. 2 and 3, the anode-side separator 6a has the following structure so as to achieve the effect of the present invention. Specifically, in the anode-side separator 6a, there is formed a portion in which the anode-side gap 10a formed between the anode-side gasket 9a and the MEA 5, the "upstream portion" of the cooling fluid channel 8a and the "middle stream portion and subsequent portion" of the fuel gas channel 7a (particularly, the downstream portion in this fuel cell 10) are formed in proximity to one another to satisfy the conditions (I) and (II). Thereby, the anode-side gap 10a is filled with condensed water, and therefore the reaction gas is more efficiently used than conventional fuel cells.

In the fuel cell stack 30, a manifold for supplying fuel gas (not shown) is formed by aligning a plurality of manifold apertures 14 for supplying fuel gas of the anode-side separators 6a and cathode-side separators 6b of the fuel cells 10 which are successively stacked to form the fuel cell stack 30. Further, in the fuel cell stack 30, a manifold for exhausting fuel gas (not shown) is formed by aligning a plurality of manifold apertures 15 for exhausting fuel gas of the anode-side separators 6a and cathode-side separators 6b of fuel cells 10 which are successively stacked to form the fuel cell stack 30. Further, in the fuel cell stack 30, other manifolds (not shown) are formed in the same manner as the manifold for supplying fuel gas described above by aligning the manifold apertures 16 for supplying cooling fluid, the manifold apertures 17 for exhausting cooling fluid, the manifold apertures 18 for supplying oxidant gas, and the manifold apertures 19 for exhausting oxidant gas, respectively.

FIG. 6 is a cross sectional view of the fuel cell 10 taken on line X-X in FIG. 1 (i.e., a front view as viewed from a normal direction of the main surface of MEA 5 with anode-side separator 6a removed). As shown in FIGS. 1 and 6, in the fuel cell of the present invention, in order to prevent leakage of reaction gas (e.g., leakage of fuel gas to the cathode 4b, leakage of oxidant gas to the anode 4a, leakage of reaction gas to the outside of the MEA 5), a pair of opposing gaskets having gas sealing function, namely, an anode-side gasket 9a and a cathode-side gasket 9b, are disposed on the periphery (i.e., the protruding portion P of the polymer electrolyte membrane 1 that is positioned outside the anode 4a and the cathode 4b) of the MEA 5 between the opposing anode-side separator 6a and cathode-side separator 6b.

These anode-side gasket 9a and cathode-side gasket 9b have, for example, a continuous circular member structure (ring structure) having a substantially rectangular cross section, and they sandwich the entire protruding portion P of the polymer electrolyte membrane 1. And, a single enclosed space that surrounds the anode 4a is formed by the anode-side separator 6a, the polymer electrolyte membrane 1 and the anode-side gasket 9a. Likewise, another enclosed space that surrounds the cathode 4b is formed by the cathode-side separator 6b, the polymer electrolyte membrane 1 and the cathode-side gasket 9b. These enclosed spaces function to prevent the reaction gas supplied to the anode 4a and the cathode 4b from leaking.

The material for the anode-side gasket 9a and the cathode-side gasket 9b is not specifically limited as long as it has gas sealing function, and any known material for use in gaskets for polymer electrolyte fuel cells can be used. For example, the anode-side gasket 9a and the cathode-side gasket 9b can be produced using O-rings, rubber sheets (e.g., sheets made of fluoro rubber), composite sheets composed of an elastic resin and a rigid resin, fluorine-containing synthetic resin sheet, etc., by conventionally known methods.

However, as described previously, when disposing the anode-side gasket 9a and the cathode-side gasket 9b in the position described above, tolerances occur during the fabrication and assembly of members. For this reason, it is very difficult to bring the anode-side gasket 9a and the cathode-side gasket 9b into sufficiently close contact with the end faces of the anode 4a and the cathode 4b, respectively. As a result, as shown in FIG. 1, gaps (namely, an anode-side gap 10a and a cathode-side gap 10b) are likely to occur between the anode-side gasket 9a and the anode 4a and between the cathode-side gasket 9b and the cathode 4b.

In other words, in the fuel cell 10, the anode-side gap 10a comprises a space formed by the polymer electrolyte membrane 1, the anode-side gasket 9a, the anode-side separator 6a and the end face of the anode 4a. Likewise, in the fuel cell 10, the cathode-side gap 10b comprises a space formed by the polymer electrolyte membrane 1, the cathode-side gasket 9b, the cathode-side separator 6b and the end face of the cathode 4b.

When such anode-side gap 10a and cathode-side gap 10b are formed, (part of) reaction gas leaks and flows into the anode-side gap 10a or the cathode-side gap 10b without flowing through the gas channel 7a or the gas channel 7b. Also, (part of) reaction gas flows through the anode-side gap 10a or cathode-side gap 10b to the outside of the MEA 5 without flowing through the anode 4a or cathode 4b. Accordingly, it has been considered difficult to maintain efficient power generation performance, and this problem could not be solved sufficiently by conventional techniques.

In view of this, as shown in FIGS. 1, 2 and 3, in the fuel cell 10, in order to allow the water vapor contained in the reaction gas that flows into the anode-side gap 10a formed between the anode-side gasket 9a and the membrane electrode assembly 5 to condense in at least a part of the anode-side gap 10a, and to allow the condensed water to fill the anode-side gap 10a, the upstream portion of the cooling fluid channel 8a is formed in a region corresponding to the anode-side gap 10a such that it includes a region corresponding to a middle stream portion and subsequent portion of at least one of the fuel gas channel and the oxidant gas channel.

In FIG. 2, the "region corresponding to the anode-side gap 10a" is a region including the region $A_1$ indicated by one-dot lines in FIG. 2, the regions $A_2$ (which is located on the inside relative to the region $A_1$) and $A_3$ (which is located on the outside relative to the region $A_1$) surrounding the region $A_1$. In the fuel cell 10, as shown in FIGS. 1 and 2, the upstream portion of the cooling fluid channel 8a is formed such that a part of the upstream portion is located in the region $A_2$ of the "region corresponding to the anode-side gap 10a". Further, as shown in FIGS. 1 and 2, the middle stream and subsequent portion of the gas channel 7a of the anode-side separator 6a is formed such that a part of the middle stream and subsequent portion is located in a region $B_2$ of FIG. 1. This region $B_2$ is also a part of the "region corresponding to the anode-side gap 10a", and it overlaps with the region $A_2$ when viewed from a normal direction of the main surface of the MEA 5. As described previously, the size of this "region corresponding to the anode-side gap 10a" varies according to the operation conditions and construction conditions of the fuel cell such as the thermal conductivity of the anode-side separator (constituent material), the temperature of the anode-side separator, the temperature and flow rate (flow amount) of reaction gas, the temperature and flow rate (flow amount) of cooling fluid (e.g., cooling water), and the output of power generation.

Particularly, in the anode-side gap 10a, the region 20 near the manifold aperture 16 for supplying cooling fluid having the lowest temperature in the upstream portion of the cooling fluid channel 8a shown in FIG. 2 and the region 21 near the manifold aperture 15 for exhausting fuel gas having the highest moisture content in the middle stream portion and subsequent portion of the gas channel 7a shown in FIG. 3 are arranged in proximity to a part of the region corresponding to the anode-side gap 10a. Thereby, the anode-side gap 10a can be filled with condensed water, and therefore the reaction gas is more effectively utilized than conventional fuel cells.

As shown in FIG. 10, in the fuel cell stack 30, the cooling fluid channel 8b of the cathode-side separators 6b has the same shape as the cooling fluid channel 8a of the anode-side separator 6a shown in FIG. 2, the entire cooling fluid channel 8a of the anode-side separator 6a and the entire cooling fluid channel 8b of the cathode-side separator 6b disposed between two adjacent MEAs 5 are combined to form a cooling fluid channel 8c. More specifically, the cooling fluid channels 8a and 8b are in a mirror image relationship to each other in the contact face between the anode-side separator 6a and the cathode-side separator 6b. Each cooling fluid channel 8c shown in FIG. 5 have the same effect on each anode-side separator 6a adjacent to each cooling fluid channel 8c as the cooling fluid channel 8a described above.

In the fuel cell stack 30 shown in FIG. 5, on the outer surface of the fuel cell 10 disposed at an end of the fuel cell stack 30 is disposed an end separator 6C. As shown in FIG. 5, when the separator disposed on the outer surface of the fuel cell disposed at an end of the fuel cell stack 30 is the cathode-side separator 6b, a cooling fluid channel 8d is formed on the inner surface of the end separator 6C disposed on the outer surface of the cathode-side separator 6b so as to form a cooling fluid channel 8e by combining with the entire cooling fluid channel 8b.

More specifically, the cooling fluid channels 8b and 8d are in a mirror image relationship to each other in the contact face between the cathode-side separator 6b and the end separator 6C.

By disposing the end separator 6C, the cooling fluid channel of the outside separator of the fuel cell 10 disposed at an end of the stack can be used as a cooling fluid channel. When the fuel cell 10 can be cooled sufficiently without the use of the cooling fluid channel of the outside separator of the fuel cell 10 disposed at an end of the stack, the cooling fluid channel (the cooling fluid channel 8e in FIG. 10) for flowing cooling fluid need not be formed. Another end separator having protrusions that fit into the cooling fluid channel of the outside separator of the fuel cell 10 disposed at an end of the stack may be disposed. Alternatively, instead of the end separator 6C, a plate-like separator without a cooling fluid channel (the cooling fluid channel 8d in FIG. 10) may be disposed in place of the outside separator of the fuel cell 10 disposed at the end of the stack. The end separator may further function as a current collector plate. Alternatively, a flat end separator without the cooling fluid channel 8e may be disposed in place of the end separator 6C of FIG. 10.

In the fuel cell 10 and the fuel cell stack 30 according to this embodiment having a structure as described above, a reaction gas having a large amount of water vapor flows into the anode-side gap 10a formed between the anode-side gasket 9a and the membrane electrode assembly 5. Generally, the moisture contained in the reaction gas starts to condense when the dew point of the gas rises above ambient temperature. In the fuel cell 10 and the fuel cell stack 30, because the upstream portion 20 of the cooling fluid channel 8a and the upstream portion of the cooling fluid channel 8b (not shown) are formed in the region corresponding to the anode-side gap 10a such that they include a region corresponding to the middle stream portion and subsequent portion of the fuel gas channel 7a, the water vapor contained in the reaction gas is effectively cooled by the upstream portions where a cooling fluid immediately after the supply having the lowest temperature flows. Accordingly, the water vapor condenses in at least a part of the anode-side gap 10a, and the anode-side gap 10a is filled with the condensed water.

Like this fuel cell 10, it is important to improve the utilization rate of reaction gas (fuel gas) in the anode that uses a high-cost gas such as a reformed gas composed mainly of hydrogen obtained by reforming a fossil fuel or a hydrogen gas obtained through the electrolysis of water rather than the cathode that uses air as a reaction gas.

As a result of the water condensation in the anode-side gap 10a, the reaction gas does not flow into the portions except the gas channels 7a and 7b, that is, the anode-side gap 10a, ensuring the supply of the reaction gas to the gas channel 7a and the gas channel 7b. Accordingly, efficient use of reaction gas is achieved, improving power generation performance.

In the anode-side separator 6a shown in FIG. 2, in order to effectively use the main surface (substantially rectangular main surface) of the anode-side separator 6a having a limited size, the cooling fluid channel 8a extends from the manifold aperture 16 for supplying cooling fluid to the portion corresponding to the anode 4a (electrode area, i.e., a portion corresponding to the area being in contact with the electrode and surrounded by the inner one of two one-dot chain lines in FIG. 2), intersecting the anode-side gap 10a with the shortest distance from the manifold aperture 16. In order to effectively use the main surface of the anode-side separator 6a, the cooling fluid channel 8a has a serpentine structure. To explain more specifically, the cooling fluid channel 8a has thirteen straight portions 77a (long channels) extending in a horizontal direction (a direction substantially parallel to a side of the anode-side separator 6a where the manifold aperture 18 for supplying oxidant gas and the manifold aperture 15 for exhausting fuel gas are formed), twelve turn portions 77b (short channels) for connecting the ends of each adjacent pair of the straight portions from upstream side to downstream side.

As shown in FIG. 2, the region 20 of the cooling fluid channel 8a near the manifold aperture 16 for supplying cooling fluid is formed in the region corresponding to the anode-side gap 10a. More specifically, the previously described "upstream portion" of the cooling fluid channel 8a that satisfies the equation: $L1 \leq L2$ {i.e., a region comprising the five straight portions 77a (77a1 to 77a5) extending in a horizontal direction at the most upstream side, and the four turn portions 77b (77b1 to 77b4) for connecting each adjacent pair of the five straight portions 77a} is formed in the region corresponding to the anode-side gap 10a.

In this embodiment, not only the straight portion 77a at the most upstream but also the straight portion at the most downstream of the straight portions extending in a horizontal direction is formed in the region corresponding to the anode-side gap 10a (the straight portion 77a whose one end is connected to the manifold aperture 17 for exhausting cooling fluid in FIG. 2).

Moreover, in this embodiment, in order to effectively use the main surface of the anode-side separator 6a having a limited size, the gas channel 7a of the anode-side separator 6a shown in FIG. 3 extends from the manifold aperture 14 for supplying fuel gas to the portion corresponding to the anode 4a (electrode area), intersecting the cathode-side gap 10a with the shortest distance from the manifold aperture 14. In the electrode area, the gas channel 7a has a serpentine structure.

To explain more specifically, the gas channel 7a has nine straight portions 77a (long channels) extending in a horizontal direction (a direction substantially parallel to a side of the anode-side separator 6a where the manifold aperture 15 for exhausting fuel gas and the manifold aperture 18 for supplying oxidant gas are formed), and eight turn portions 77b (short channels) for connecting the ends of each adjacent pair of the straight portions from upstream side to downstream side. The gas channel 7a further has a straight portion 77c (long channel) extending in a vertical direction perpendicular to the horizontal direction which is located at the left side of the turn portions 77b (in the anode-side separator 6a of FIG. 3, the side where the manifold aperture 15 for exhausting fuel gas and the manifold aperture 17 for exhausting cooling fluid 17 are formed). The gas channel 7a further has, in the upper portion of the electrode area (in the anode-side separator 6a of FIG. 2, the side where the manifold aperture 15 for exhausting fuel gas and the manifold aperture 18 for supplying oxidant gas are formed), a straight portion 77e (long channel) horizontally extending from the straight portion 77c, a most downstream straight portion 77f (long channel) whose one end is connected to the manifold aperture 15 for exhausting fuel gas, and a turn portion 77d (short channel) for connecting the straight portions 77e and 77f from upstream side to down stream side.

In the gas channel 7a, the region 21 almost corresponding to the previously described "middle stream portion and subsequent portion" that satisfies the equation: $L3 \leq \{(\frac{1}{3}) \times L4\}$ {i.e., the straight portion 77f, the turn portion 77d, the straight portion 77e, and a downstream side portion 77c1 of the straight portion 77c} is formed in the region corresponding to the anode-side gap 10a. The region 21 is formed in proximity to the above-described region 20 almost corresponding to the "upstream portion" of the cooling fluid channel 8a.

As shown in FIG. 5, the cooling fluid channel 8b of the cathode-side separator 6b also has the same shape as the cooling fluid channel 8a of the anode-side separator 6a.

Further, as shown in FIG. 4, the gas channel 7a of the cathode-side separator 6b extends from the manifold aperture 18 for supplying oxidant gas to the portion corresponding to the anode 4a (electrode area), intersecting the cathode-side gap 10b with the shortest distance from the manifold aperture 18. In the electrode area, the gas channel 7b has a serpentine structure. Specifically, the gas channel 7b has eleven straight portions 77a (long channels) extending in a horizontal direction (a direction substantially parallel to a side of the cathode-side separator 6b where the manifold aperture 18 for supplying oxidant gas and the manifold aperture 15 for exhausting fuel gas are formed), and ten turn portions 77b (short channels) for connecting the ends of each adjacent pair of the straight portions from upstream side to downstream side.

As shown in FIG. 3, in the anode-side separator 6a, the manifold aperture 14 for supplying fuel gas and the manifold aperture 15 for exhausting fuel gas connected by the gas channel 7a are formed on the outside of the anode-side gasket 9a. In other words, the manifold aperture 14 for supplying fuel gas is formed on an edge portion of a side of the anode-side separator 6a having a rectangular main surface. The manifold aperture 15 for exhausting fuel gas is formed on an edge portion of the other side opposite to the above-mentioned side of the anode-side separator 6a. In the anode-side gap 10a, as routes which a reaction gas from the manifold aperture 14 for supplying fuel gas enters, there are two routes: a first route (a route starting from a point $Q_1$ near the manifold aperture 14 for supplying fuel gas through a point $Q_2$ near the manifold aperture 18 for supplying oxidant gas to a point $Q_3$ near the manifold aperture 15 for exhausting fuel gas in FIG. 3); and a second route longer than the first route (a route starting from the point $Q_1$ through points $Q_4$ and $Q_5$ to the point $Q_3$ in FIG. 3, a route starting from the point $P_1$ to the point $P_2$ in FIG. 2)

The upstream portion 20 of the cooling fluid channel 8a and the region 21 of the middle stream portion and subsequent portion of the gas channel 7a in the anode-side separator 6a are formed in proximity to both a region corresponding to a part of the first route of the anode-side gap 10a and a region corresponding to a part of the downstream of the second route near the manifold aperture 15 for exhausting fuel gas. Thereby, both the first route and the second route of the anode-side gap 10a can be filled with the condensed water, so that the reaction gas can be more effectively used than conventional fuel cells. Particularly, in this structure, the reaction gas flows into the short first route rather than the long second route. Because the most upstream straight portion 77a having the lowest temperature in the cooling fluid channel 8a can be arranged near the first route, the water can be condensed in the first route prior to the second route, preventing the flowing of the reaction gas into the gaps.

In the fuel cell 10 and fuel cell stack 30, as shown in FIGS. 2, 3, 4, 5, 7 and 8, in all anode-side separators 6a and all cathode-side separators 6b, the cooling fluid channels 8a and 8b, and the fuel gas channels 7a and 7b are formed such that "their main portions are substantially parallel to each other" as described previously.

Thereby, in all the MEAs 5, when viewed in a plane parallel to the main surface of the anode-side separators 6a and the main surface of all the cathode-side separators 6b, the entire flow direction (running direction) of the cooling fluid from upstream to downstream of the cooling fluid channel and the entire flow direction (running direction) of the reaction gas (fuel gas and oxidant gas) can be made substantially the same in an extremely easy manner.

As a result, because the downstream portion of the gas channel where a reaction gas having a large amount of water vapor flows corresponds to the downstream portion of the cooling fluid channel where a cooling fluid having a high temperature flows, the saturated vapor pressure ($P^0_{H_2O}$) increases at the downstream side of the reaction gas flow, reducing excessive production of condensed water. Accordingly, the moisture content of the electrode surface is maintained at a favorable level, and it is possible to ensure the prevention of flooding at the catalyst layers 2a and 2b.

In this case, by reducing the saturated vapor pressure ($P^0_{H_2O}$) at the upstream side of the reaction gas flow, it is possible to further ensure the prevention of drying of the polymer electrolyte membrane 1. Further, in this case, because the upstream portion of the reaction gas flow having a higher concentration of reactant and a large reaction heat corresponds to the upstream portion of the cooling fluid flow having a low temperature, differences in temperature distribution over the main surface of the anode 4a and the main surface of the cathode 4b can be reduced sufficiently, thereby enabling more efficient cooling of the fuel cell and fuel cell stack comprising a plurality of the fuel cells stacked.

To explain more specifically, as shown in FIGS. 7 and 8, in this embodiment, the entire flow direction $D_1$ of the cooling fluid that flows in an inside region of the cooling fluid channel 8a from upstream to downstream and the entire flow direction $D_2$ of the reaction gas (a fuel gas in this case) that flows in an inside region of the gas channel 7a from upstream to downstream are configured to be substantially the same. In other words, the entire flow direction $D_1$ of the cooling fluid from upstream to downstream and the entire flow direction $D_2$ of the reaction gas (a fuel gas in this case) from upstream to downstream are configured to be substantially parallel. According to this structure, because the downstream portion of the gas channel where a reaction gas having a large amount of water vapor flows corresponds to the downstream portion of the cooling fluid channel where a cooling fluid having a high temperature flows, the saturated vapor pressure ($P^0_{H_2O}$) increases at the downstream side of the reaction gas flow, reducing excessive production of condensed water. Accordingly, the moisture content of the electrode surface is maintained at a favorable level, and it is possible to ensure the prevention of flooding at the catalyst layers 2a and 2b. Further, according to this structure, by reducing the saturated vapor pressure ($P^0_{H_2O}$) at the upstream side of the reaction gas flow, it is possible to further ensure the prevention of drying of the polymer electrolyte membrane. Furthermore, according to this structure, because the upstream portion of the reaction gas flow having a higher concentration of reactant and a large reaction heat corresponds to the upstream portion of the cooling fluid flow having a low temperature, differences in temperature distribution over the main surface of the gas diffusion electrodes 3a and 3b can be reduced sufficiently, thereby enabling more efficient cooling of the fuel cell 10 (fuel cell stack 30).

In the fuel cell 10, as shown in FIG. 9, in a portion from the manifold aperture 18 for supplying oxidant gas of the cathode-side separator 6b through the cathode-side gap 10b to the electrode, a shield plate 23 is disposed so as to prevent the oxidant gas from flowing directly into the cathode-side gap 10b. The size and shape of this shield plate 23 can be appropriately determined as long as it closes the cathode-side gap 10b in the above portion to effectively prevent the oxidant gas passing through the gas channel 7b from flowing into the cathode-side gap 10a, and as long as the effect of the present invention is not impaired.

Accordingly, although not shown in the drawings, the shield plate is also preferably disposed in the junction between the gas channel from the manifold aperture 15 for exhausting fuel gas, the manifold aperture 16 for supplying cooling fluid or the manifold aperture 19 for exhausting oxidant gas and the anode-side gap 10a or the cathode-side gap 10b, respectively. The material for the shield plate is not specifically limited as long as the shield plate is made of a material resistant to permeation and corrosion by the reaction gas. As long as the effect of the present invention is not impaired, an appropriate material can be selected.

A description is now given of a method for producing the fuel cell 10 and a fuel cell stack.

First, a membrane electrode assembly 5 is produced. The method for producing the membrane electrode assembly 5 is not specifically limited, and it can be produced by any thin film forming technique employed for production of membrane electrode assemblies for known polymer electrolyte fuel cells. For example, a cathode catalyst layer 2b can be formed using a paste for forming cathode catalyst layer prepared as follows. Specifically, a cation exchange resin solution, namely, a solution of fluorocarbon sulfonic acid polymer resin of the same quality as, for example, the polymer electrolyte membrane 1 (e.g., a solution prepared by mixing 10 wt % of solid content of the resin with a mixed solution of ethanol and water) is slowly added to a carbon particle carrying, for example, Pt serving as a catalyst until the solid content of the resin per unit area of the catalyst reaches about 2 mg/m$^2$, for example, whereby a paste for forming cathode catalyst layer is prepared.

The amount of the cation exchange resin solution contained in the paste for forming cathode catalyst layer depends on the specific surface area, pore size and dispersibility of the carbon particles. As the specific surface area increases and as the dispersibility increases, the amount of the resin increases. For example, when the specific surface area is increased by forming small pores which do not allow the resin to enter, the optimum resin amount is small. In the case of ketjen black, for example, the optimum resin amount per unit gram is 1.4 g/g. As for the type of carbon for use, crystallized carbon and graphitized carbon are more preferred because carbon oxidation can be prevented.

An anode catalyst layer 2a can be formed using a paste for forming anode catalyst layer prepared as follows. The paste for forming anode catalyst layer can be prepared in the same manner as that for the paste for forming cathode catalyst layer described above except that, instead of the carbon particles carrying the Pt, carbon particles carrying fine particles comprising Pt and Ru as constituent elements are used.

Specifically, the paste for forming anode catalyst layer is prepared by slowly adding a cation exchange resin solution, namely, a solution of fluorocarbon sulfonic acid polymer resin of the same quality as, for example, the polymer electrolyte membrane 1 (e.g., a solution prepared by mixing 10 wt % of solid content of the resin with a mixed solution of ethanol and water) to an anode electrode catalyst prepared by allowing carbon to carry fine particles comprising electrode catalysts such as Pt and Ru as its constituent elements.

When using a catalyst carrying carbon prepared by allowing a carbon powder to carry an anode electrode catalyst, the amount of the cation exchange resin solution contained in the paste for forming anode catalyst layer can be the same as that of the paste for forming cathode catalyst layer.

The paste for forming cathode catalyst layer and the paste for forming anode catalyst layer produced in the manner described above are applied to synthetic resin films such as PP films by a bar coater, followed by drying. The resulting films are then cut into desired electrode sizes, which are transferred onto a polymer electrolyte membrane by hot pressing, whereby a cathode catalyst layer 2b and an anode catalyst layer 2a are formed. The method for forming the catalyst layers is not limited to this method. The method can be a method in which a paste for forming catalyst layers is printed onto a polymer electrolyte membrane, or a method in which a paste for forming catalyst layers is sprayed onto a polymer electrolyte membrane. The polymer electrolyte membrane for use is not specifically limited, and a polymer electrolyte exchange membrane having a sulfonic acid group can be used as mentioned previously.

Using a conventional method for producing thin film laminates, gas diffusion layers 3a and 3b are laminated onto the outer surfaces of the anode catalyst layers 2a and 2b, respectively. Subsequently, a polymer electrolyte membrane 1 is sandwiched between the anode 4a and the cathode 4b. At this time, gaskets 9a and 9b are disposed in the peripheries of the anode 4a and the cathode 4b, respectively.

The anode-side separator 6a and the cathode-side separator 6b are disposed on the outer surfaces of the membrane electrode assembly 5 as shown in FIG. 1, whereby a fuel cell is formed. Then, a plurality of the fuel cells 10 are stacked to produce a fuel cell stack 30.

The anode-side separator 6a and the cathode-side separator 6b a can be produced by a conventional method for producing polymer electrolyte fuel cells except for forming the gas channels 7a and 7b, the cooling fluid channels 8a and 8b in the manner as described previously. The constituent material for the separators can be any constituent material for separators for conventional polymer electrolyte fuel cells. The anode-side separator 6a and the cathode-side gap 10b can be formed by, for example, a production method involving a step of machining a conductive flat plate, or a production method (a method involving compression molding technique) involving a step of using a metal mold such as injecting a fluid containing a constituent material into a metal mold, followed by molding process.

The effect of the above-described fuel cell 10 (unit cell) will be explained in further detail using simulation result where a single fuel cell 10 whose anode 4a and cathode 4b have a main surface area of 100 cm$^2$ and whose anode-side separator 6a (having a cooling fluid channel 8a shown in FIG. 2 and a gas channel 7a for fuel gas shown in FIG. 3) and cathode-side separator 6b (having a gas channel 7b for oxidant gas shown in FIG. 4 and a cooling fluid channel 8a shown in FIG. 2) have sizes corresponding to those of the anode 4a and the cathode 4b is operated.

The cooling water to be supplied to the cooling fluid channel 8a is set such that cooling water at 70° C. is supplied from the manifold 16 for supplying cooling fluid and cooling water at 74° C. is exhausted from the manifold 17 for exhausting cooling fluid.

As the fuel gas, a mixed gas composed of hydrogen and carbon dioxide (at a volume ratio of 8:2) is used. The fuel gas is humidified to have a dew point of 70° C., which is supplied to the manifold aperture 14 for supplying fuel gas at a fuel gas utilization rate of 70%. Further, air as the oxidant gas is humidified to have a dew point of 68° C., which is supplied to the manifold aperture 18 for supplying oxidant gas at an oxidant gas utilization rate of 45%. The manifold aperture 15 for exhausting fuel gas and the manifold aperture 19 for exhausting oxidant gas are open to an atmosphere (normal pressure). The fuel cell 10 shown in FIG. 1 is disposed between a pair of current collector plates facing to each other. Continuous operation is performed at 0.3 A/cm$^2$ through the current collector plates.

From the current density and electrode area as above, the amount of water generated during the power generation of the fuel cell 10 in one second is theoretically $1.55 \times 10^{-4}$ mol/s. If this generated water does not move from the cathode 4b to the anode 4a through the polymer electrolyte membrane 1, the amount of water vapor released from the manifold aperture 15 for exhausting fuel gas is equal to the amount of water contained in the humidified fuel gas supplied from the manifold aperture 14 for supplying fuel gas.

At this time, calculation is made based on the assumption that the dew points of the fuel gas in the manifold aperture 14 for supplying fuel gas and the oxidant gas in the manifold aperture 18 for supplying oxidant gas ranges from −4° C. to +4° C. relative to the lowest temperatures of the anode-side separator 6a and cathode-side separator 6b, respectively. Even under this operation conditions, it has been confirmed that similar results can be obtained even if the product water moves from the cathode 4b to the anode 4a through the polymer electrolyte membrane 1.

The composition of the gas exhausted from the manifold aperture 15 for exhausting fuel gas can be yielded by subtracting the hydrogen consumed for power generation from the fuel gas supplied from the outside. According to this calculation, the water vapor partial pressure equals 296.8 mmHg. The gas exhausted at this time has a dew point of 75.6° C. In the gas channel 7a for fuel gas, a change in dew point of the fuel gas between the manifold aperture 14 for supplying fuel gas and the manifold aperture 15 for exhausting fuel gas is then calculated, and it has been found that the dew point of the fuel gas slowly changes from 70° C. to 75.6° C.

Under the above-described operation conditions, the temperature of cooling water is lower than that of the MEA 5 by about 2° C. The temperature of the MEA 5 also changes along with the cooling fluid channel 8a as the temperature of the cooling water that flows through the cooling fluid channel 8a changes. When a change in temperature of the MEA 5 is calculated, and it has been found that the temperature slowly changes from 72° C. to 76° C. between the vicinity of the manifold aperture 16 for supplying cooling fluid and the vicinity of the manifold aperture 17 for exhausting cooling fluid.

Thermodynamically, when the dew point of the fuel gas that flows the gas channel 7a exceeds the temperature of the MEA 5, the water contained in the fuel gas condenses. As explained above, the dew point of the fuel gas increases from the upstream to the downstream of the gas channel 7a. Accordingly, thermodynamically, by using high moisture content reaction gas contained in the downstream region 21 (particularly, the straight portion 77f located at the most downstream side), which is a preferred portion of the above-described "middle stream portion and subsequent portion" of the gas channel 7a in FIG. 3, in the region corresponding to the anode-side gap 10a, it is possible to cause the water to condense in the region corresponding to the anode-side gap 10a.

In this fuel cell 10, the upstream portion 20 of the cooling fluid channel 8a and the downstream region 21 of the gas channel 7a are formed in the region corresponding to the anode-side gap 10a. Because the above-described upstream portion 20 of the cooling fluid channel 8a has the highest cooling effect and the dew point of the fuel gas becomes the highest in the downstream region 21 of the gas channel 7a in proximity to the upstream portion 20 as shown by the above calculation, condensed water can be produced easily and effectively in the anode-side gap 10a.

Inside the anode-side gap 10a, no electrode catalyst exists and heat is not generated by power generation, and thus the temperature inside the anode-side gap 10a is low. From this viewpoint also, the water is easily condensed in the anode-side gap 10a.

After the anode-side gap 10a is filled with the condensed water as described above, the reaction gas does not flow except the gas channel 7a, in other words, it does not flow in the anode-side gap 10a. As a result, the supply of the reaction gas to the anode 4a can be ensured. Accordingly, the fuel cell 10 efficiently utilizes the reaction gas and exhibits excellent power generation performance.

Embodiment 2

A description is now given of a fuel cell according to embodiment 2 of the present invention. A fuel cell and a fuel cell stack according to embodiment 2 (not shown) have the same structure as the fuel cell 10 and the fuel cell stack 30 according to embodiment 1 except for the anode-side separator and the cathode-side separator because the anode-side separator and the cathode-side separator are replaced with those having different structures.

The anode-side separator and the cathode-side separator for a fuel cell according to embodiment 2 are described below.

Figure 11:
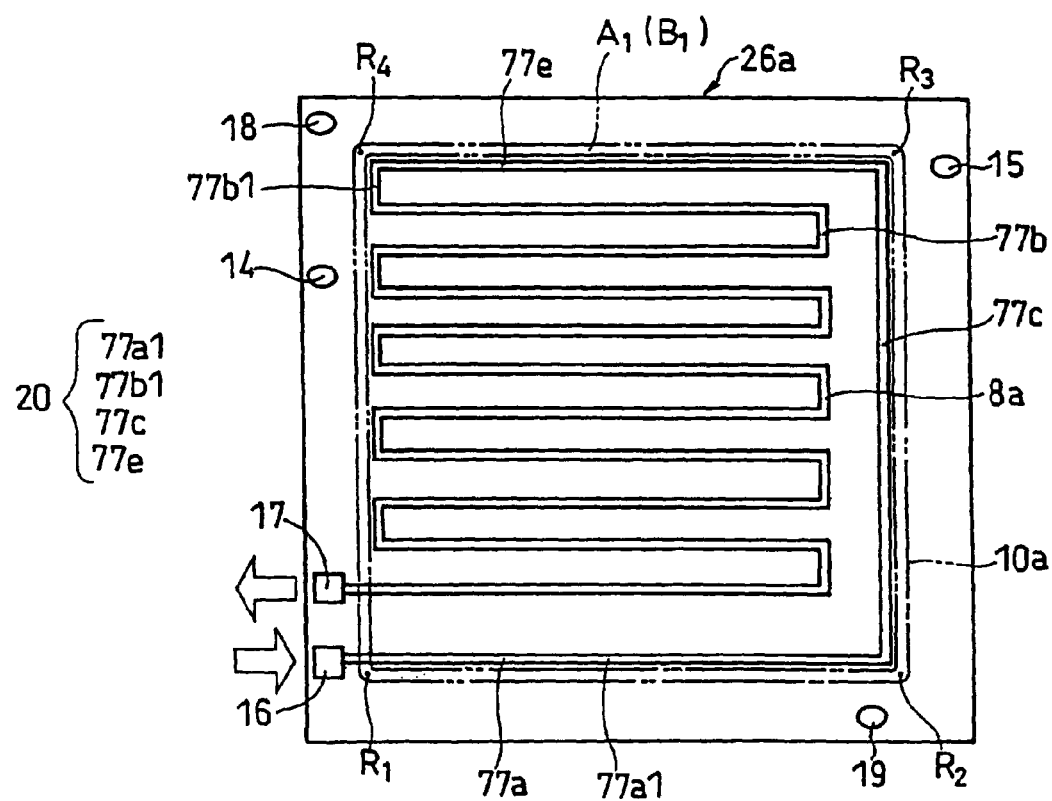
Figure 12:
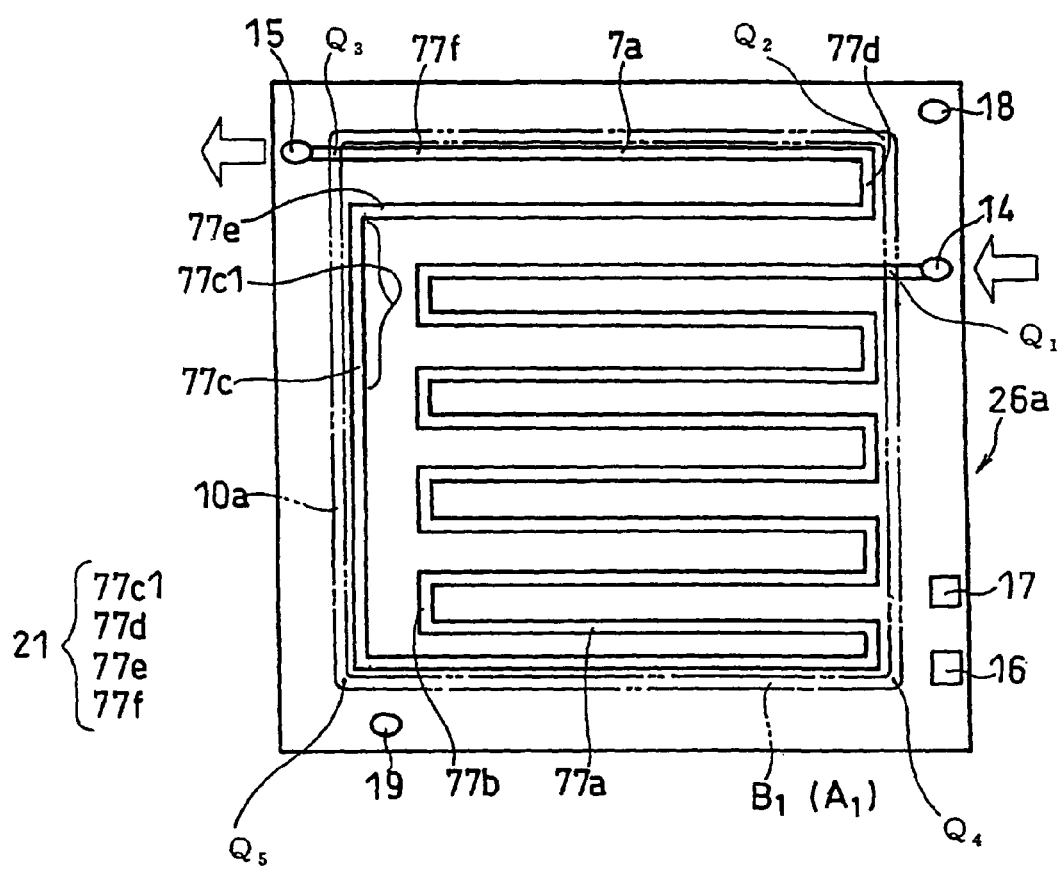
Figure 13:
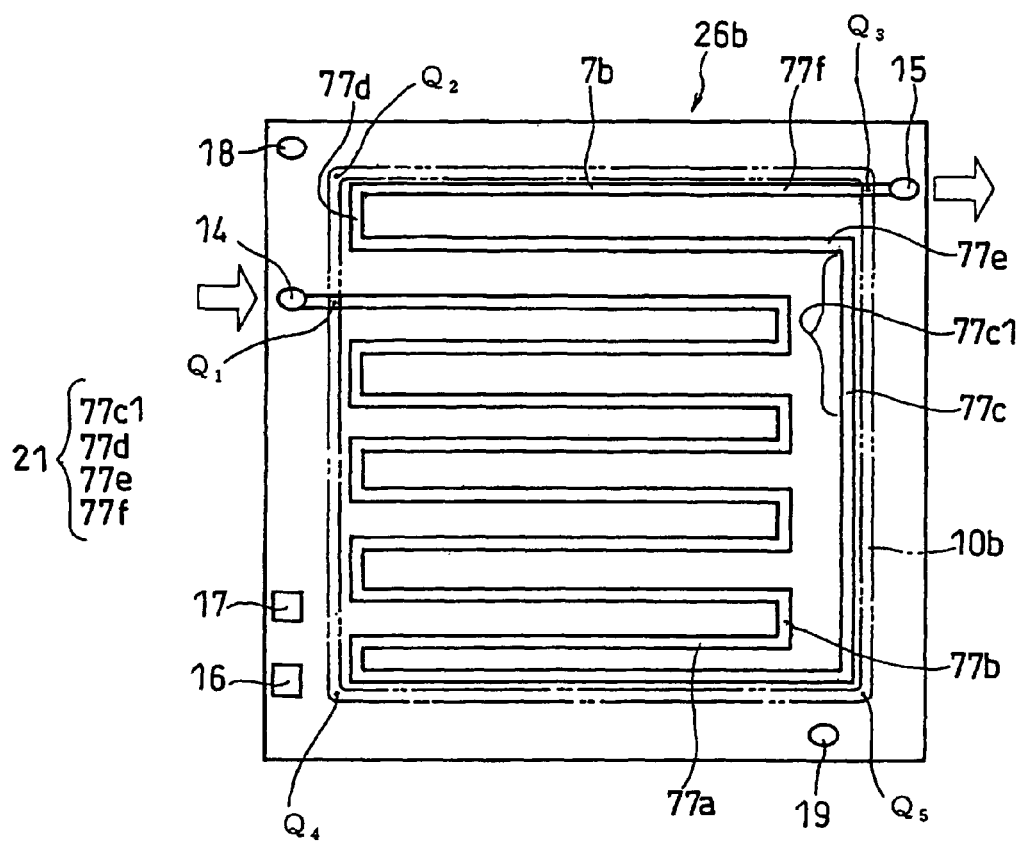
FIG. 13 is a front view of a main surface of cathode-side separator 26b to be incorporated into a fuel cell according to embodiment 2 of the present invention as viewed from the side of gas channel 7b.
Figure 14:
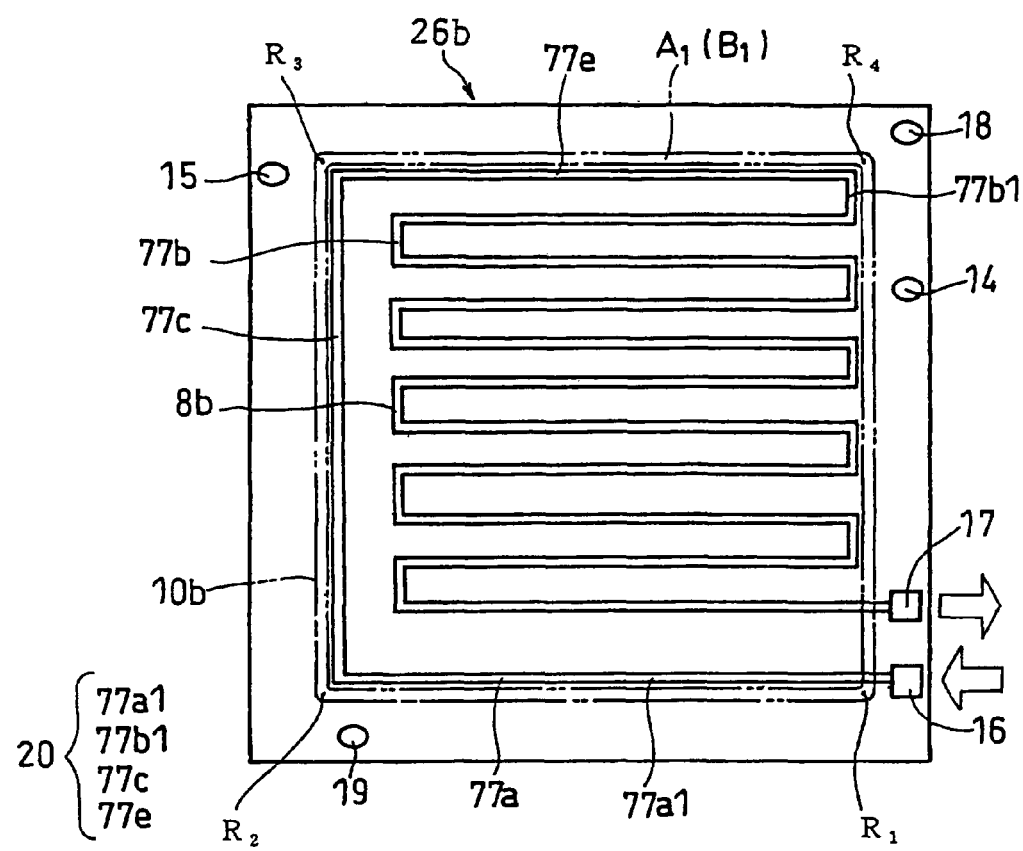
FIG. 14 is a front view of a main surface of cathode-side separator 26b to be incorporated into a fuel cell according to embodiment 2 of the present invention as viewed from the side of cooling fluid channel 8b.

FIG. 11 is a front view of a main surface of anode-side separator 26a to be incorporated into a fuel cell according to embodiment 2 of the present invention as viewed from the side of cooling fluid channel 8a. FIG. 12 is a front view of a main surface of anode-side separator 26a to be incorporated into a fuel cell according to embodiment 2 of the present invention as viewed from the side of gas channel 7a. FIG. 13 is a front view of a main surface of cathode-side separator 26b to be incorporated into a fuel cell according to embodiment 2 of the present invention as viewed from the side of gas channel 7a. FIG. 14 is a front view of a main surface of cathode-side separator 26b to be incorporated into a fuel cell according to embodiment 2 of the present invention as viewed from the side of cooling fluid channel 8b.

In this fuel cell, as shown in FIGS. 11 to 14, both the anode-side separator 26a and the cathode-side separator 26b have the following structures so as to obtain the effect of the present invention.

Specifically, in the anode-side separator 26a, there is formed a portion in which the anode-side gap 10a (see FIG. 1) formed between the anode-side gasket 9a (see FIG. 1) and the MEA 5 (see FIG. 1), the "upstream portion" of the cooling fluid channel 8a, and the "middle stream portion and subsequent portion" of the fuel gas channel 7a (in this fuel cell, particularly downstream portion) are arranged in proximity to one another other to satisfy the conditions (I) and (II). Thereby, the anode-side gap 10a is filled with the condensed water, and therefore the reaction gas is more effectively utilized than conventional fuel cells.

Likewise, in the cathode-side separator 26b, there is formed a portion in which the cathode-side gap 10b (see FIG. 1) formed between the cathode-side gasket 9b (see FIG. 1) and the MEA 5 (see FIG. 1), the "upstream portion" of the cooling fluid channel 8b, and the "middle stream portion and subsequent portion" of the fuel gas channel 7b (in this fuel cell, particularly downstream portion) are arranged in proximity to one another other to satisfy the conditions (I) and (II). Thereby, the cathode-side gap 10b is filled with the condensed water, and therefore the reaction gas is more effectively utilized than conventional fuel cells.

In the anode-side separator 26a shown in FIGS. 11 and 12 and the cathode-side separator 26b shown in FIGS. 13 and 14, the cooling fluid channel 8a of the anode-side separator 26a and the cooling fluid channel 8b of the cathode-side separator 26b have the same structure. When they are stacked in the same manner as the fuel stack 30 shown in FIG. 10 (when they are stacked such that the manifold apertures of the same type communicate), for example, the cooling fluid channel 8a and the cooling fluid channel 8b overlap with each other substantially completely. Likewise, the gas channel 7a of the anode-side separator 26a and the gas channel 7b of the cathode-side separator 26b have the same structure. When they are stacked in the same manner as the fuel stack 30 shown in FIG. 10 (when they are stacked such that the manifold apertures of the same type communicate), for example, the gas channel 7a and the gas channel 7b overlap with each other substantially completely.

As such, the following description focuses mainly on the anode-side separator 26a, and redundant description is omitted, and regarding the cathode-side separator 26b, only different points from the anode-side separator 26a are described.

In the anode-side separator 26a shown in FIG. 11, the cooling fluid channel 8a extends from the manifold aperture 16 for supplying cooling fluid to the portion corresponding to the anode 4a (electrode area, i.e., a portion corresponding to the area being in contact with the electrode and surrounded by the inner one of two one-dot chain lines in FIG. 11), intersecting the anode-side gap 10a with the shortest distance from the manifold aperture 16. In order to effectively utilize the main surface of the anode-side separator 26a, the cooling fluid channel 8a has a serpentine structure. To explain more specifically, the cooling fluid channel 8a has a straight portion 77a1 extending in a horizontal direction (a direction substantially parallel to a side of the anode-side separator 26a where the manifold aperture 16 for supplying cooling fluid and the manifold aperture 19 for exhausting oxidant gas are formed), a straight portion 77c extending in a vertical direction perpendicular to the horizontal direction, eleven straight portions 77a (long channels) extending in the horizontal direction, and ten turn portions 77b (short channels) for connecting the ends of each adjacent pair of the straight portions from upstream side to downstream side.

As shown in FIG. 11, an upstream region 20 of the cooling fluid channel 8a near the manifold aperture 16 for supplying cooling fluid is formed in the region corresponding to the anode-side gap 10a. More specifically, the previously described "upstream portion" of the cooling fluid channel 8a that satisfies the equation: L1≦L2 {i.e., the straight portion 77a1 at the upstream side, the straight portion 77c, the straight portion 77e, and turn portions 77b1 described above (one of the four turn portions 77b that is located at the most upstream side)} is formed in the region corresponding to the anode-side gap 10a.

The gas channel 7a of the anode-side separator 26a shown in FIG. 12 has the same structure as the gas channel 7a of the anode-side separator 26a disposed in the fuel cell 10 according to embodiment 1 shown in FIG. 3.

That is, to explain more specifically, the gas channel 7a has nine straight portions 77a (long channels) extending in a horizontal direction (a direction substantially parallel to a side of the anode-side separator 26a where the manifold aperture 15 for exhausting fuel gas and the manifold aperture 18 for supplying oxidant gas are formed), and eight turn portions 77b (short channels) for connecting the ends of each adjacent pair of the straight portions from upstream side to downstream side. The gas channel 7a further has a straight portion 77c (long channel) extending in a vertical direction perpendicular to the horizontal direction which is located at the left side of the electrode area (in the anode-side separator 26a of FIG. 12, the side where the manifold aperture 15 for exhausting fuel gas and the manifold aperture 19 for exhausting oxidant gas are formed). The gas channel 7a further has, in the upper portion of the electrode area (in the anode-side separator 26a of FIG. 12, the side where the manifold aperture 15 for exhausting fuel gas and the manifold aperture 18 for supplying oxidant gas are formed), a straight portion 77e (long channel) horizontally extending from the straight portion 77c, a most downstream straight portion 77f (long channel) whose one end is connected to the manifold aperture 15 for exhausting fuel gas, and a turn portion 77d (short channel) for connecting the straight portions 77e and 77f from upstream side to down stream side.

In the gas channel 7a, a region 21 almost corresponding to the previously described "middle stream portion and subsequent portion" that satisfies the equation: L3≦{(⅓)×L4} {i.e., the straight portion 77f, the turn portion 77d, the straight portion 77e, and a downstream side portion 77c1 of the straight portion 77c} is formed in the region corresponding to the anode-side gap 10a. The region 21 is formed in proximity to the above-described region 20 almost corresponding to the "upstream portion" of the cooling fluid channel 8a of FIG. 11.

In the fuel cell and the fuel cell stack according to this embodiment having a structure as described above, a reaction gas having a large amount of water vapor flows into at least one of the anode-side gap 10a formed between the anode-side gasket 9a and the membrane electrode assembly 5 and the cathode-side gap 10b formed between the cathode-side gasket 9b and the membrane electrode assembly 5. Generally, the moisture contained in the reaction gas starts to condense when the dew point of the gas rises above ambient temperature. In the fuel cell and the fuel cell stack, because the upstream portion 20 of the cooling fluid channel 8a is formed in the region corresponding to the anode-side gap 10a and the upstream portion 20 of the cooling fluid channel 8a is formed in the region corresponding to the cathode-side gap 10b, the water vapor contained in reaction gas is effectively cooled in the anode-side gap 10a and the cathode-side gap 10b. Accordingly, the water vapor condenses in at least a part of the anode-side gap 10a and in at least a part of the cathode-side gap 10b, and the anode-side gap 10a and the cathode-side gap 10b are filled with the condensed water.

As a result of the water condensation in the anode-side gap 10a and the cathode-side gap 10b, the anode-side gap 10a and the cathode-side gap 10b are filled, so that the reaction gas does not flow into the portions except the gas channels 7a and 7b, that is, the anode-side gap 10a and the cathode-side gap 10b, ensuring the supply of the reaction gas to the gas channel 7a and the gas channel 7b. Accordingly, efficient use of reaction gas is achieved, improving power generation performance.

In this embodiment, in the anode-side gap 10a, as routes which a reaction gas from the manifold aperture 14 for supplying fuel gas enters, there are two routes: a first route (similar to FIG. 3, a route starting from a point $Q_1$ near the manifold aperture 14 for supplying fuel gas through a point $Q_2$ near the manifold aperture 18 for supplying oxidant gas to a point $Q_3$ near the manifold aperture 15 for exhausting fuel gas in FIG. 12); and a second route longer than the first route (similar to FIG. 3, a route starting from the point $Q_1$ through points $Q_4$ and $Q_5$ to the point $Q_3$ in FIG. 12).

The upstream portion 20 of the cooling fluid channel 8a of the anode-side separator 26a and the region 21 (the middle stream portion and subsequent portion) of the gas channel 7a are formed in proximity to both a region corresponding to a part of the first route of the anode-side gap 10a and a region corresponding to a part of the down stream of the second route which is near the manifold aperture 15 for exhausting fuel gas. Thereby, both the first and second routes of the anode-side gap 10a are filled with condensed water, so that the reaction gas can be more effectively used than conventional fuel cells. Particularly, in this structure, the reaction gas flows into the short first route rather than the long second route. Because the most upstream straight portion 77a having the lowest temperature in the cooling fluid channel 8a can be arranged near the first route, the water can be condensed in the first route prior to the second route, preventing the flowing of the reaction gas into the gaps.

Because the cathode-side separator 46b has the same structure as the anode-side separator 46a, it is apparent that the effect obtained in the anode-side separator 26a described above is similarly obtained in the cathode-side separator 26b.

Similar to the fuel cell 10 and the fuel cell stack 30 according to embodiment 1 described previously, in the fuel cell and the fuel cell stack according to this embodiment also, in all the anode-side separators 26a and all the cathode-side separators 26b shown in FIGS. 11 to 14, the cooling fluid channel 8a, the cooling fluid channel 8b, the fuel gas channel 7a and the oxidant gas channel 7b are formed such that "their main portions are substantially parallel to each other".

Thereby, in all the MEAs 5, when viewed in a plane parallel to the main surface of the anode-side separators 26a and the main surface of all the cathode-side separators 26b, the entire flow direction (running direction) of the cooling fluid from upstream to downstream of the cooling fluid channel and the entire flow direction (running direction) of the reaction gas (fuel gas and oxidant gas) can be made substantially the same in an extremely easy manner.

As a result, because the downstream portion of the gas channel where a reaction gas having a large amount of water vapor flows corresponds to the downstream portion of the cooling fluid channel where a cooling fluid having a high temperature flows, the saturated vapor pressure ($P^0_{H2O}$) increases at the downstream side of the reaction gas flow, reducing excessive production of condensed water. Accordingly, the moisture content of the electrode surface is maintained at a favorable level, and it is possible to ensure the prevention of flooding at the catalyst layers 2a and 2b.

In this case, by reducing the saturated vapor pressure ($P^0_{H2O}$) at the upstream side of the reaction gas flow, it is possible to further ensure the prevention of drying of the polymer electrolyte membrane 1. Further, in this case, because the upstream portion of the reaction gas flow having a higher concentration of reactant and a large reaction heat corresponds to the upstream portion of the cooling fluid flow having a low temperature, differences in temperature distribution over the main surface of the anode 4a and the main surface of the cathode 4b can be reduced sufficiently, thereby enabling more efficient cooling of the fuel cell and fuel cell stack comprising a plurality of the fuel cells stacked.

The effect obtained in the fuel cell according to embodiment 2 described above will be described in further detail using simulation result where the areas of the main surfaces of the anode 4a and the cathode 4b are set to 100 cm². Here, a simulation similar to the one performed using the fuel cell according to embodiment 1 is performed except that the anode-side separator 26a and the cathode-side separator 26b shown in FIGS. 11 to 14 are used.

As a result, the dew point of fuel gas increased from upstream to downstream of the gas channel 7a. Thermodynamically, by using high moisture content reaction gas contained in the downstream region 21 (particularly, the straight portion 77f positioned at the most downstream side), which is a preferred portion of the above-described "middle stream portion and subsequent portion" of the gas channel 7a in FIG. 11, in the region corresponding to the anode-side gap 10a, it is possible to cause the water to condense in the region corresponding to the anode-side gap 10a.

In this fuel cell also, the upstream portion 20 of the cooling fluid channel 8a and the downstream region 21 of the gas channel 7a are formed in the region corresponding to the anode-side gap 10a. Because the above-described upstream portion 20 of the cooling fluid channel 8a has the highest cooling effect and the dew point of the fuel gas becomes the highest in the downstream region 21 of the gas channel 7a located in proximity to the upstream portion 20 as shown by the above calculation, condensed water can be produced easily and effectively in the anode-side gap 10a.

Inside the anode-side gap 10a, no electrode catalyst exists and heat is not generated by power generation, and thus the temperature inside the anode-side gap 10a is low. From this viewpoint also, the water is easily condensed in the anode-side gap 10a.

After the anode-side gap 10a is filled with the condensed water as described above, the reaction gas does not flow except in the gas channel 7a, in other words, it does not flow in the anode-side gap 10a. As a result, the reaction gas is surely supplied to the anode 4a.

Because the cathode-side separator 26b has the same structure as the anode-side separator 26a, it is apparent that the effect obtained in the anode-side separator 26a described above is similarly obtained in the cathode-side separator 26b.

Therefore, the fuel cell according to embodiment 2 uses reaction gas efficiently and surely provides excellent power generation performance.

Embodiment 3

A description is now given of a fuel cell according to embodiment 3 of the present invention. A fuel cell and a fuel cell stack according to embodiment 3 (not shown) have the same structure as the fuel cell 10 and the fuel cell stack 30 according to embodiment 1 except for the anode-side separator and the cathode-side separator because the anode-side separator and the cathode-side separator are replaced with those having different structures.

The anode-side separator and the cathode-side separator for fuel cell according to embodiment 3 are described below.

Figure 15:
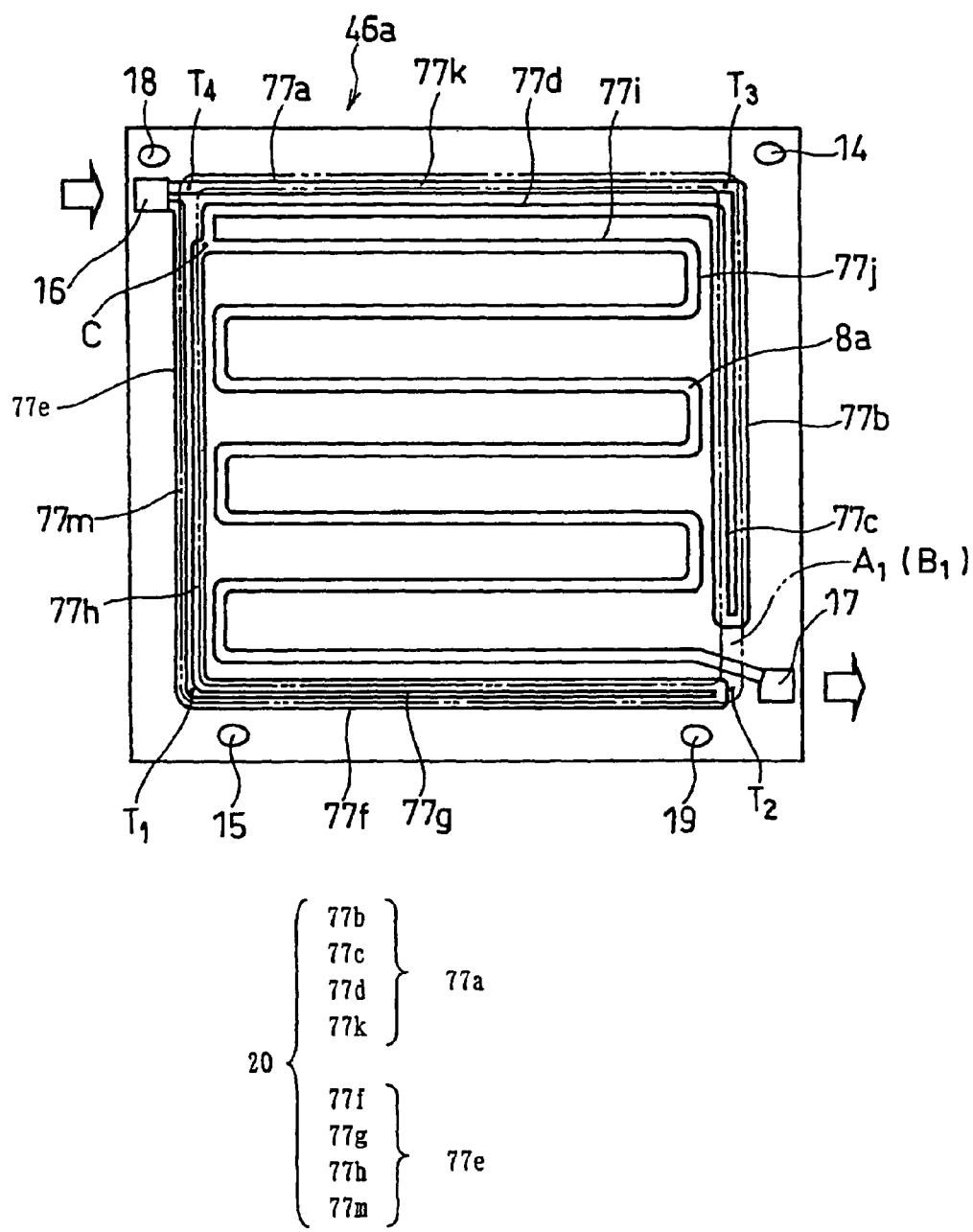
Figure 16:
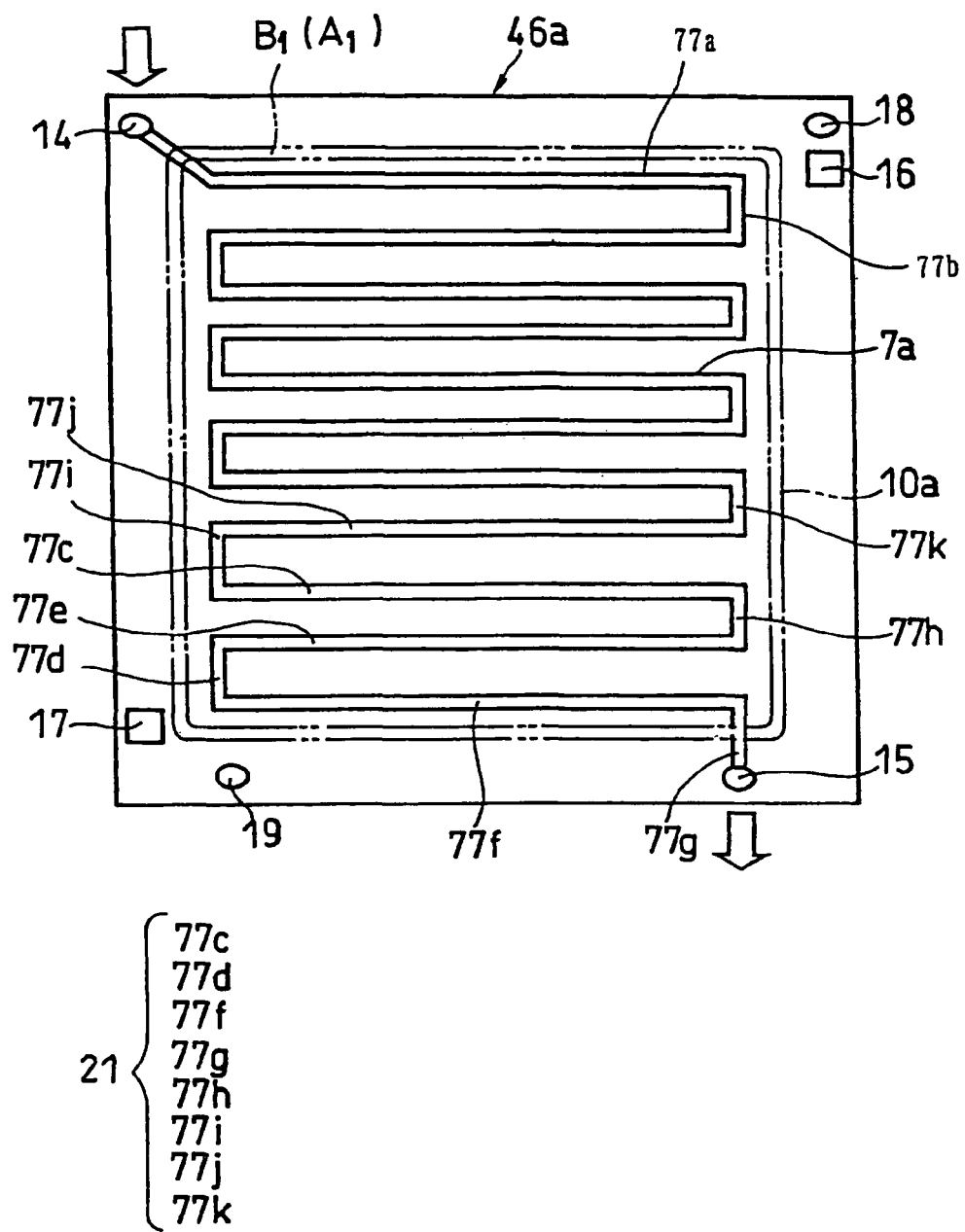
Figure 17:
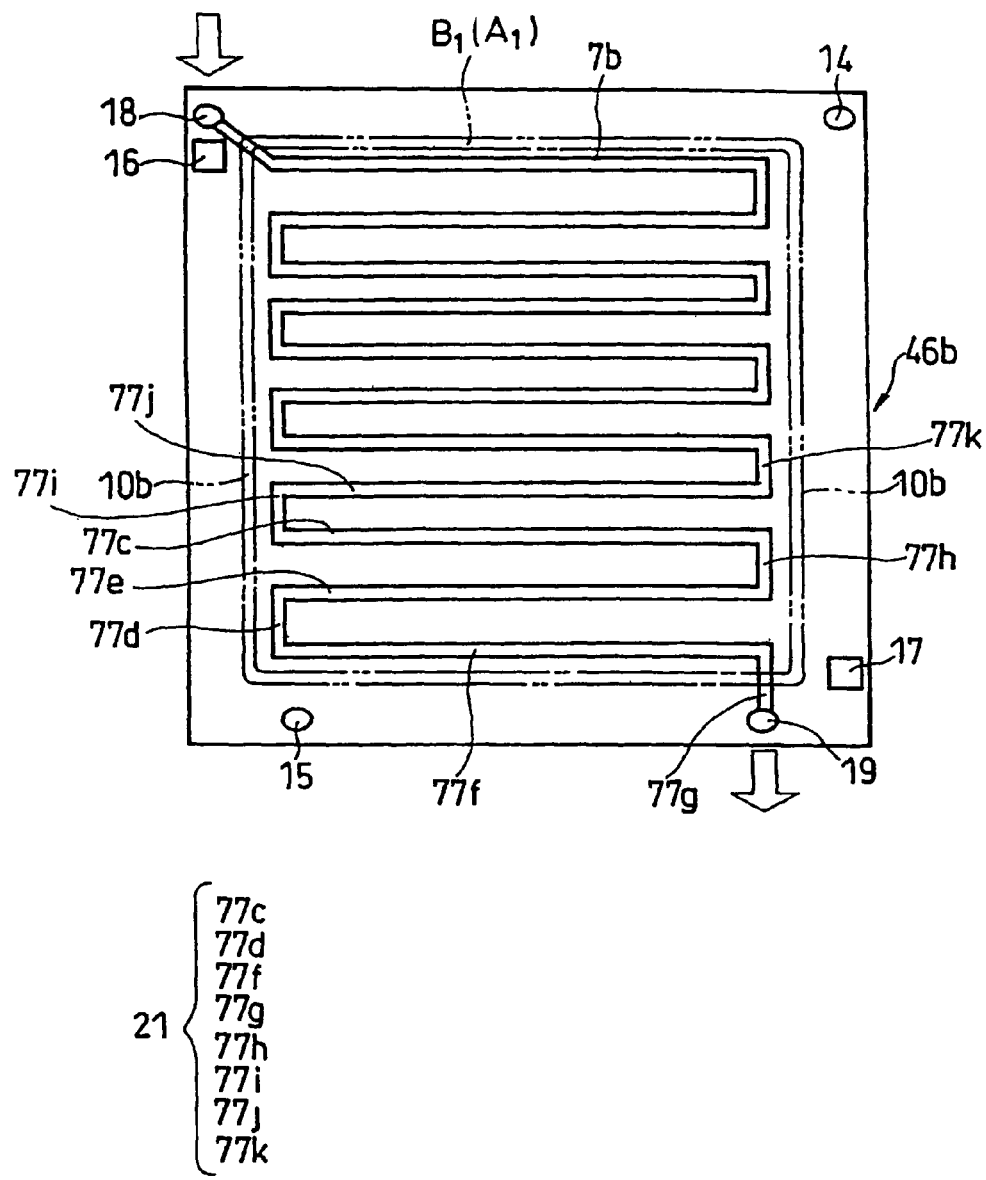
FIG. 17 is a front view of a main surface of cathode-side separator 46b to be incorporated into a fuel cell according to embodiment 3 of the present invention as viewed from the side of gas channel 7b.
Figure 18:
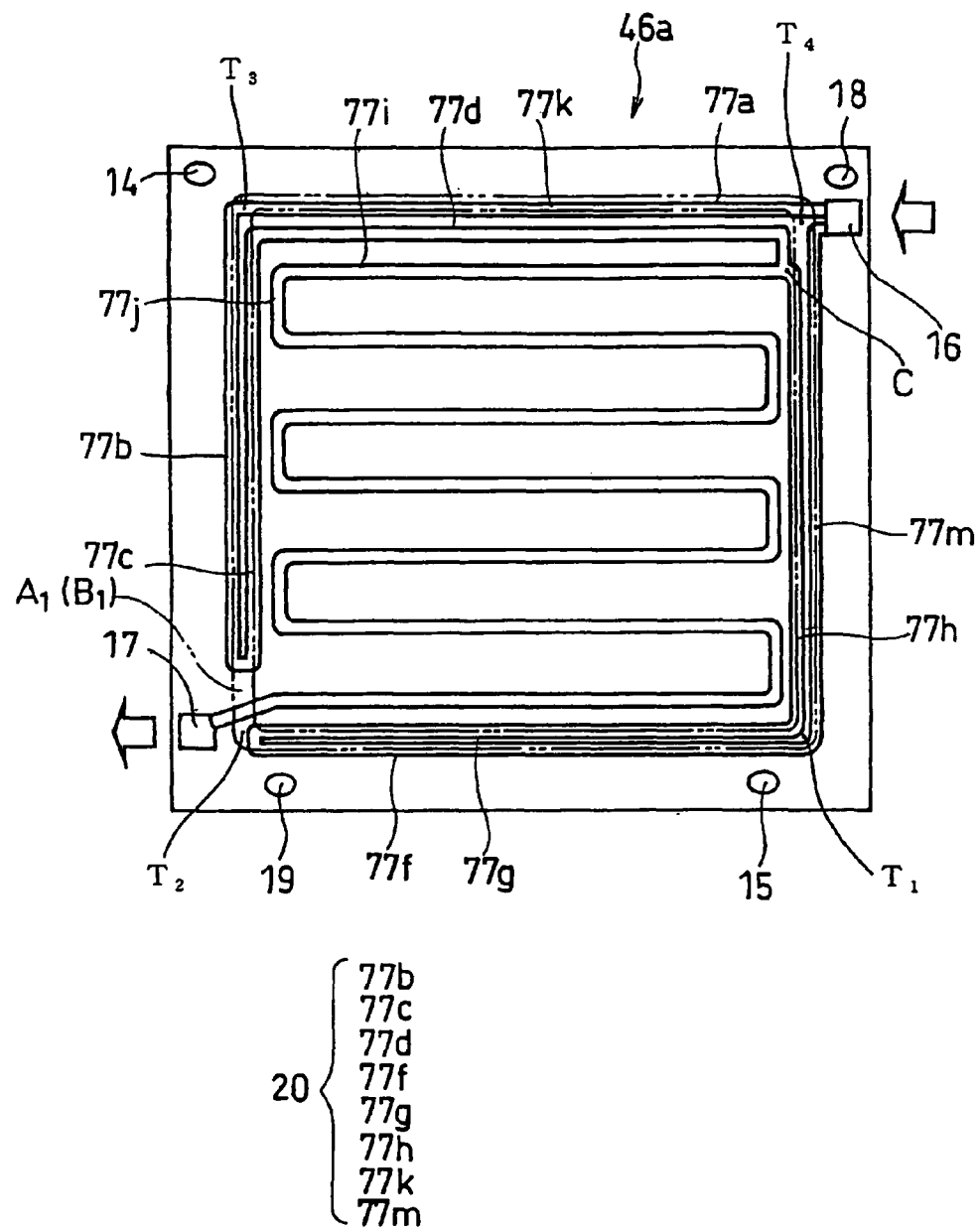
FIG. 18 is a front view of a main surface of cathode-side separator 46b to be incorporated into a fuel cell according to embodiment 3 of the present invention as viewed from the side of cooling fluid channel 8b.

FIG. 15 is a front view of a main surface of anode-side separator 46a to be incorporated into a fuel cell according to embodiment 3 of the present invention as viewed from the side of cooling fluid channel 8a. FIG. 16 is a front view of a main surface of anode-side separator 46a to be incorporated into a fuel cell according to embodiment 3 of the present invention as viewed from the side of gas channel 7a. FIG. 17 is a front view of a main surface of cathode-side separator 46b to be incorporated into a fuel cell according to embodiment 3 of the present invention as viewed from the side of gas channel 7a. FIG. 18 is a front view of a main surface of cathode-side separator 46b to be incorporated into a fuel cell according to embodiment 3 of the present invention as viewed from the side of cooling fluid channel 8b.

In this fuel cell and fuel cell stack, as shown in FIGS. 15 to 18, both the anode-side separator 46a and the cathode-side separator 46b have the following structures so as to obtain the effect of the present invention.

Specifically, in the anode-side separator 46a, there is formed a portion in which the anode-side gap 10a (see FIG. 1) formed between the anode-side gasket 9a (see FIG. 1) and the MEA 5 (see FIG. 1), the "upstream portion" of the cooling fluid channel 8a, and the "middle stream portion and subsequent portion" of the fuel gas channel 7a (in this fuel cell, particularly downstream portion) are arranged in proximity to one another to satisfy the conditions (I) and (II). Thereby, the anode-side gap 10a is filled with the condensed water, and therefore the reaction gas is more effectively utilized than conventional fuel cells.

Likewise, in the cathode-side separator 46b, there is formed a portion in which the cathode-side gap 10b (see FIG. 1) formed between the cathode-side gasket 9b (see FIG. 1) and the MEA 5 (see FIG. 1), the "upstream portion" of the cooling fluid channel 8b, and the "middle stream portion and subsequent portion" of the fuel gas channel 7b (in this fuel cell, particularly downstream portion) are arranged in proximity to one another to satisfy the conditions (I) and (II). Thereby, the cathode-side gap 10b is filled with the condensed water, and therefore the reaction gas is more effectively utilized than conventional fuel cells.

In the anode-side separator 46a shown in FIGS. 15 and 16 and the cathode-side separator 26b shown in FIGS. 17 and 18, the cooling fluid channel 8a of the anode-side separator 46a and the cooling fluid channel 8b of the cathode-side separator 26b have the same structure. When they are stacked in the same manner as the fuel stack 30 shown in FIG. 10 (when they are stacked such that the manifold apertures of the same type communicate), for example, the cooling fluid channel 8a and the cooling fluid channel 8b overlap with each other substantially completely. Likewise, the gas channel 7a of the anode-side separator 46a and the gas channel 7b of the cathode-side separator 46b have the same structure. When they are stacked in the same manner as the fuel stack 30 shown in FIG. 10 (when they are stacked such that the manifold apertures of the same type communicate), for example, the gas channel 7a and the gas channel 7b overlap with each other substantially completely.

As such, the following description focuses mainly on the anode-side separator 46a, and redundant description is omitted, and regarding the cathode-side separator 26b, only different points from the anode-side separator 46a are described.

In the anode-side separator 46a shown in FIG. 15, the cooling fluid channel 8a, which comprises two cooling fluid channels 8a, extends from the manifold aperture 16 for supplying cooling fluid to the portion corresponding to the anode 4a (electrode area, i.e., a portion corresponding to the area being in contact with the electrode and surrounded by the inner one of two one-dot chain lines in FIG. 15) along a region $A_1$ (a region included in the region corresponding to the anode-side gap 10a). The two cooling fluid channels comprise a channel 77a extending from a point $T_4$ nearest to the manifold aperture 16 for supplying cooling fluid in the region $A_1$ of FIG. 15 through a point $T_3$ nearest to the manifold aperture 14 for supplying fuel gas to a point $T_2$ nearest to the manifold aperture 17 for exhausting cooling fluid and a channel 77e extending from a point $T_4$ nearest to the manifold aperture 16 for supplying cooling fluid in the region $A_1$ of FIG. 15 through a point $T_1$ nearest to the manifold aperture 15 for exhausting fuel gas to the point $T_2$ nearest to the manifold aperture 17 for exhausting cooling fluid.

To explain more specifically, the channel 77a extending from the manifold aperture 16 for supplying cooling fluid is formed such that it extends along the region $A_1$ in a horizontal direction (in a direction substantially parallel to a side of the anode-side separator 46a of FIG. 15 where the manifold aperture 16 for supplying cooling fluid and the manifold aperture 14 for supplying fuel gas are formed) (more specifically, when viewed from a normal direction of the main surface of the anode-side separator 46a, the channel 77a is formed in such a position that it almost overlaps with the region $A_1$), and the channel 77a is connected to a straight portion 77b in the vicinity of a point $T_3$ in the region $A_1$ near the manifold aperture 15 for exhausting fuel gas.

Further, the straight portion 77b is formed such that it extends along the region $A_1$ in a vertical direction (in a direction substantially parallel to a side of the anode-side separator 46a of FIG. 18 where the manifold aperture 14 for supplying fuel gas and the manifold aperture 17 for exhausting cooling fluid are formed)(more specifically, when viewed from a normal direction of the main surface of the anode-side separator 46a, the straight portion 77b is formed in such a position that it almost overlaps with the region $A_1$), and the straight portion 77b is connected to a straight portion 77c in the vicinity of a point $T_3$ in the region $A_1$ near the manifold aperture 17 for exhausting cooling fluid.

The straight portion 77c is formed in a region corresponding to the anode-side void 10a in a vertical direction (more specifically, when viewed from a normal direction of the main surface of the anode-side separator 46a, the straight portion 77c is formed in such a position that it almost overlaps with the region $A_1$), and the straight portion 77c is connected to a straight portion 77d extending in a horizontal direction in the vicinity of the manifold aperture 14 for supplying fuel gas.

Particularly when viewed from a normal direction of the main surface of the anode-side separator 46a, the straight portions 77b and 77c of the channel 77a are arranged such that a part of the region $A_1$ is arranged between the straight portions 77b and 77c.

On the other hand, the channel 77e extending from the manifold aperture 16 for supplying cooling fluid is formed such that it extends along the region $A_1$ in a vertical direction (more specifically, when viewed from a normal direction of the main surface of the anode-side separator 46a, the channel 77e is formed in such a position that it almost overlaps with the region $A_1$), and the channel 77e is connected to a straight portion 77f in the vicinity of the point $T_1$ in the region $A_1$).

The straight portion 77f is formed such that it extends along the region $A_1$ in a horizontal direction (more specifically, when viewed from a normal direction of the main surface of the anode-side separator 46a, the straight portion 77f is formed in such a position that it almost overlaps with the region $A_1$), and the straight portion 77f is connected to a straight portion 77g in the vicinity of the manifold aperture 19 for exhausting oxidant gas.

The straight portion 77g is formed such that it extends along the region $A_1$ in a horizontal direction (more specifically, when viewed from a normal direction of the main surface of the anode-side separator 46a, the straight portion 77g is formed in such a position that it almost overlaps with the region $A_1$), and the straight portion 77g is connected to a straight portion 77h in the vicinity of the point $T_1$ in the region $A_1$.

Likewise, the straight portion 77h is formed such that it extends along the region $A_1$ in a horizontal direction (more specifically, when viewed from a normal direction of the main surface of the anode-side separator 46a, the straight portion 77h is formed in such a position that it almost overlaps with the region $A_1$).

Particularly when viewed from a normal direction of the main surface of the anode-side separator 46a, the straight portions 77f and 77g of the channel 77e are arranged such that a part of the region $A_1$ is arranged between the straight portions 77f and 77g. Further, when viewed from a normal direction of the main surface of the anode-side separator 46a, the straight portions 77m and 77f of the channel 77e are arranged such that a part of the region $A_1$ is arranged between the straight portions 77m and 77f.

Furthermore, the cooling fluid channel 8a shown in FIG. 15, which comprises two channels 77a and 77e extending from the manifold aperture 16 for supplying cooling fluid as described above, is connected, at a point C in FIG. 18, to the straight portion 77d of the channel 77a and the straight portion 77h of the channel 77e, forming a single channel. In order to effectively use the main surface of the anode-side separator 46a, the cooling fluid channel 8a has, in the downstream side from the point C in FIG. 18, a serpentine structure comprising seven straight portions 77i (long channels) extending in a horizontal direction and six turn portions 77j (short channels) for connecting the ends of each adjacent pair of the straight portions 77i from upstream side to down stream side.

As shown in FIG. 15, in the upstream of the cooling fluid channel 8a, the region 20 near the manifold aperture for supplying cooling fluid is formed in a region corresponding to the anode-side gap 10a. Specifically, the previously described "upstream portion" of the cooling fluid channel 8a that satisfies the equation: $L1 \leq L2$ {i.e., the upstream side channel 77a (the channel comprising the straight portions 77k, 77b, 77c and 77d) and the channel 77e (the channel comprising the straight portions 77m, 77f, 77g and 77h)} is formed in the region corresponding to the anode-side gap 10a.

In the anode-side separator 46a shown in FIG. 16, the gas channel 7a has a serpentine structure comprising the following straight portions and turn portions formed in the portion corresponding to the anode 4a (electrode area, i.e., a portion corresponding to the area being in contact with the electrode and surrounded by the inner one of two one-dot chain lines in FIG. 16).

To explain more specifically, the gas channel 7a shown in FIG. 16 extends from the manifold aperture 14 for supplying fuel gas to the portion corresponding to the anode 4a (electrode area), intersecting the anode-side gap 10a with the shortest distance from the manifold aperture 14. Further, the fuel gas channel 7a comprises eleven straight portion 77a (long channels) extending in a horizontal direction (a direction substantially parallel to a side of the anode-side separator 46a of FIG. 16 where the manifold aperture 14 for supplying fuel gas and the manifold aperture 18 for supplying oxidant gas are formed), and ten turn portions 77b (short channels) for connecting the ends of each adjacent pair of the straight portions from upstream side to downstream side. The fuel gas channel 7a further comprises a straight portion 77g whose one end is connected to the most downstream end (straight portion 77f described later) of the straight portion 77a and whose other end is connected to the manifold aperture 15 for exhausting fuel gas.

In the gas channel 7a, a region 21 almost corresponding to the previously described "middle stream portion and subsequent portion" that satisfies the equation: $L3 \leq \{(1/3) \times L4\}$ {i.e., a region including the straight portions 77g and 77f, the turn portion 77d, the straight portion 77e, the turn portion 77h, the straight portion 77c, the turn portion 77i, the straight portion 77j and the turn portion 77k in FIG. 16} is formed in the region corresponding to the anode-side gap 10a. The region 21 is formed in proximity to the region 20 almost corresponding to the "upstream portion" of the cooling fluid channel 8a of FIG. 15.

In the fuel cell and the fuel cell stack according to this embodiment having a structure as described above, reaction gas having a large amount of water vapor flows into at least one of the anode-side gap 10a formed between the anode-side gasket 9a and the membrane electrode assembly 5 and the cathode-side gap 10b formed between the cathode-side gasket 9b and the membrane electrode assembly 5. Generally, the moisture contained in the reaction gas starts to condense when the dew point of the gas rises above ambient temperature. In the fuel cell and the fuel cell stack, because the upstream portion 20 of the cooling fluid channel 8a is formed in the region corresponding to the anode-side gap 10a and the upstream portion 20 of the cooling fluid channel 8a is formed in the region corresponding to the cathode-side gap 10b, the water vapor contained in reaction gas is effectively cooled in the anode-side gap 10a and the cathode-side gap 10b. Accordingly, the water vapor condenses in at least a part of the anode-side gap 10a and at least a part of the cathode-side gap 10b, and the anode-side gap 10a and the cathode-side gap 10b are filled with the condensed water.

As a result of the water condensation in the anode-side gap 10a and the cathode-side gap 10b, the anode-side gap 10a and the cathode-side gap 10b are filled, so that the reaction gas does not flow into the portions except the gas channels 7a and 7b, that is, the anode-side gap 10a and the cathode-side gap 10b, making sure the supply of reaction gas to the gas channel 7a and the gas channel 7b. Accordingly, efficient use of reaction gas is achieved, improving power generation performance.

In this embodiment, in the anode-side gap 10a, as routes which a reaction gas from the manifold aperture 14 for supplying fuel gas enters, there are two routes: a first route (a route starting from a point $T_3$ near the manifold aperture 14 for supplying fuel gas through a point $T_2$ near the manifold aperture 17 for exhausting cooling fluid to a point $T_1$ near the manifold aperture 15 for exhausting fuel gas in FIG. 15); and a second route longer than the first route (a route starting from the point $T_1$ near the manifold aperture 14 for supplying fuel gas through a point $T_4$ near the manifold aperture 18 for supplying oxidant gas to the point $T_1$ near the manifold aperture 15 for exhausting fuel gas in FIG. 15).

The upstream portion 20 of the cooling fluid channel 8a of the anode-side separator 46a and the region 21 (the middle stream portion and subsequent portion) of the gas channel 7a are formed in proximity to both a region corresponding to a part of the first route of the anode-side gap 10a and a region corresponding to a part of the down stream of the second route which is near the manifold aperture 15 for exhausting fuel gas. Thereby, both the first and second routes of the anode-side gap 10a are filled with condensed water, so that the reaction gas can be more effectively used than conventional fuel cells. Particularly, in this structure, reaction gas flows into the short first route rather than the long second route. Because a part of the most upstream channels 77a and 77e having the lowest temperature in the cooling fluid channel 8a can be arranged near the first route, the water can be condensed in the first route prior to the second route, preventing the flowing of reaction gas into the gaps.

Because the cathode-side separator 26b has the same structure as the anode-side separator 26a, it is apparent that the effect obtained in the anode-side separator 26a described above is similarly obtained in the cathode-side separator 26b.

Similar to the fuel cell 10 and the fuel cell stack 30 according to embodiment 1 described previously, in the fuel cell and the fuel cell stack according to this embodiment also, in all the anode-side separators 46a and all the cathode-side separators 46b shown in FIGS. 15 to 18, the cooling fluid channel 8a, the cooling fluid channel 8b, the fuel gas channel 7a and the oxidant gas channel 7b are formed such that "their main portions are substantially parallel to each other".

Thereby, in all the MEAs 5, when viewed in a plane parallel to the main surface of the anode-side separators 46a and the main surface of all the cathode-side separators 46b, the entire flow direction (running direction) of the cooling fluid from upstream to downstream of the cooling fluid channel and the entire flow direction (running direction) of the reaction gas (fuel gas and oxidant gas) can be made substantially the same in an extremely easy manner.

As a result, because the downstream portion of the gas channel where a reaction gas having a large amount of water vapor flows corresponds to the downstream portion of the cooling fluid channel where a cooling fluid having a high temperature flows, the saturated vapor pressure ($P^0_{H2O}$) increases at the downstream side of the reaction gas flow, reducing excessive production of condensed water. Accordingly, the moisture content of the electrode surface is maintained at a favorable level, and it is possible to ensure the prevention of flooding at the catalyst layers 2a and 2b.

In this case, by reducing the saturated vapor pressure ($P^0_{H2O}$) at the upstream side of the reaction gas flow, it is possible to further ensure the prevention of drying of the polymer electrolyte membrane 1. Further, in this case, because the upstream portion of the reaction gas flow having a higher concentration of reactant and a large reaction heat corresponds to the upstream portion of the cooling fluid flow having a low temperature, differences in temperature distribution over the main surface of the anode 4a and the main surface of the cathode 4b can be reduced sufficiently, thereby enabling more efficient cooling of the fuel cell and fuel cell stack comprising a plurality of the fuel cells laminated.

Embodiment 4

A description is now given of embodiment 4 of the present invention.

Figure 19:
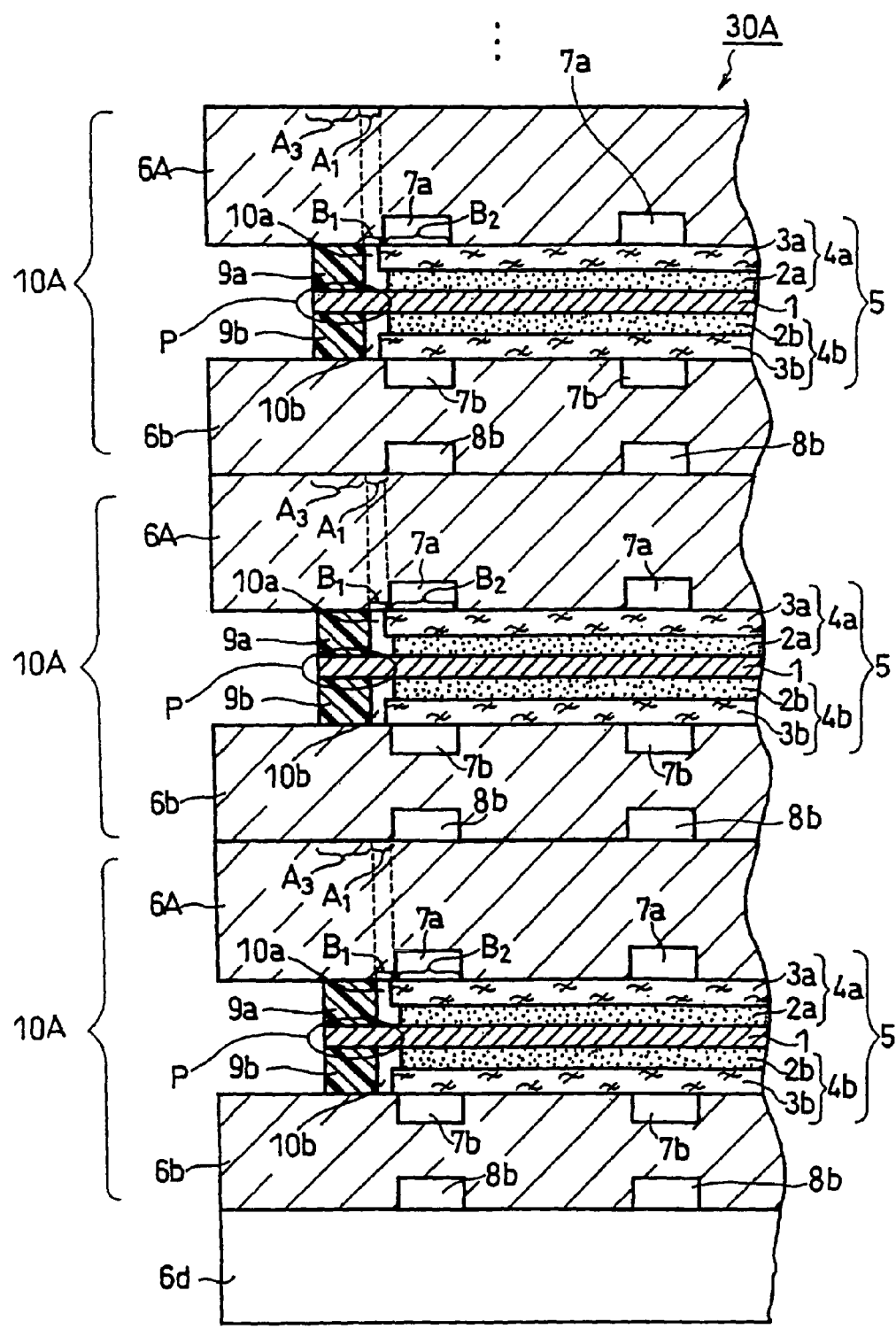
FIG. 19 is a schematic cross sectional view of a relevant part of fuel cells and a fuel cell stack according to embodiment 4 of the present invention illustrating a basic structure thereof.

FIG. 19 is a schematic cross sectional view of a relevant part of fuel cells and a fuel cell stack according to embodiment 4 of the present invention illustrating a basic structure thereof.

A fuel cell stack 30A according to embodiment 4 shown in FIG. 19 has the same structure as the fuel cell stack 30 according to embodiment 1 shown in FIG. 10 except that a plurality of fuel cells 10A having a different structure from the fuel cell 10 shown in FIG. 10 are incorporated, and that an end separator 6d is used instead of the end separator 6C shown in FIG. 10.

To explain more specifically, the fuel cells 10A in FIG. 19 have the same structure as the fuel cell 10 in FIG. 1 except that they have an anode-side separator 6A without cooling fluid channel, instead of the anode-side separator 6a of fuel cell 10 in FIG. 1. The end separator 6d in FIG. 19 has the same structure as the end separator 6c in FIG. 10 except that the end separator 6d does not have the cooling fluid channel 6C.

According to this structure, it is possible to reduce the load on a supplying means (e.g., a water pump in the case of the cooling fluid being cooling water) for supplying a cooling fluid to the fuel cell stack 30A from the outside, improving the system efficiency of the power generation system.

Even the fuel cell stack 30A in which cooling fluid channels 8b are formed only in the cathode-side separators 6b can offer the effect of the present invention described previously. In the fuel cell stack 30A, each cooling fluid channel 6b sufficiently cools both the anode-side separator 6A in close contact with the cooling fluid channel 6b and the cathode-side separator 6b.

In other words, in the anode-side separator 6a, there is formed a portion in which the anode-side gap 10a (see FIG. 1) formed between the anode-side gasket 9a (see FIG. 1) and the MEA 5 (see FIG. 1), the "upstream portion" of the cooling fluid channel "8a" and the "middle stream portion and subsequent portion" of the fuel gas channel 7a (particularly, the downstream portion in this fuel cell) are formed in proximity to one another to satisfy the conditions (I) and (II) described previously. Thereby, the anode-side gap 10a is filled with condensed water, and therefore the reaction gas is more efficiently used than conventional fuel cells.

In the cathode-side separator 6b also, there is formed a portion in which the cathode-side gap 10b (see FIG. 1) formed between the cathode-side gasket 9b (see FIG. 1) and the MEA 5 (see FIG. 1), the "upstream portion" of the cooling fluid channel "8b" and the "middle stream portion and subsequent portion" of the fuel gas channel 7b (particularly, the downstream portion in this fuel cell) are formed in proximity to one another to satisfy the conditions (I) and (II) described previously. Thereby, the cathode-side gap 10b is filled with condensed water, and therefore the reaction gas is more efficiently used than conventional fuel cells.

Note that, even when the structure is the reverse of this embodiment, the effect of the present invention can be similarly obtained. In other words, even when a cathode-side separator without the cooling fluid channel 8b (not shown) is used, instead of the cathode-side separator 6b of the fuel cell 10 shown in FIG. 1, the effect of the present invention can be obtained similarly.

Embodiment 5

A description is now given of embodiment 5 of the present invention.

Figure 20:
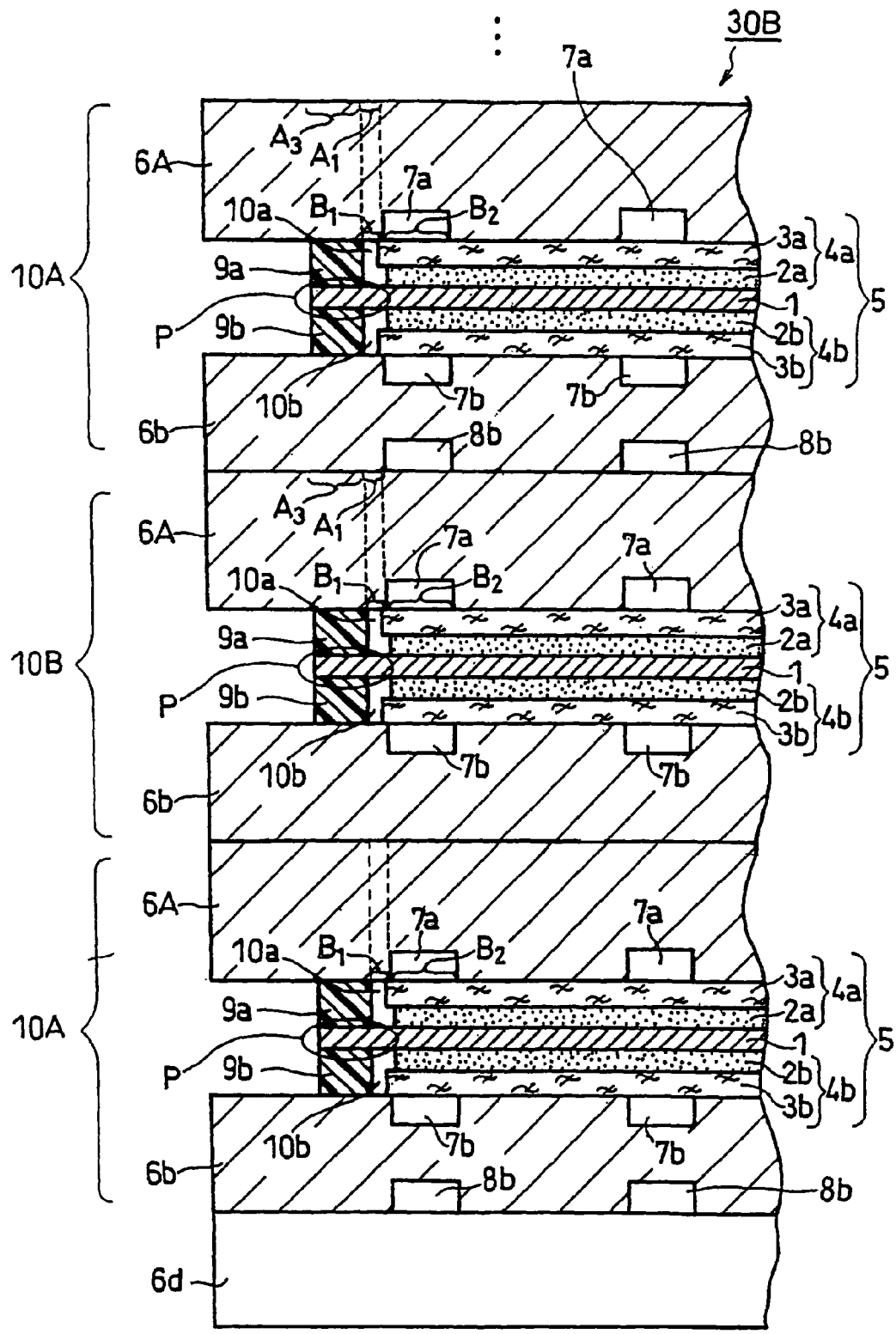
FIG. 20 is a schematic cross sectional view of a relevant part of a fuel cell stack according to embodiment 5 of the present invention illustrating a basic structure thereof.
Figure 21:
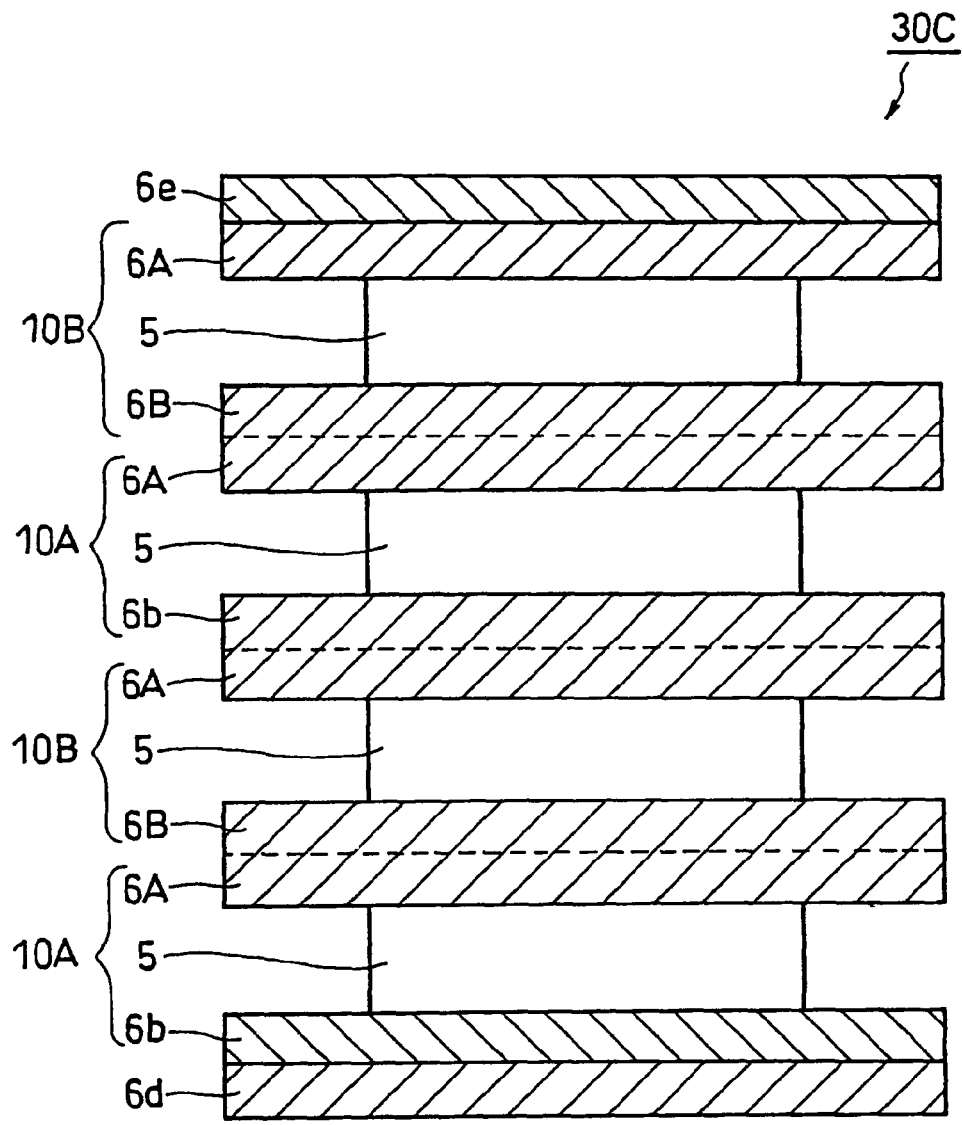
FIG. 21 is a schematic cross sectional view of a fuel cell stack having a structure of the fuel cell stack 30B according to embodiment 5 shown in FIG. 20.

FIG. 20 is a schematic cross sectional view of a relevant part of a fuel cell stack according to embodiment 5 of the present invention illustrating a basic structure thereof. FIG. 21 is a schematic cross sectional view of a fuel cell stack having a structure of the fuel cell stack 30B according to embodiment 5 shown in FIG. 20.

The fuel cell stack 30B according to embodiment 5 shown in FIG. 20 have the same structure as the fuel cell stack 30A according to embodiment 4 shown in FIG. 19 except that a fuel cell 10B having a structure different from the fuel cell 10A according to embodiment 4 shown in FIG. 19 is arranged between two fuel cells 10A.

To explain more specifically, the fuel cell 10B shown in FIG. 20 has the same structure as the fuel cell 10 shown in FIG. 19 except that the fuel cell 10B has a cathode-side separator 6b without the cooling fluid channel in place of the cathode-side separator 6b of the fuel cell 30A shown in FIG. 19.

As a specific example of the fuel cell stack 30B shown in FIG. 20 in which four MEAs 5 are stacked, a fuel cell stack 30C having a structure shown in FIG. 21 is given. The fuel cell stack 30C shown in FIG. 21 is configured by disposing a second fuel cell 10B on the further most fuel cell 10A from the end separator 6e of the fuel cell stack 30B shown in FIG. 20 and disposing another end separator 6d on the second fuel cell 10B. In this embodiment, a cooling fluid channel (not shown), the same one as the cooling fluid channel of the cathode-side separator 6b of the fuel cell stack 30C, is formed on the main surface of the anode-side separator 6A in contact with the end separator 6e shown in FIG. 21.

Similar to the fuel cell stack 30A shown in FIG. 19, in this fuel cell stack 30B also, it is possible to reduce the load on a supplying means (e.g., a water pump in the case of the cooling fluid being cooling water) for supplying cooling fluid to the fuel cell stack 30B from the outside, improving the system efficiency of the power generation system.

Even when the fuel cell 10B without the cooling fluid channel 8b is disposed between the fuel cells 10A having the cooling fluid channels 6b only in the cathode-side separators 6b thereof, the effect of the present invention described previously can be obtained. Specifically, in the fuel cell stack 30B, the two fuel cells 10A as well as the fuel cell 10B disposed between the two fuel cells 10A can be cooled sufficiently by the two cooling fluid channels 8b of the two adjacent fuel cells 10A.

As long as the effect of the present invention is obtained, a laminate comprising two fuel cells 10B or more may be disposed between the two fuel cells 10A. From the viewpoint of ensuring the effect of the present invention, the number of the fuel cells 10B incorporated into the laminate comprising two fuel cells 10B or more is preferably two.

When the cathode-side separator 6B of the fuel cell 10B is disposed on the anode-side separator 6A of the fuel cell 10A, the anode-side separator 6A and the cathode-side separator 6B may be combined to form a single separator.

Embodiment 6

A description is now given of embodiment 6 of the present invention. A fuel cell stack according to embodiment 6 is configured by changing the structures of the cathode-side separator 6b, the anode-side separator 6A, the cathode-side separator 6B and the end separator 6e of the fuel cell 10A and the fuel cell stack 30C shown in FIG. 21, and thus it has the same structure as the fuel cell 10A and the fuel cell stack 30C shown in FIG. 21 except for the anode-side separators and cathode-side separators.

The following describes a cathode-side separator 6b, an anode-side separator 6A, cathode-side separator 6B and an end separator 6e to be incorporated into a fuel cell stack according to embodiment 6.

Figure 22:
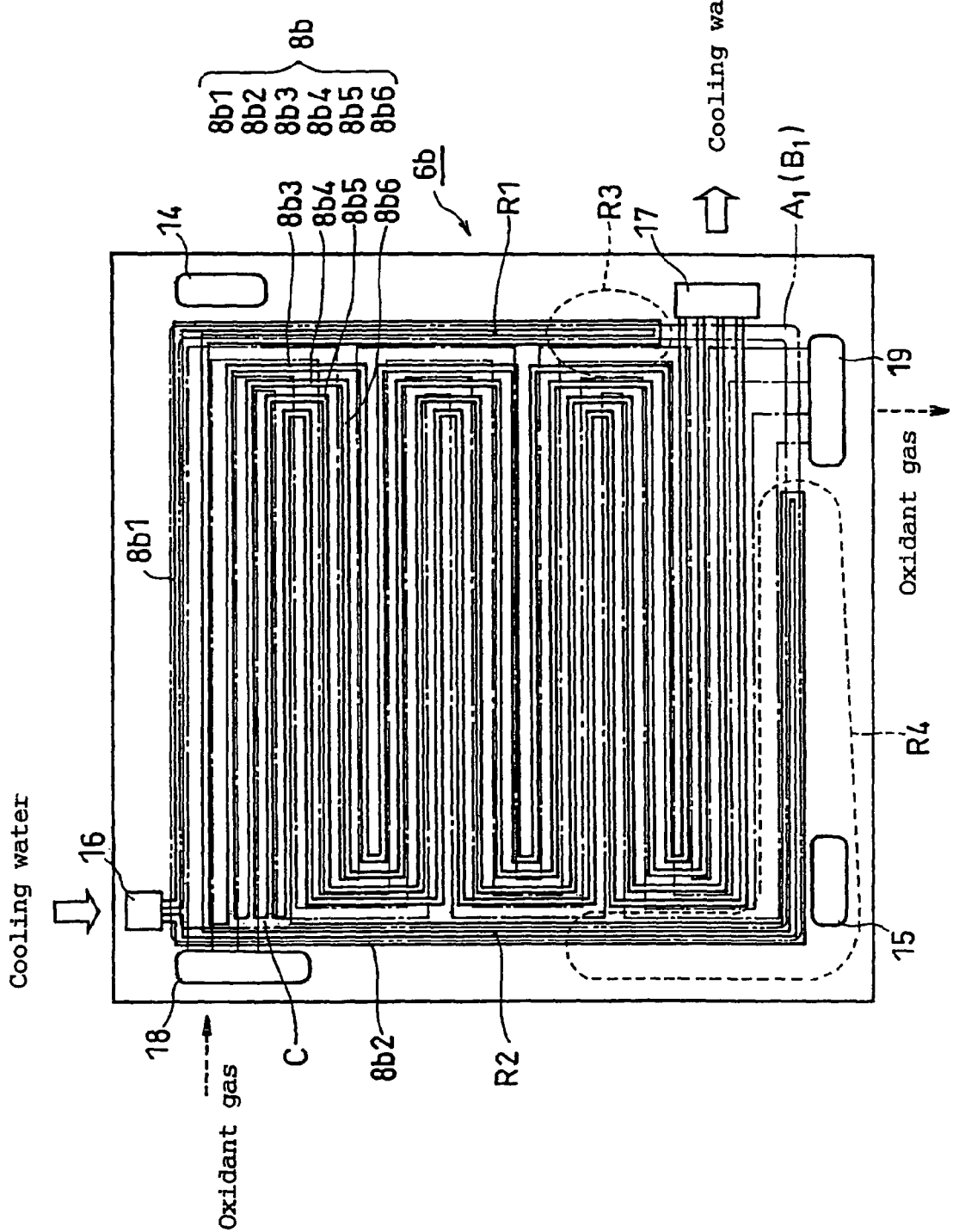
FIG. 22 is a front view of a main surface of cathode-side separator 6b to be incorporated into a fuel cell and a fuel cell stack according to embodiment 6 of the present invention as viewed from the side of cooling fluid channel 8b.
Figure 23:
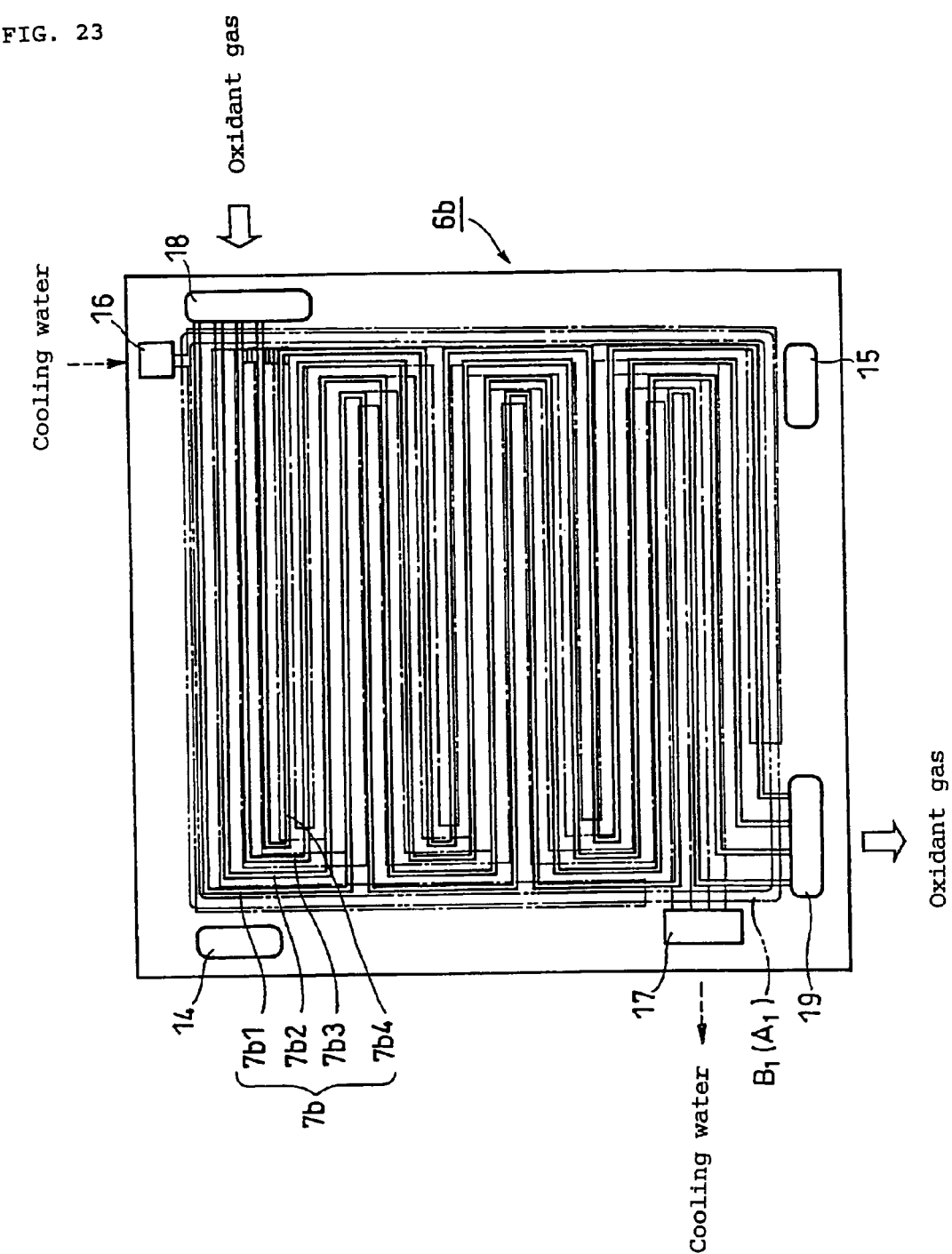
FIG. 23 is a front view of a main surface of cathode-side separator 6b to be incorporated into a fuel cell and a fuel cell stack according to embodiment 6 of the present invention as viewed from the side of gas channel 7b.
Figure 24:
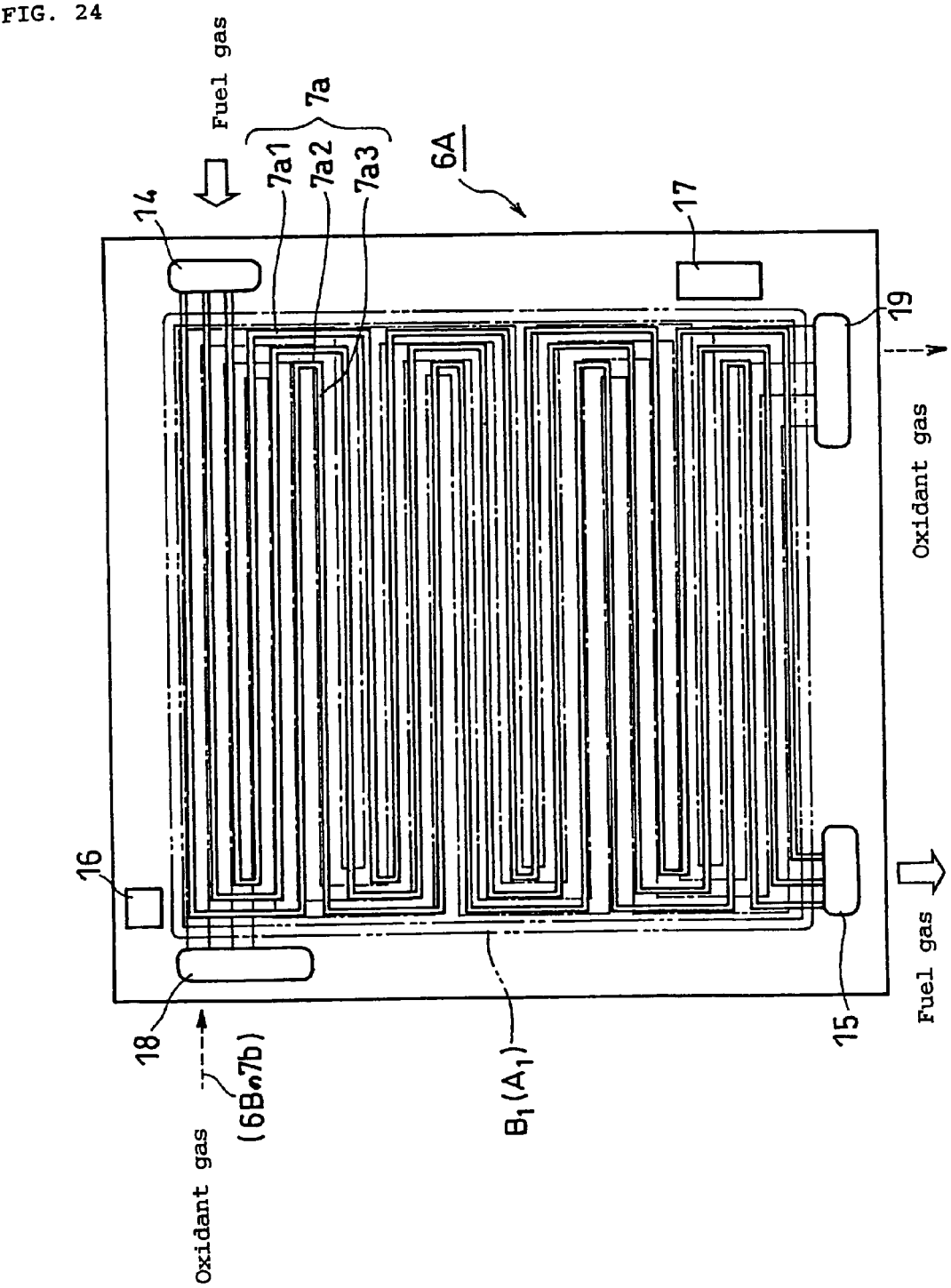
Figure 25:
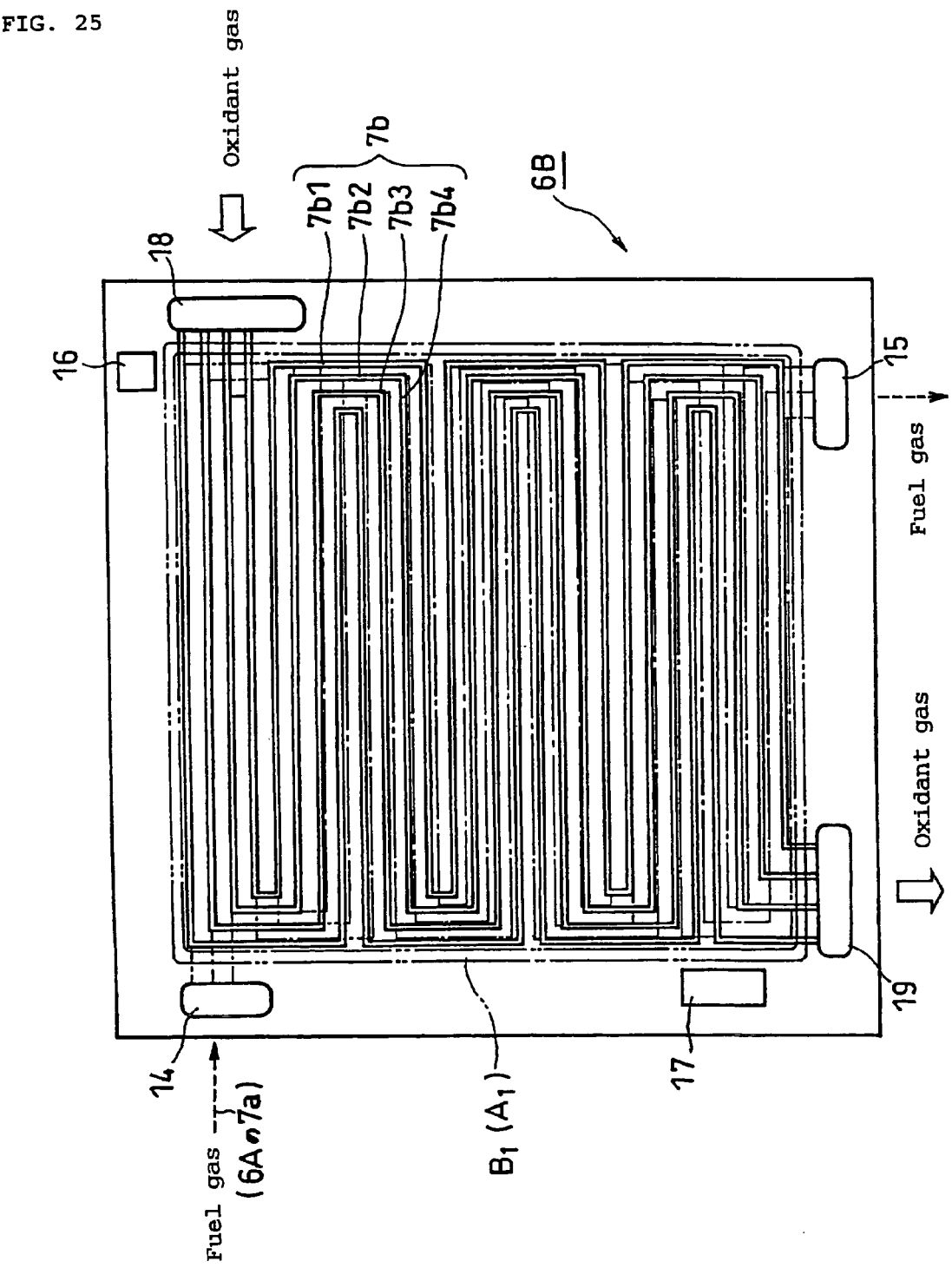
FIG. 25 is a front view of a main surface of cathode-side separator 6B to be incorporated into a fuel cell and a fuel cell stack according to embodiment 6 of the present invention as viewed from the side of gas channel 7b.
Figure 26:
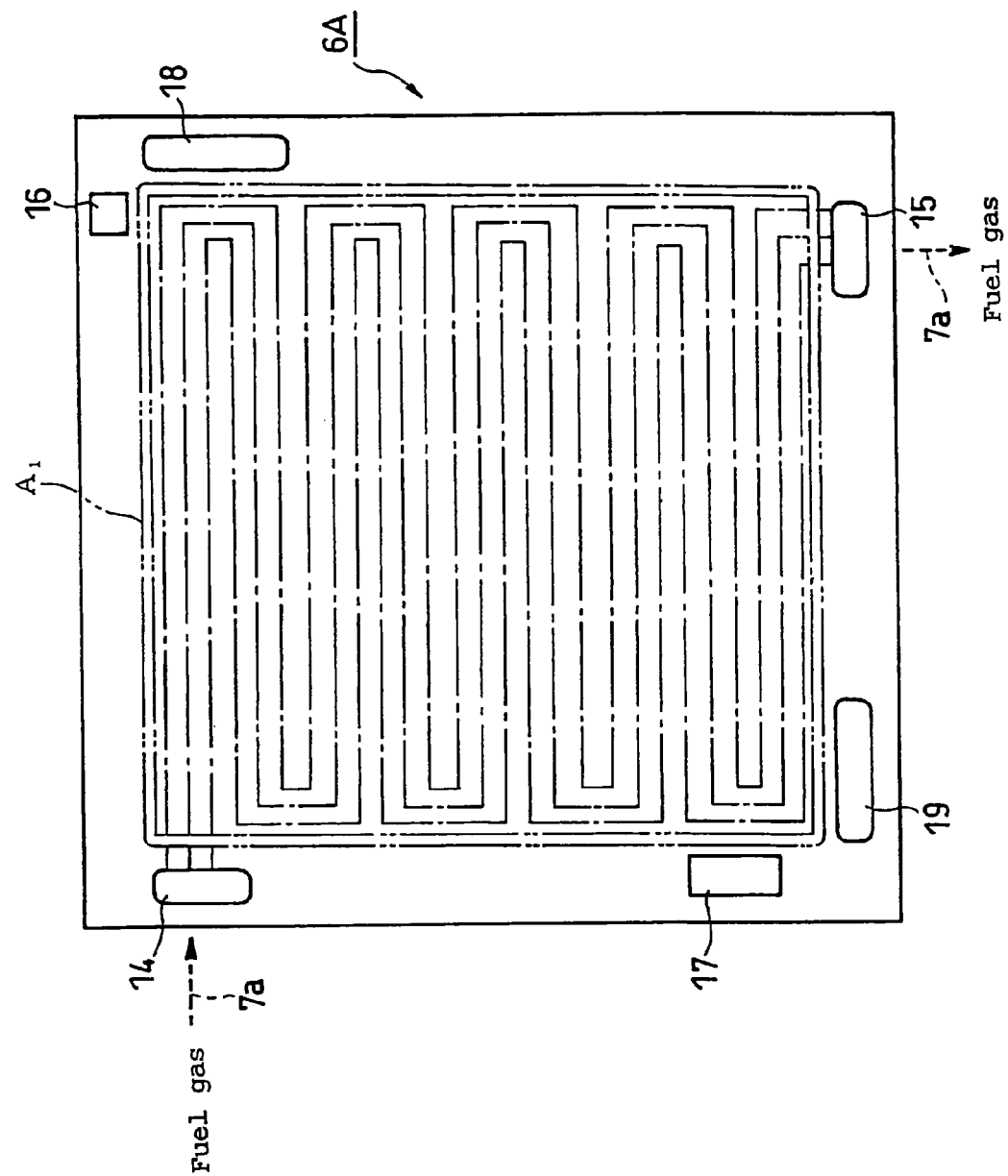
FIG. 26 is a front view of a main surface of anode-side separator 6A to be incorporated into a fuel cell and a fuel cell stack according to embodiment 6 of the present invention as viewed from the side in which gas channel 7a is not formed.

FIG. 22 is a front view of a main surface of cathode-side separator 6b to be incorporated into a fuel cell and a fuel cell stack according to embodiment 6 of the present invention as viewed from the side of cooling fluid channel 8b. FIG. 23 is a front view of a main surface of cathode-side separator 6b to be incorporated into a fuel cell and a fuel cell stack according to embodiment 6 of the present invention as viewed from the side of gas channel 7b. FIG. 24 is a front view of a main surface of anode-side separator 6A to be incorporated into a fuel cell and a fuel cell stack according to embodiment 6 of the present invention as viewed from the side of gas channel 7a. FIG. 25 is a front view of a main surface of cathode-side separator 6B to be incorporated into a fuel cell and a fuel cell stack according to embodiment 6 of the present invention as viewed from the side of gas channel 7b. FIG. 26 is a front view of a main surface of anode-side separator 6A to be incorporated into a fuel cell and a fuel cell stack according to embodiment 6 of the present invention as viewed from the side of the main surface thereof where a gas channel 7a is not formed.

A cathode-side separator 6b to be incorporated into a fuel cell stack according to embodiment 6 has, instead of the cooling fluid channel 8b of the cathode-side separator 6b shown in FIG. 21, a plurality of cooling fluid channels 8b as shown in FIG. 22. Likewise, the cathode-side separator 6b to be incorporated into a fuel cell stack according to embodiment 6 has, instead of the gas channel 7b of the cathode-side separator 6b shown in FIG. 21, a plurality of gas channels 7a as shown in FIG. 23.

In FIG. 22, the cooling fluid channel 8b before the junction/branch point C has the same structure as the cooling fluid channel 8a before the junction/branch point C located in the upstream side shown in FIG. 15. That is, two channels 8b1 (corresponding to 77a of FIG. 15) and 8b2 (corresponding to 77e of FIG. 15) are formed such that they extend from the manifold 16 for supplying cooling fluid along the region A1. A difference between the cooling fluid channel 8b shown in FIG. 22 and the cooling fluid channel 8a shown in FIG. 15 is that the cooling fluid channel 8b is branched into four channels (a channel 8b3, a channel 8b4, a channel 8b5 and a channel 8b6) from the junction/branch point C. Similar to the cooling fluid channel 8a shown in FIG. 15, the four channels (a channel 8b3, a channel 8b4, a channel 8b5 and a channel 8b6) of the cooling fluid channel 8b shown in FIG. 22 have seven straight portions and six turn portions.

Further, the cathode-side separator 6b shown in FIG. 22, the manifold 16 for supplying cooling fluid and the manifold 18 for supplying oxidant gas are arranged in a reverse manner to the manifolds 16 and 18 of the anode-side separator 6a shown in FIG. 15. In the cathode-side separator 6b shown in FIG. 22, the manifold 17 for exhausting cooling fluid and the manifold 19 for exhausting oxidant gas are arranged in a reverse manner to the manifolds 17 and 19 of the anode-side separator 6a shown in FIG. 15.

Note that the cooling fluid channel 8a shown in FIG. 15 is a channel for the anode-side separator 6a, and the cooling fluid channel 8b shown in FIG. 22 is a channel for the cathode-side separator 6b.

On the other surface of the cathode-side separator 6b shown in FIG. 22 (on a surface of the cathode-side separator 6b shown in FIG. 22 opposite to the main surface thereof where the cooling fluid channel 8b is formed) is formed an oxidant gas channel 7b. The gas channel 7b comprises four channels (a channel 7b1, a channel 7b2, a channel 7b3 and a channel 7b4). One end of the four channels is connected to a manifold 18 for supplying oxidant gas. The other end of the four channels is connected to a manifold 19 for exhausting oxidant gas.

The four channels each have a serpentine structure having seven straight portions and six turn portions. The four channels are formed parallel to each other at equal intervals. The interval between adjacent channels of the four channels (a channel 7b1, a channel 7b2, a channel 7b3 and a channel 7b4) is almost equal to that of the four channels (the channel 8b3, channel 8b4, channel 8b5 and channel 8b6) of the cooling fluid channel 8b shown in FIG. 22. The four channels (the channel 7b1, channel 7b2, channel 7b3 and channel 7b4) and the four channels (the channel 8b3, channel 8b4, channel 8b5 and channel 8b6) are formed such that "their main portions are substantially parallel to each other" as described previously.

In order to schematically show a positional relationship between the gas channel 7b and the cooling fluid channel 8b of the cathode-side separator 6b, the gas channel 7b is indicated by a one-dot line in FIG. 22, and the cooling fluid channel 8b is indicated by a one-dot line in FIG. 23.

An anode-side separator 6A to be incorporated into a fuel cell stack according to embodiment 6 has, instead of the gas channel 7a of the anode-side separator 6A shown in FIG. 21, a gas channel 7a as shown in FIG. 24. This gas channel 7a comprises three channels (a channel 7a1, a channel 7a2 and a channel 7a3). One end of the three channels is connected to a manifold 14 for supplying fuel gas. The other end of the three channels is connected to a manifold 15 for exhausting fuel gas.

The three channels each have a serpentine structure having nine straight portions and eight turn portions. The three channels are formed parallel to each other at equal intervals. The interval between adjacent channels of the three channels (the channel 7a1, channel 7a2 and channel 7a3) is almost equal to that of the four channels (the channel 8b3, channel 8b4, channel 8b5 and channel 8b6) of the cooling fluid channel 8b shown in FIG. 22. The three channels (the channel 7a1, channel 7a2 and channel 7a3) and the four channels (the channel 8b3, channel 8b4, channel 8b5 and channel 8b6) shown in FIG. 22 are formed such that "their main portions are substantially parallel to each other" as described previously.

In order to schematically show a positional relationship between the gas channel 7a of the anode-side separator 6A and the gas channel 7b of the cathode-side separator 6B, the gas channel 7b is indicated by a one-dot line in FIG. 24, and the gas channel 7a is indicated by a one-dot line in FIG. 25 described later. FIG. 26 shows a main surface of the anode-side separator 6A where the gas channel 7a is not formed.

As shown in FIG. 25, the cathode-side separator 6B to be incorporated into a fuel cell stack according to embodiment 6 has the same structure as the cathode-side separator 6b shown in FIG. 23 except that the cathode-side separator 6B does not have the cooling fluid channel. Specifically, the cathode-side separator 6B to be incorporated into a fuel cell according to embodiment 6 has the same gas channel (four channels) as the gas channel 7b shown in FIG. 23. Similar to the above, the gas channels and the four channels of the cooling fluid channel 8b shown in FIG. 22 are formed such that "their main portions are substantially parallel to each other" as described previously.

Figure 27:
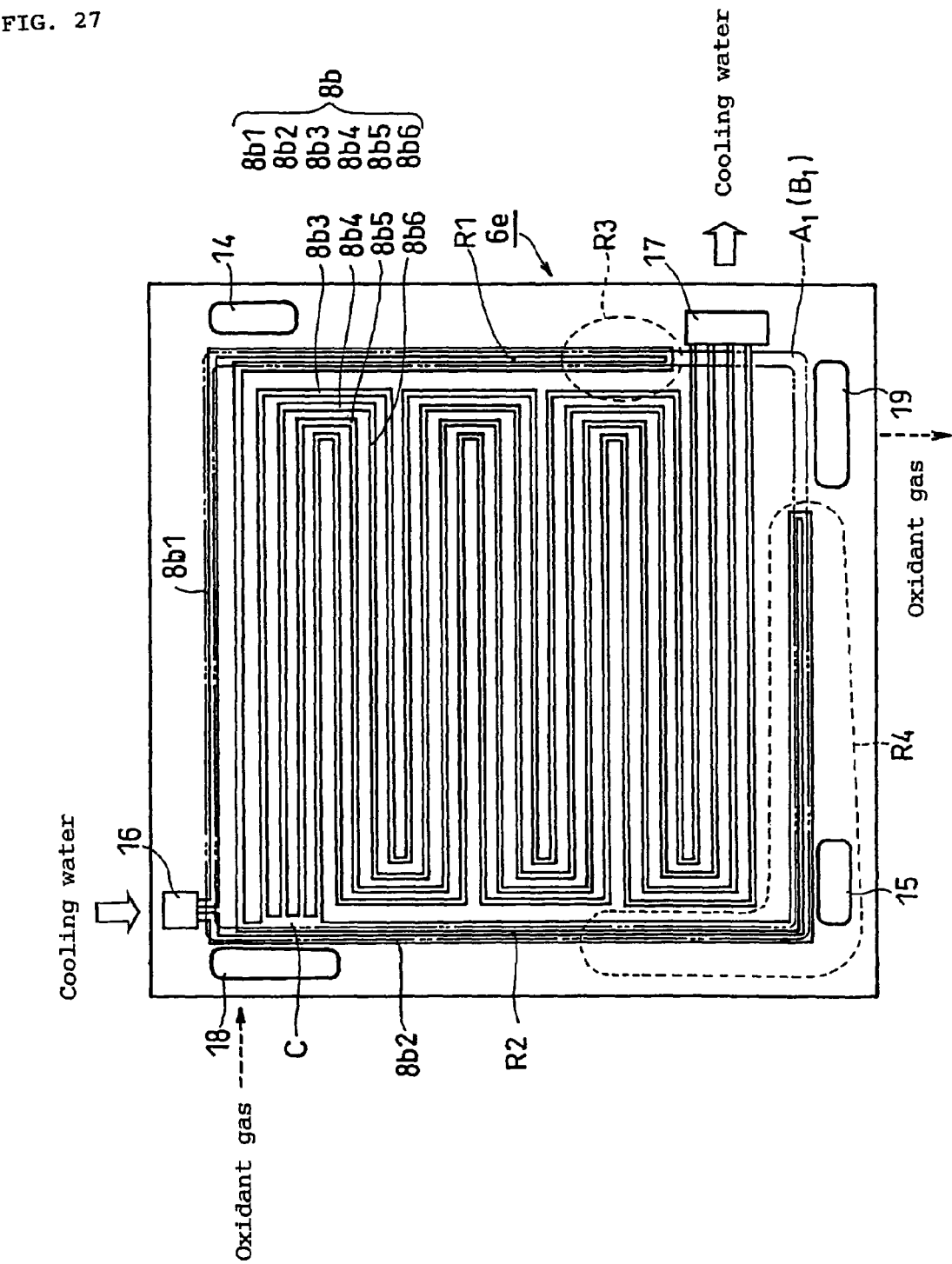
FIG. 27 is a front view of a main surface of end separator 6e to be incorporated into a fuel cell stack according to embodiment 7 of the present invention as viewed from the side of cooling fluid channel 8f.

The end separator 6e to be incorporated into a fuel cell stack according to embodiment 6 has the same structure as the end separator 6e shown in FIG. 21 except that the end separator 6e according to embodiment 6 has the cooling fluid channel 8b shown in FIG. 27. The end separator 6e to be incorporated into a fuel cell stack according to embodiment 6 has the same cooling fluid channel as the cooling fluid channel 8b formed in the cathode separator 6b to be incorporated into a fuel cell according to embodiment 6 shown in FIG. 22. This gas channel 8b shown in FIG. 27 and the gas channel 7b shown in FIG. 23 are formed such that "their main portions are substantially parallel to each other" as described previously.

In the fuel cell stack according to embodiment 6 having the structure as described above, for example, in the cathode-side separator 6*b* and the anode-side separator 6A interposed between the fuel cells 10A and 10B, there is formed a portion (e.g., a range including ranges R3 and R4 in FIG. 22) in which the cathode-side gap 10*b* formed between the cathode-side gasket 9*b* and the MEA 5, the anode-side gap 10*a* formed between the anode-side gasket 9*a* and the MEA 5, the "upstream portion" of the cooling fluid channel 8*b* of the cathode-side separator 6*b*, the "middle stream portion and subsequent portion" (in this fuel cell, particularly downstream portion) of the oxidant gas channel 7*b* of the cathode-side separator 6*b*, and the "middle stream portion and subsequent portion" (in this fuel cell, particularly downstream portion) of the fuel gas channel 7*a* of the anode-side separator 6A are arranged in proximity to one another to satisfy the conditions (I) and (II). Thereby, the cathode-side gap 10*b* facing the anode-side separator 6A and the anode-side gap 10*a* facing the cathode-side separator 6*b* are filled with the condensed water, and therefore the reaction gas is more effectively utilized than conventional fuel cells.

In the cooling fluid channel 8*b* of the end separator 6*e* shown in FIG. 27, for example, in the region containing regions 3 and 4 in FIG. 27, the anode-side gap 10*a* facing the anode-side separator 6A can be filled with the condensed water.

From a design point of view, the conditions for the cooling fluid channel of the separator such as the cross-sectional area of channel, the number of straight portions and the number of turn portions are determined in light of the load on a supplying means (e.g., a water pump) for supplying a cooling fluid to the channel, the distribution of cooling water from a supplying means (e.g., a water pump) to cooling fluid channels of a plurality of separators, etc. For this reason, a cooling fluid channel comprising a plurality of channels may be formed as in the case of this embodiment 6.

The conditions for the cooling fluid channel of the separator such as the number of straight portions and the number of turn portions are sometimes determined based on the relationship with the fuel gas channel of the anode of a separator facing the separator with an electrolyte membrane therebetween, rather than based on the relationship with the cooling water channel formed on the other surface of the separator. This is because, during the design of fuel gas channel and oxidant gas channel, from the viewpoint of preventing troubles such as mechanical damage to polymer electrolyte membranes and gas leakage, it is necessary to sufficiently reduce the difference in gas pressure between oxidant gas and fuel gas, and to consider the stoichiometric ratio between oxidant and fuel (reducing agent), the concentration of active material (oxidizing agent) contained in oxidant gas, and the concentration of active material (reducing agent) contained in fuel gas. For this reason, a cooling fluid channel comprising a plurality of channels may be formed as in the case of this embodiment 6.

In the present invention, even in the case of forming the cooling fluid channel comprising a plurality of channels and the reaction gas channel comprising a plurality of channels, at least one of the cathode-side gap 10*b* and the anode-side gap 10*a* can be filled with condensed water, and therefore the reaction gas is more effectively utilized than conventional fuel cells.

Although embodiments of the present invention have been described in detail above, it should be understood that the present invention is not limited to the embodiments given above. It should be noted that each of the above embodiments may be partly combined with any of the other embodiments described in this specification.

For example, considering the stoichiometric reaction between hydrogen and oxygen, hydrogen in an amount of twice the volume of oxygen is necessary. However, when air is used as the oxidant gas, because the oxygen concentration in air is approximately 20 vol %, the flow rate of air to the cathode becomes larger than that of fuel gas to the anode. Moreover, in terms of improving fuel utilization rate, the flow rate of fuel gas should be reduced. Accordingly, the fuel gas channel has more serpentine portions and is longer than the oxidant gas channel, and thus the difference in length between the anode-side gas channel and the anode-side gap becomes larger than that between the cathode-side gas channel and the cathode-side gap, causing a reaction gas to easily flow into the anode-side gap rather than the cathode-side gap. For this reason, it is effective to fill the anode-side gap.

According to the concept of the present invention, the upstream portion of the cooling fluid channel of either or both of the anode-side separator and the cathode-side separator may be formed in the region corresponding to the anode-side gap and the cathode-side gap. Thereby, the water vapor contained in the reaction gas that flows into the anode-side gap formed between the anode-side gasket and the membrane electrode assembly and the cathode-side gap formed between the cathode-side gasket and the membrane electrode assembly condenses in at least a part of the anode-side gap and the cathode-side gap, so that either of the anode-side gap and the cathode-side gap can be surely filled with the condensed water.

Also, when at least one of the anode-side gap and the cathode-side gap each have the first route and the second route longer than the first route, as described previously, the upstream portion of the cooling fluid channel is preferably arranged in the region corresponding to the short first route into which a reaction gas flows more easily. However, the upstream portion of the cooling fluid channel may be formed in either or both of the region corresponding to the first route and the region corresponding to the second route. Reaction gas can flow into the second route, and further, by arranging the upstream portion of the cooling fluid channel in the regions corresponding to both the vicinities of the first and second routes, the flowing of the reaction gas into the first and second routes can be surely prevented.

Also, when the gas channel comprises a plurality of grooves, for example, differences occur in channel length (total path length) between the plurality of grooves because they have different numbers of turn portions. In this case, of the plurality of grooves, the groove having a longer distance from the manifold aperture for supplying reaction gas to the manifold aperture for exhausting reaction gas preferably has a larger cross-sectional area than that of the groove having a shorter distance from the manifold aperture for supplying reaction gas to the manifold aperture for exhausting reaction gas. With this structure, differences in pressure loss between grooves having different channel lengths can be eliminated, achieving stable flow of reaction gas.

In a region where the upstream portion of the gas channel and the downstream portion of the same are adjacent to each other, the width between the gas channels (i.e., rib width) is preferably wider. This prevents the reaction gas from flowing directly from the upstream portion of the gas channel to the downstream portion of the same.

In order to prevent cross-leaking between the fuel gas and the oxidant gas and to effectively prevent the both gases from flowing together through the same gas channel, it is preferred that the manifold aperture 14 for supplying fuel gas and the manifold aperture 15 for exhausting fuel gas be formed apart from each other in the anode-side separator 6a as shown in FIG. 3, and that the manifold aperture 18 for supplying oxidant gas and the manifold aperture 19 for exhausting oxidant gas be formed apart from each other in the cathode-side separator 6b as shown in FIG. 4. In the case where the manifold apertures are closely spaced, the width of each rib between the gas channels connected to the manifold apertures is preferably wider in the vicinity of the manifold apertures.

In the present invention, the structure of the cooling fluid channel of the anode-side separator may be replaced with that of the cooling fluid channel of the cathode-side separator, or the other way around. Alternatively, both the cooling fluid channel of the anode-side separator and the cooling fluid channel of the cathode-side separator may have the same structure. The number of straight portions and the number of turn portions are not specifically limited, and they can be appropriately set as long as the effect of the present invention is not impaired.

Additionally, the shapes of the gas channels of the anode-side separator and the cathode-side separator are not limited to the embodiments given above, either. As long as the effect of the present invention is not impaired, a conventional structure in which the manifold aperture for supplying reaction gas and the manifold aperture for exhausting reaction gas are communicated with each other can be employed.

The cooling fluid channel should be formed in at least one of the anode-side separator and the cathode-side separator, and not necessarily on both separators. Particularly when a plurality of unit cells are stacked, the cooling fluid channel may be formed in every two unit cells. In this case, for example, a structure can be employed in which the fuel gas channel is formed on one surface of the anode-side separator and the cooling fluid channel is formed on the other surface thereof, and the oxidant gas channel is formed on one surface of the cathode-side separator and the other surface thereof is flat.

Although the above embodiments explained the case where, as the gas diffusion electrode, an electrode comprising a catalyst layer and a gas diffusion layer as shown in FIG. 1 is incorporated into the fuel cell of the present invention, the present invention is not limited thereto. The fuel cell of the present invention may have, for example, an anode comprising a water repellent carbon layer made of a water repellent polymer and a carbon powder between the anode gas diffusion layer 3a and the anode catalyst layer 2a in FIG. 1. Further, the fuel cell of the present invention may have, for example, an cathode comprising a water repellent carbon layer made of a water repellent polymer and a carbon powder between the cathode gas diffusion layer 3b and the cathode catalyst layer 2b in FIG. 1. By forming the water repellent carbon layer, water control (retention of water necessary to maintain excellent characteristics of the membrane electrode assembly and quick removal of unwanted water) in the membrane electrode assembly can be done more easily and surely.

Moreover, although the above embodiments employed, for example, the gas channel 7a comprising a groove formed on a main surface of the anode-side separator 6a as in the fuel cell 10 shown in FIG. 1, the gas channel may be formed separately from the anode-side separator 6a.

For example, grooves may be formed on a main surface of a separator plate by arranging a plurality of plates smaller than the separator. This can be applied to the gas channel 7b of the cathode.

Figure 28:
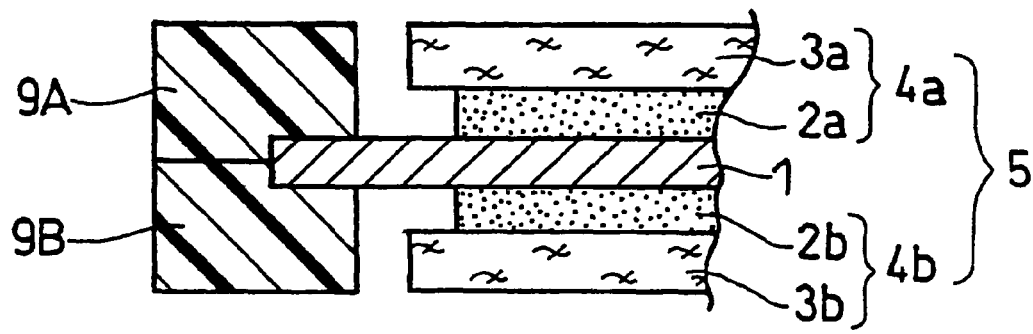
FIG. 28 is a schematic cross sectional view of a relevant part of a fuel cell according to another embodiment of the present invention illustrating a basic structure thereof.

Although the above embodiments explained the case where the protruding portion P of the polymer electrolyte membrane 1 is arranged between the anode-side gasket 9a and the cathode-side gasket 9b, and the anode-side gasket 9a and the cathode-side gasket 9b are not in direct contact with each other as shown in FIG. 1, the structure of the present invention is not limited thereto. For example, in the fuel cell of the present invention, as shown in FIG. 28, a part of the anode-side gasket 9a and a part of the cathode-side gasket may be in direct contact with each other outside the protruding portion P of the polymer electrolyte membrane.

In the fuel cell of the present invention, from the viewpoint of improving the mechanical strength of the periphery of the polymer electrolyte membrane 1 (the protruding portion P of the polymer electrolyte membrane 1), a reinforcing film in the shape of a ring may be used on at least one of the main surface of the periphery of the polymer electrolyte membrane 1 facing the anode and the main surface of the periphery of the polymer electrolyte membrane 1 facing the cathode. The reinforcing film is a thin film that is attached onto the polymer electrolyte membrane.

Figure 29:
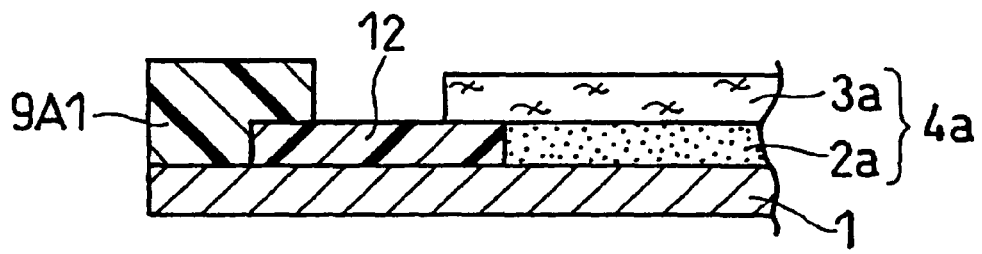
FIG. 29 is a schematic cross sectional view of a relevant part of a fuel cell according to another embodiment of the present invention illustrating a basic structure thereof.
Figure 30:
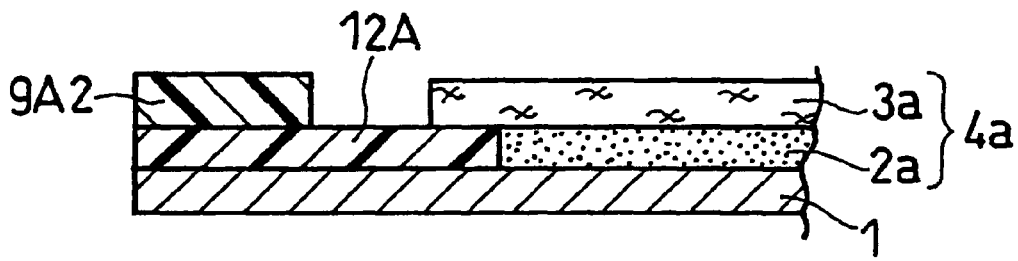
FIG. 30 is a schematic cross sectional view of a relevant part of a fuel cell according to another embodiment of the present invention illustrating a basic structure thereof.

When the reinforcing film is formed on the main surface of the periphery of the polymer electrolyte membrane 1 (the protruding portion P of the polymer electrolyte membrane 1) facing the anode, for example, structures as shown in FIGS. 29 and 30 can be employed.

The fuel cells shown in FIGS. 29 and 30 (only relevant part is shown) have the same structure as the fuel cell 10 shown in FIG. 1 except that the reinforcing film 12 is arranged on the surface of the protruding portion P of the polymer electrolyte membrane facing the anode.

Specifically, in the case of the fuel cell shown in FIG. 29, the outer edge of the reinforcing film 12 is inserted between the anode-side gasket 9a1 and the protruding portion P of the polymer electrolyte membrane 1, and the inner edge of the reinforcing film 12 is in contact with the catalyst layer 2a. Further, in the case of the fuel cell shown in FIG. 29, the outer edge of the anode-side gasket 9A1 and the outer edge of the protruding portion P of the polymer electrolyte membrane are direct contact with each other. As compared to the fuel cell shown in FIG. 29, in the fuel cell shown in FIG. 30, the reinforcing film 12 inserted between the anode-side gasket 9A2 and the protruding portion P of the polymer electrolyte membrane 1 is extended to the outer edges of the gasket and the protruding portion, and thus the anode-side gasket 9A2 and the protruding portion P of the polymer electrolyte membrane 1 are not in direct contact with each other.

In the fuel cells shown in FIGS. 29 and 30, the anode-side gap 10a comprises a space formed by the reinforcing film 12, the anode-side gasket 9a, the anode-side separator 6a and the end face of the anode 4a (the end face of the gas diffusion layer 3a)

Although, in the structure shown in FIG. 29, the case where the outer edge of the reinforcing film 12 is inserted between the anode-side gasket 9a1 and the protruding portion P of the polymer electrolyte membrane 1 was explained, the arrangement of the reinforcing film 12 is not limited thereto.

For example, in FIG. 29, a gap may exist between the outer edge of the reinforcing film 12 and the anode-side gasket 9a1, in other words, the outer edge of the reinforcing film 12 and the anode-side gasket 9a1 are not in contact with each other, by not inserting the outer edge of the reinforcing film 12 between the anode-side gasket 9a1 and the protruding portion P of the polymer electrolyte membrane 1. In this case, a part of the protruding portion P of the polymer electrolyte membrane 1 is exposed in the gap formed between the outer edge of the reinforcing film 12 and the anode-side gasket 9a1.

In this case, the anode-side gap 10a comprises a space formed by the reinforcing film 12, the exposed portion of the protruding portion P of the polymer electrolyte membrane 1, the anode-side gasket 9a, the anode-side separator 6a and the end face of the anode 4a (the end face of the gas diffusion layer 3a).

The structure shown in FIG. 29 is also applicable to the surface of the protruding portion P of the polymer electrolyte membrane 1 facing the cathode 4b. Likewise, the structure shown in FIG. 30 is also applicable to the surface of the protruding portion P of the polymer electrolyte membrane 1 facing the cathode 4b.

When forming the reinforcing film 12 shown in FIG. 29 and the reinforcing film 12A shown in FIG. 30, from the viewpoint of durability such as chemical stability and mechanical stability, the reinforcing films 12 and 12A are preferably made of at least one synthetic resin selected from the group consisting of polyethylene naphthalate, polytetrafluoroethylene, fluoroethylene-propylene copolymer, tetrafluoroethylene perfluoroalkoxy ethylene copolymer, polyethylene, polypropylene, polyether amide, polyether imide, polyether ether ketone, polyether sulfone, polyphenylene sulfide, polyalylate, polysulfide, polyimide, and polyimide amide.

EXAMPLE

The present invention will be described in detail below using examples, but it should be understood that the present invention is not limited thereto.

Example 1

In this example, a fuel cell stack having the same structure as the fuel cell stack according to embodiment 6 of the present invention described above except for the following points [1] and [2] was produced. Specifically, a fuel cell (four cell stack) comprising four MEAs stacked as shown in the fuel cell stack 30C of FIG. 21 and separators having a reaction gas channel comprising a plurality of channels and a plurality of cooling fluid channels as shown in FIGS. 22 to 27 was produced.

[1] Cathode-side separators 6a and end separators 6e having eight cooling fluid channels from the junction/branch point C shown in FIGS. 22 and 27 were used. [2] The number of cathode gas channels 7b of each of the cathode-side separators 6b and the number of cathode gas channels 7b of each of the cathode-side separators 6B shown in FIGS. 20 and 21 was set to seven.

As the gas channel of the anode-side separators, three channels similar to the three gas channels 7a shown in FIG. 24 were formed.

As the MEAs, four PRIMEA (trade name) MEAs available from W. L. Gore & Associates, Inc. were prepared. A gasket was attached to the periphery of the polymer electrolyte membrane of each MEA by hot pressing as shown in FIG. 1.

The anode-side separators, cathode-side separators, end separators having the structures described above were disposed between every pair of the four MEAs, forming a four-cell stack similar to the fuel cell stack 30C shown in FIG. 21. A current collector plate and an insulating plate were placed on each end of the four-cell stack. The obtained stack was disposed between a pair of end plates. Using springs and clamping members, the stack was fixed between the pair of end plates. Thereby, a fuel cell of Example 1 was obtained.

The anode-side separators and the cathode-side separators were formed by forming the gas channel on one surface of a conductive flat plate having a size suitable for use with the MEA, and, optionally, the cooling fluid channel on the other surface opposite to the main surface having the gas channel formed. In this example, it can be assumed that, in the regions $R_3$ of FIGS. 22 and 23, (100×L3/L4) equaled about 16% to about 25%, and in the regions $R_4$, (100×L3/L4) equaled about 5% to about 25%.

Comparative Example 1

A four-cell stack having the same structure as the four-cell stack of Example 1 except that at least one of the anode-side gap and the cathode-side gap, the upstream portion of the cooling fluid channel and the middle stream portion and subsequent portion were not in proximity to one another was produced.

Figure 31:
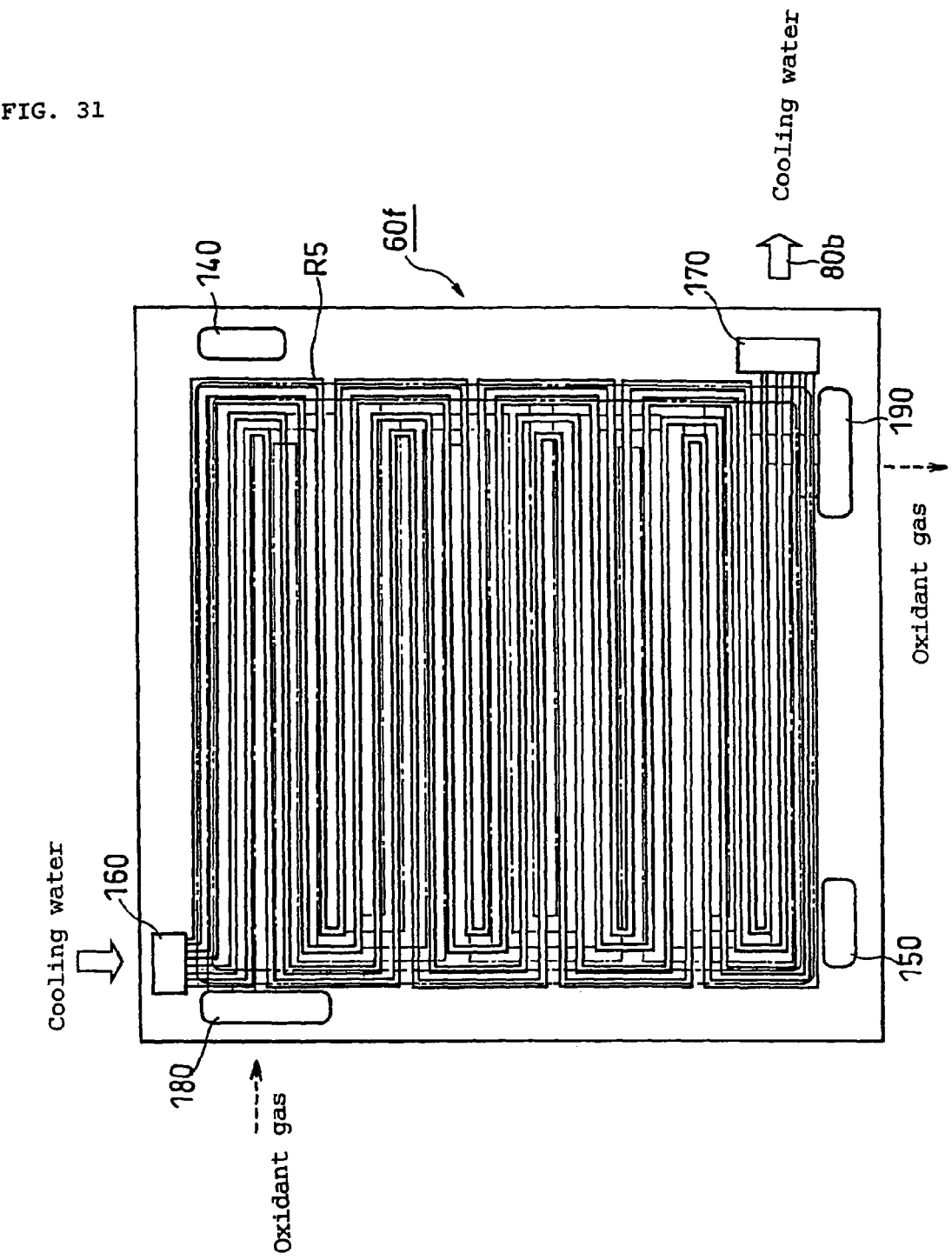
FIG. 31 is a front view of a main surface of separator 60b of Comparative Example as viewed from the side of cooling fluid channel 80b.
Figure 33:
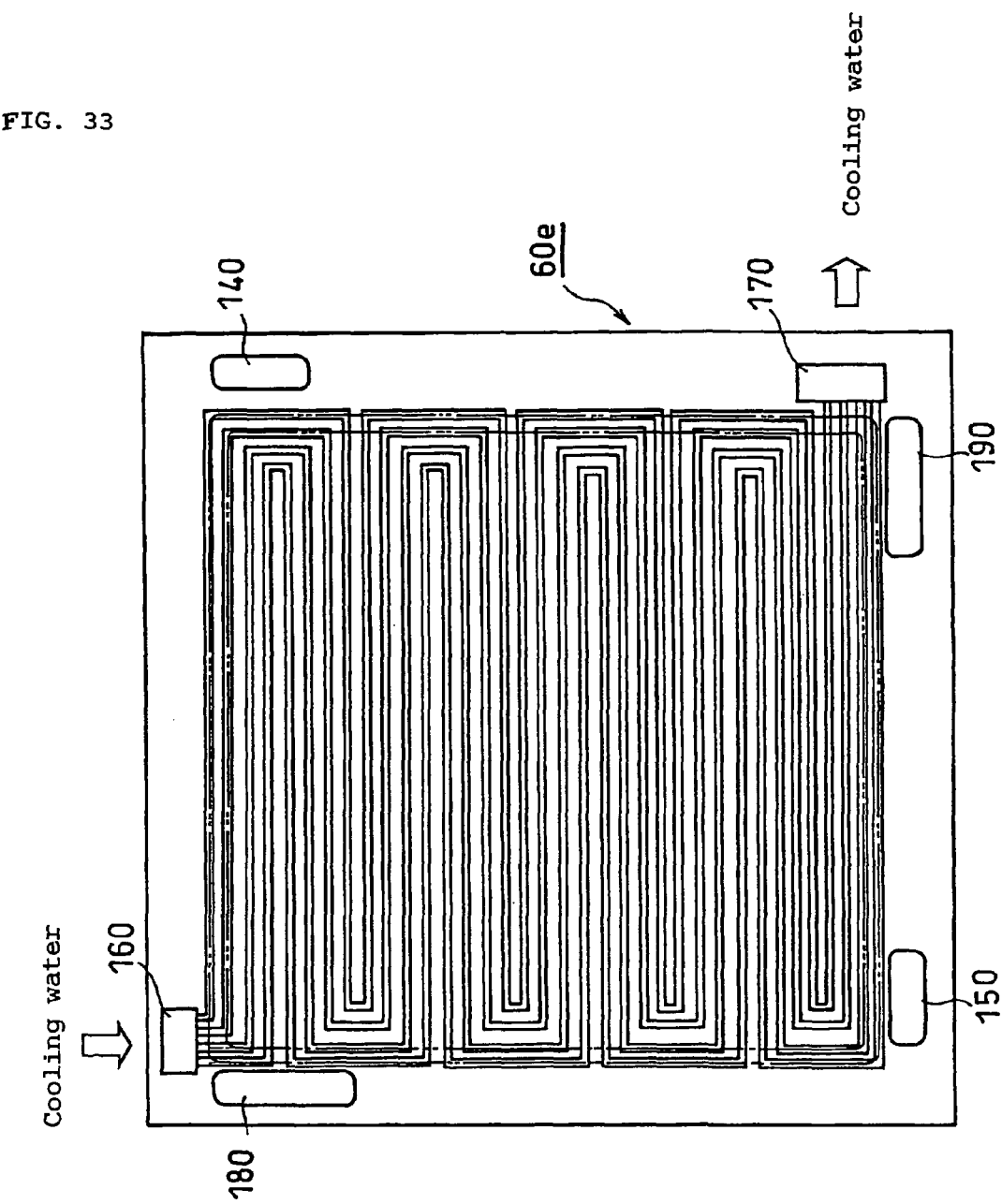
FIG. 33 is a front view of a main surface of end separator 60e of Comparative Example as viewed from the side of cooling fluid channel 80f.
Figure 34:
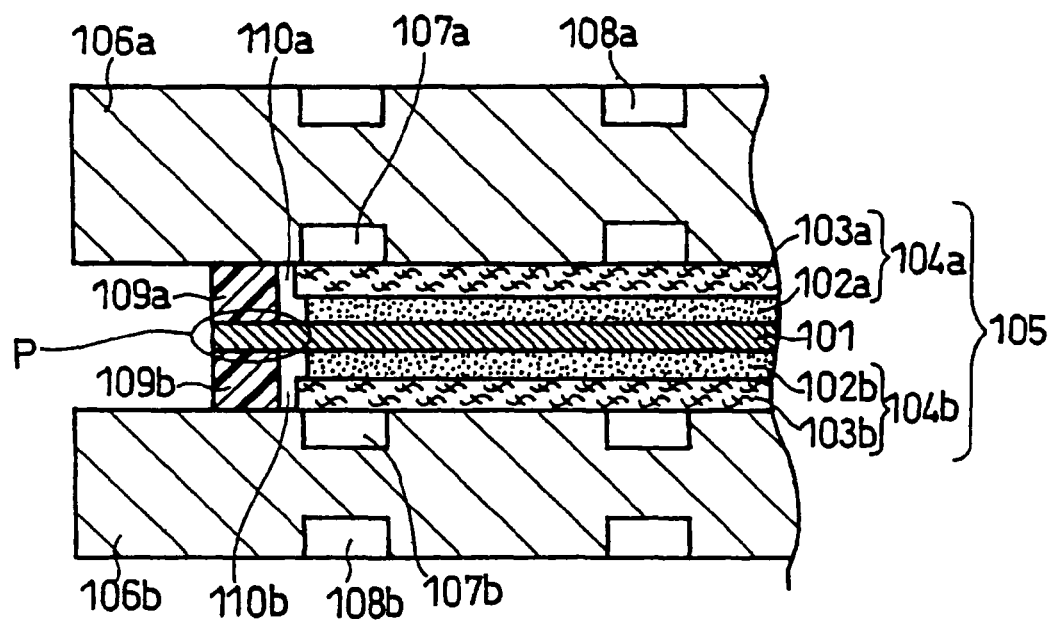
FIG. 34 is a schematic cross sectional view of a relevant part of a conventional polymer electrolyte fuel cell illustrating a basic structure thereof.

Specifically, there was produced a four-cell stack having the same structure as that of Example 1 except that a cathode-side separator and an end separator in which a serpentine cooling fluid channel (seven channels) similar to the cooling fluid channel (four channels) shown in FIG. 31 were formed were used and that an end separator in which a serpentine cooling fluid channel (seven channels) similar to the cooling fluid channel (four channels, having the same structure as the cooling fluid channel shown in FIG. 31) shown in FIG. 33 was used. For convenience of explanation (due to space limitation), in FIGS. 31 and 33, a cooling fluid channel comprising four channels is shown. In Comparative Example 1, however, a gas channel comprising seven channels was used.

Figure 32:
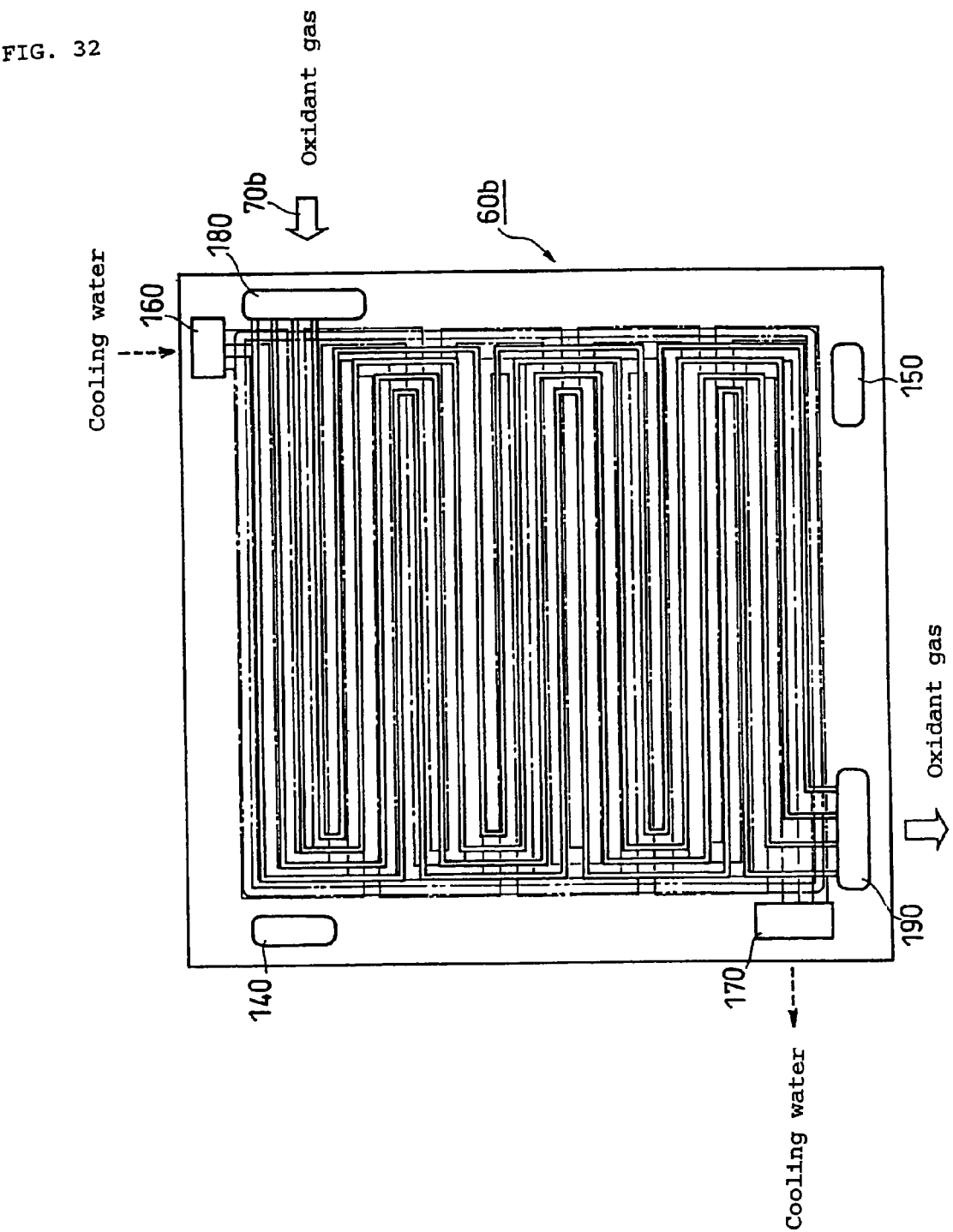
FIG. 32 is a front view of a main surface of separator 60b of Comparative Example as viewed from the side of gas channel 70b.

To roughly explain the positional relationship between the cooling fluid channel and the cathode reaction gas channel, FIG. 32 shows a serpentine gas channel (four channels) similar to the oxidant gas channel (seven channels) of the cathode-side separator used in Comparative Example 1. For convenience of explanation (due to space limitation), in FIG. 32, a cooling fluid channel comprising four channels is shown. In Comparative Example 1, however, a gas channel comprising seven channels was used.

As can be seen from FIGS. 31 to 33, in Comparative Example 1, one end of the cooling fluid channel is connected to a manifold 160 for supplying cooling fluid, and one end of the oxidant gas channel is connected to a manifold 180 for supplying oxidant gas. The manifold 160 for supplying cooling fluid and the manifold 180 for supplying oxidant gas are closely spaced in one corner of the main surface of the rectangular separator. The other end of the cooling fluid channel is connected to a manifold 170 for exhausting cooling fluid, and the other end of the oxidant gas channel is connected to a manifold 190 for exhausting oxidant gas. The manifold 170 for exhausting cooling fluid and the manifold 190 for exhausting oxidant gas are closely spaced in a corner which is diagonally opposite to the above-mentioned corner of the main surface of the separator. The cooling fluid channel and the oxidant gas channel are arranged parallel to each other in the main surface of the separator. Further, either of the two channels at both ends of the seven cooling fluid channels is formed along the vicinity of the region corresponding to the cathode gap or the region corresponding to the anode gap from upstream to downstream. Likewise, either of the two channels at both ends of the seven gas channels is formed along the vicinity of the region corresponding to the cathode gap or the region corresponding to the anode gap from upstream to downstream. Accordingly, in Comparative Example 1, the upstream portion, middle stream portion and downstream portion of the cooling fluid channel and those of the oxidant gas channel are arranged in proximity to one another.

As the gas channel of the anode-side separators, three channels similar to the three gas channels 7a shown in FIG. 24 were formed.

Evaluation Test

Using the fuel cell stack (four-cell stack) of Example 1 and the fuel cell stack (four-cell stack) of Comparative Example 1, the limit fuel gas utilization rate was measured under the following operation conditions. The results are shown in Table 1.

In this evaluation test, the limit fuel gas utilization rate for each of the unit cells constituting the fuel cell stacks of Example 1 and Comparative Example 1 was determined. Then, the arithmetic average was calculated and denoted as limit fuel gas utilization rate. As used herein, the "limit fuel gas utilization rate" is a maximum fuel utilization rate at which a fuel cell can stably generate power without causing a voltage drop.

Operation temperature of fuel cell: 62° C.
Utilization rate of fuel gas ($H_2$): 70 to 95%
Utilization rate of oxidant gas ($O_2$): 45% fixed
Cooling water temperature (inlet): 61° C.
Cooling water temperature (outlet): 63° C.
Humidification temperature for fuel gas and oxidant gas: 64° C.

TABLE 1

|  | Limit fuel gas utilization rate (%) |
|---|---|
| EXAMPLE 1 | 95 |
| COMPARATIVE EXAMPLE 1 | 90 |

In Example 1, even when the fuel gas utilization rate was 95%, no voltage drop occurred in all four unit cells. In Comparative Example, on the other hand, when the fuel gas utilization rate exceeded 90%, the voltage started to drop. For example, at a fuel gas utilization rate of 95% at which the fuel cell of Example 1 performed stable power generation, a voltage drop of 5 to 30 mV was observed in all four unit cells of Comparative Example 1.

As is clear from the results shown in Table 1, the fuel cell and fuel cell stack of the present invention has a high limit fuel gas utilization rate and exhibits sufficient power generation capability.

INDUSTRIAL APPLICABILITY

The solid polymer fuel cell of the present invention can prevent the utilization rate of reaction gas from decreasing and is applicable to fuel cells using a polymer solid electrolyte membrane, particularly, stationary cogeneration systems and electric vehicles.

The invention claimed is:

1. A fuel cell comprising:
a membrane electrode assembly having an anode, a cathode and a polymer electrolyte membrane disposed between said anode and said cathode;
an anode-side separator and a cathode-side separator that sandwich said membrane electrode assembly and face to each other;
a cooling fluid channel for supplying and exhausting a cooling fluid for cooling said membrane electrode assembly which is formed in at least one of said anode-side separator and said cathode-side separator;
a fuel gas channel for supplying and exhausting a fuel gas serving as a reaction gas to said membrane electrode assembly which is formed in said anode-side separator;
an oxidant gas channel for supplying and exhausting an oxidant gas serving as a reaction gas to said membrane electrode assembly which is formed in said cathode-side separator;
an anode-side gasket for sealing said reaction gas which is disposed in the outer portion of said membrane electrode assembly and on the main surface of said anode-side separator facing said membrane electrode assembly; and
a cathode-side gasket for sealing said reaction gas which is disposed in the outer portion of said membrane electrode assembly and on the main surface of said cathode-side separator facing said membrane electrode assembly such that said cathode-side gasket faces to said anode-side gasket;
wherein said cooling fluid channel, said fuel gas channel and said oxidant gas channel are formed such that their main portions are substantially parallel to each other;
an upstream portion of said cooling fluid channel of at least one of said anode-side separator and said cathode-side separator is formed such that it includes at least one of a region corresponding to an anode-side gap formed between said anode-side gasket and said membrane electrode assembly and a region corresponding to a cathode-side gap formed between said cathode-side gasket and said membrane electrode assembly, and said upstream portion of said cooling fluid channel is formed such that it includes a region corresponding to a middle stream portion and a subsequent portion of at least one of said fuel gas channel and said oxidant gas channel,
said upstream portion of said cooling fluid channel, said anode-side gap, said cathode-side gap, said middle stream portion and said subsequent portion are arranged to allow water vapor contained in said reaction gas that flows into said anode-side gap and water vapor contained in said reaction gas that flows into said cathode-side gap to condense in at least a part of said anode-side gap and said cathode-side gap, and to allow the condensed water to fill at least one of said anode-side gap and said cathode-side gap,
said cooling fluid channel, said fuel gas channel and said oxidant gas channel each have a serpentine structure, and
the upstream portion of the cooling fluid channel is a portion extending from an end of the cooling fluid channel connecting to a manifold aperture for supplying cooling fluid to a position that satisfies the equation: $L1 \leq L2$,
where: L1 represents a length of the upstream portion of the cooling fluid channel, and
L2 represents the total length of the anode-side gap in the case where the anode-side gap is a gas channel when the cooling fluid channel is formed in the anode-side separator, or the total length of the cathode-side gap in the case where the cathode-side gap is a gas channel when the cooling fluid channel is formed in the cathode-side separator.

2. The fuel cell in accordance with claim 1,
wherein said polymer electrolyte membrane has a larger main surface than main surfaces of said anode and said cathode, and entire periphery of the main surface of said polymer electrolyte membrane extends outwardly beyond a periphery of main surface of said anode and a periphery of main surface of said cathode,
said anode-side gasket and said cathode-side gasket are disposed between said anode-side separator and said cathode-side separator such that said anode-side gasket and said cathode-side gasket face to each other and they sandwich the entire periphery of said polymer electrolyte membrane;

said anode-side gap comprises a space including said polymer electrolyte membrane, said anode-side gasket, said anode-side separator and an end face of said anode; and said cathode-side gap comprises a space including said polymer electrolyte membrane, said cathode-side gasket, said cathode-side separator and an end face of said cathode.

3. The fuel cell in accordance with claim 1,
wherein said upstream portion of said cooling fluid channel of said anode-side separator is formed in a region corresponding to said anode-side gap so that said water vapor of said reaction gas that flows into said anode-side gap is condensed and said cathode-side gap is filled with the condensed water.

4. The fuel cell in accordance with claim 1,
wherein said upstream portions of said cooling fluid channels of said anode-side separator and said cathode-side separator are formed such that they include at least one of said region corresponding to said anode-side gap and said region corresponding to said cathode-side gap, and
said upstream portions of said cooling fluid channels are formed such that they include a region corresponding to a middle stream portion and subsequent portion of at least one of said fuel gas channel and said oxidant gas channel.

5. The fuel cell in accordance with claim 1,
wherein said anode-side gasket and said cathode-side gasket are continuous circular members,
in said anode-side separator and said cathode-side separator, a manifold aperture for supplying cooling fluid and a manifold aperture for exhausting cooling fluid connected by said cooling fluid channel are formed on the outside of said anode-side gasket and said cathode-side gasket, and said anode-side gap and said cathode-side gap each have a first route and a second route longer than said first route.

6. The fuel cell in accordance with claim 5,
wherein said upstream portion of said cooling fluid channel of at least one of said anode-side separator and said cathode-side separator is formed in a region corresponding to said first route of said anode-side gap and said cathode-side gap.

7. The fuel cell in accordance with claim 5,
wherein said upstream portion of said cooling fluid channel of at least one of said anode-side separator and said cathode-side separator is formed in a region corresponding to said second route of said anode-side gap and said cathode-side gap.

8. The fuel cell in accordance with claim
wherein said upstream portion of said cooling fluid channel of at least one of said anode-side separator and said cathode-side separator and a downstream portion of said gas channel are formed such that they correspond to each other.

9. A fuel cell stack comprising a plurality of fuel cells stacked,
wherein at least one fuel cell according to claim 1 is incorporated into said fuel cell stack as a fuel cell.

10. The fuel cell in accordance with claim 1, wherein the middle stream portion and subsequent portion of at least one of the fuel gas channel and the oxidant gas channel, is a portion extending from an end of the gas channel connecting to a manifold aperture for exhausting reaction gas to a position that satisfies the equation: $L3 \leqq \{(2/3) \times L4\}$, where: $L3$ represents the length of the middle stream portion and subsequent portion, and $L4$ represents the length of the fuel gas channel or the oxidant gas channel.

* * * * *